(12) United States Patent
Takeuchi et al.

(10) Patent No.: US 11,448,745 B2
(45) Date of Patent: Sep. 20, 2022

(54) SENSOR DEVICE AND SYSTEM, AND BIOMETRIC SENSING METHOD AND SYSTEM

(71) Applicant: Asahi Kasei Microdevices Corporation, Tokyo (JP)

(72) Inventors: Seiji Takeuchi, Tokyo (JP); Willem Johan Stapelbroek, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 612 days.

(21) Appl. No.: 16/447,992

(22) Filed: Jun. 21, 2019

(65) Prior Publication Data
US 2019/0391249 A1 Dec. 26, 2019

(30) Foreign Application Priority Data

| Jun. 22, 2018 | (JP) | JP2018-118742 |
| Jun. 22, 2018 | (JP) | JP2018-118754 |
| Jul. 13, 2018 | (JP) | JP2018-132886 |
| Jul. 27, 2018 | (JP) | JP2018-140888 |
| May 24, 2019 | (JP) | JP2019-097857 |

(51) Int. Cl.
*G01S 13/56* (2006.01)
*G01S 7/35* (2006.01)
*G01S 13/536* (2006.01)

(52) U.S. Cl.
CPC .............. *G01S 13/56* (2013.01); *G01S 7/352* (2013.01); *G01S 13/536* (2013.01); *G01S 7/356* (2021.05)

(58) Field of Classification Search
CPC ....................................................... G01S 13/56
See application file for complete search history.

(56) References Cited

U.S. PATENT DOCUMENTS

| 2004/0046689 | A1* | 3/2004 | Rees ................... G01S 13/5244 342/159 |
| 2014/0058255 | A1* | 2/2014 | Mase ...................... G01S 13/56 600/430 |
| 2014/0058256 | A1 | 2/2014 | De Jong |
| 2018/0003801 | A1 | 1/2018 | Fujibayashi |
| 2018/0011170 | A1* | 1/2018 | Rao .......................... G01S 7/354 |

FOREIGN PATENT DOCUMENTS

| JP | 2015068655 A | 4/2015 |
| JP | 2016156751 A | 9/2016 |
| JP | 2017058359 A | 3/2017 |

* cited by examiner

*Primary Examiner* — Thomas M Hammond, III
*Assistant Examiner* — Helena H Seraydaryan

(57) ABSTRACT

An FMCW radar is used to sense an object. A sensor device that senses an object by using an FMCW radar is provided. The sensor device includes: a signal processing unit that acquires a reception signal that is based on a reception wave of the FMCW radar, and senses the object; and a phase converting unit that acquires phase information from the reception signal, and tracks the object by monitoring a peak BIN, and a phase offset between the peak BIN and another BIN based on the phase information. As the reception signal, the signal processing unit may use micro-vibration data about the object to sense the object. A system including: a transceiving unit that transmits and receives an FMCW radar signal; and the sensor device according to the first aspect of the present invention is provided.

13 Claims, 59 Drawing Sheets

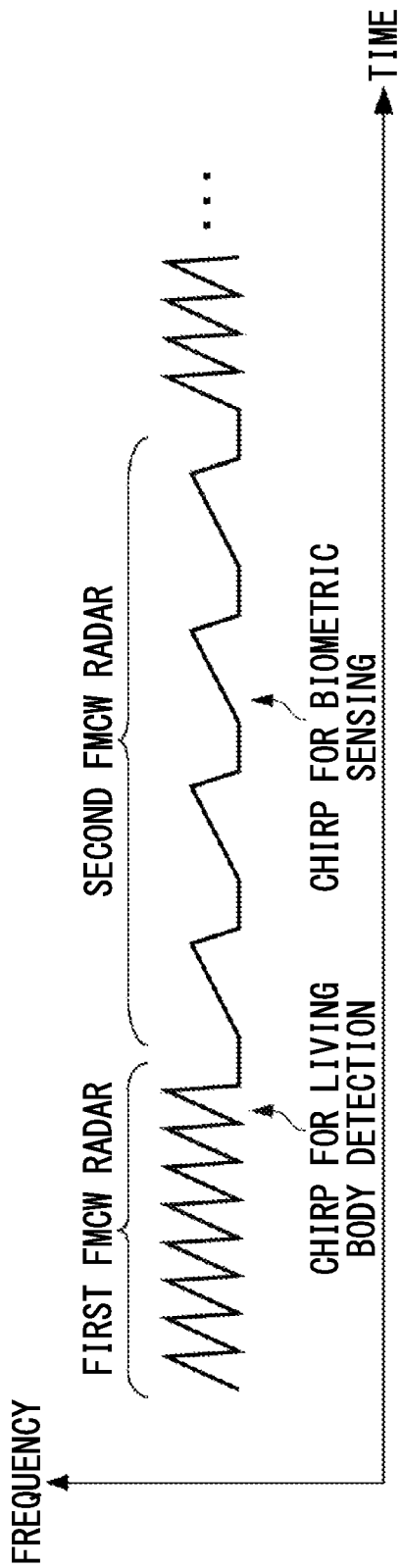

| | FIRST FMCW RADAR CONDITION | SECOND FMCW RADAR CONDITION |
|---|---|---|
| CHIRP FREQUENCY WIDTH | WIDE | NARROW |
| CHIRP CYCLE | LONG | SHORT |
| NO. OF CHIRPS IN 1 BURST | FEW | MANY |
| TRANSMISSION POWER | HIGH (HIGH POWER CONSUMPTION) | LOW (LOW POWER CONSUMPTION) |
| BEAMFORMING | LARGE AREA, LOW DIRECTIONALITY | SMALL AREA, HIGH DIRECTIONALITY |
| NO. OF FFT POINTS | MANY | FEW |
| CFAR CALCULATION METHOD | SUITED TO LARGE NO. OF TARGETS | SUITED TO SMALL NO. OF TARGETS |

FIG. 11

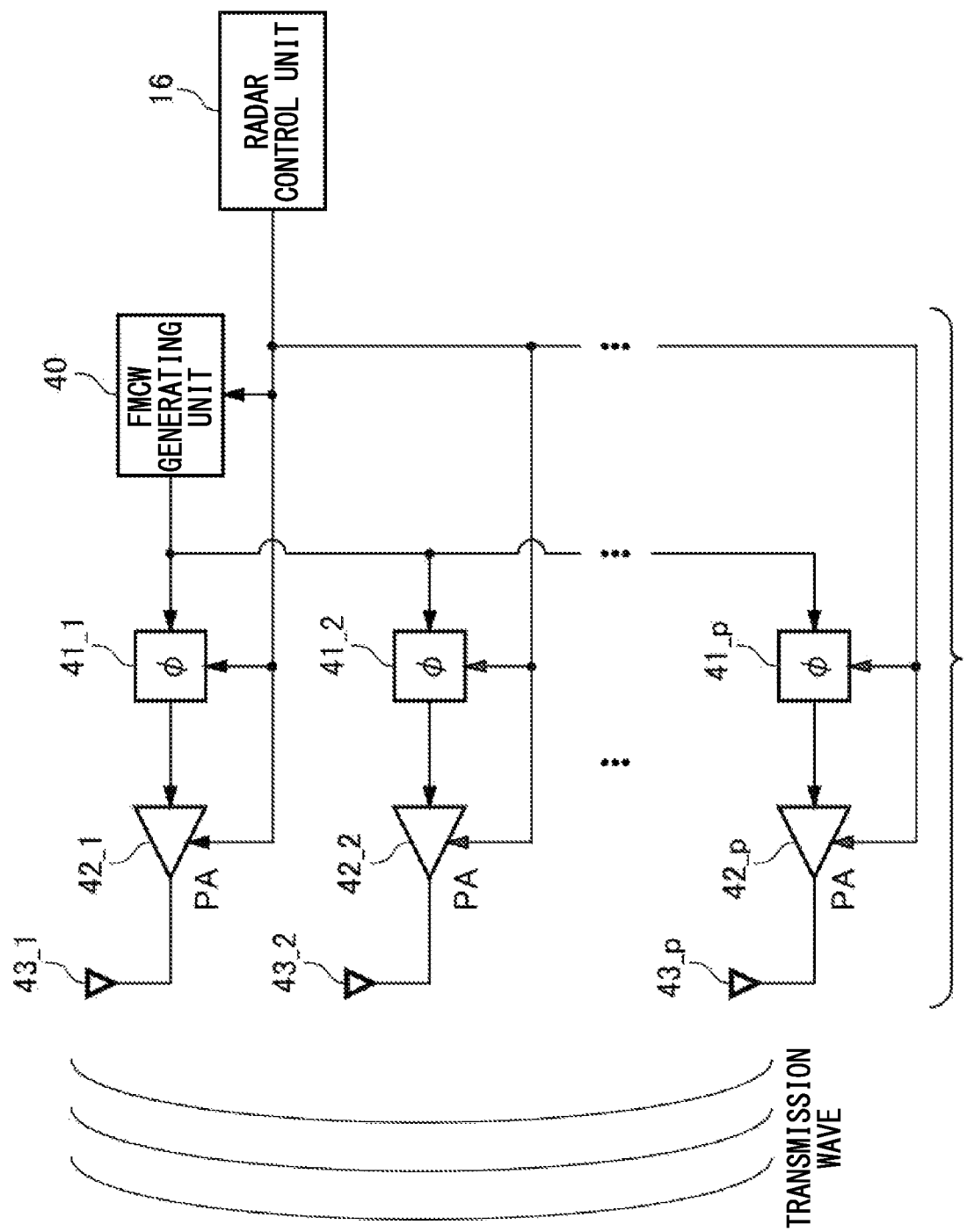

| ANTENNA NO. n | 1 | 2 | 3 | 4 | 5 | 6 | 7 | 8 | 9 | 10 | 11 | 12 | 13 | 14 | 15 | 16 | 17 | ... |
|---|---|---|---|---|---|---|---|---|---|---|---|---|---|---|---|---|---|---|
| INTERVAL Δ | 0 | 1 | 3 | 5 | 11 | 12 | 14 | 16 | 33 | 34 | 36 | 38 | 44 | 45 | 47 | 49 | 99 | |
| ANTENNA POSITION pos(n) | 1 | 2 | 2 | 2 | 6 | 1 | 2 | 2 | 17 | 1 | 2 | 2 | 6 | 1 | 2 | 2 | 50 | |

FIG. 20B

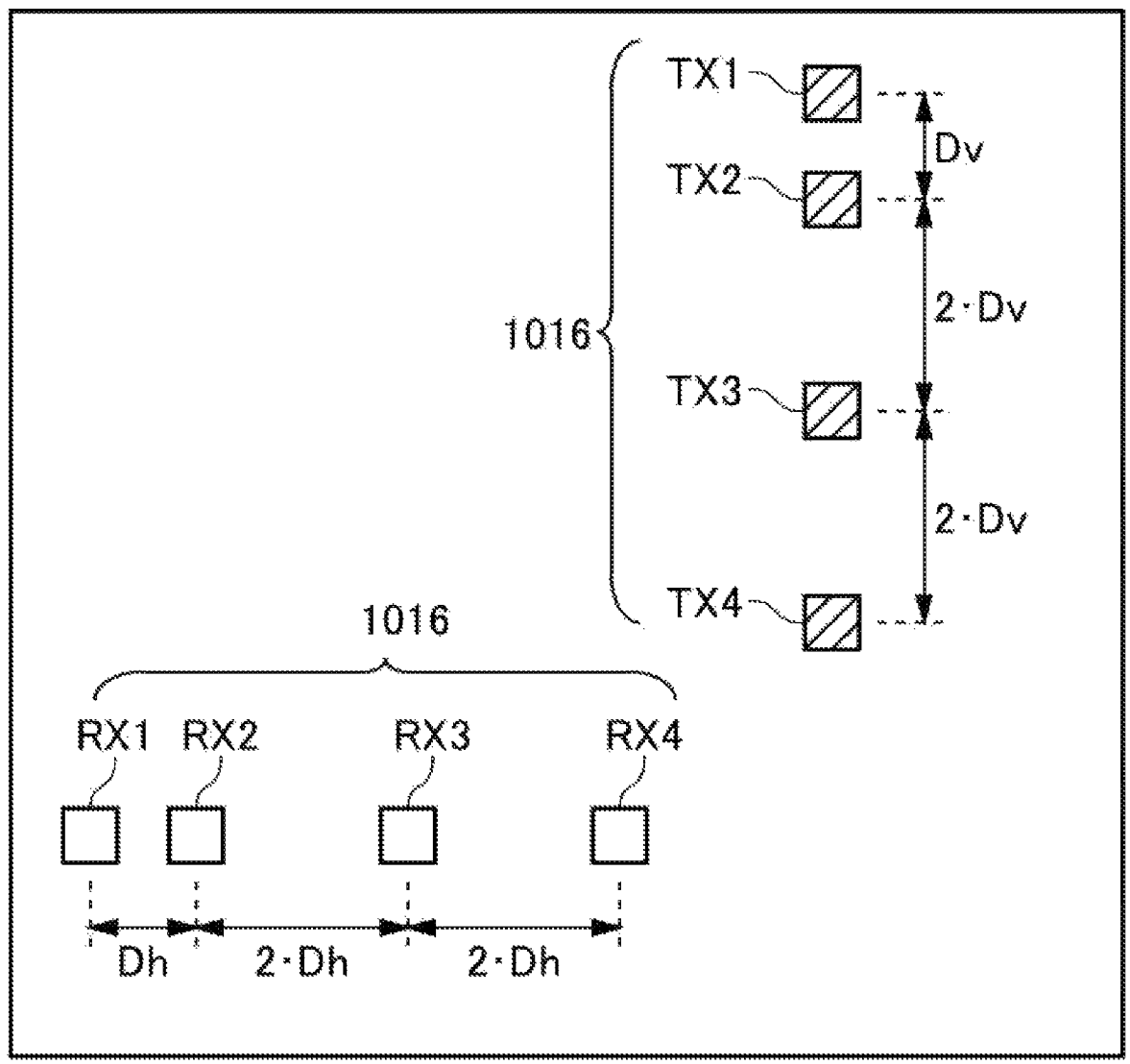
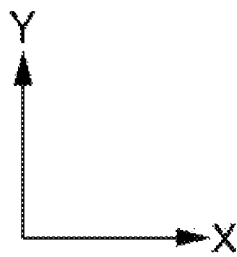
FIG. 22A

SENSOR DEVICE AND SYSTEM, AND BIOMETRIC SENSING METHOD AND SYSTEM

The contents of the following Japanese patent applications are incorporated herein by reference:
2018-118754 filed in JP on Jun. 22, 2018,
2018-118742 filed in JP on Jun. 22, 2018,
2018-132886 filed in JP on Jul. 13, 2018,
2018-140888 filed in JP on Jul. 27, 2018, and
2019-097857 filed in JP on May 24, 2019.

BACKGROUND

1. Technical Field

The present invention relates to a sensor device and system, and a biometric sensing method and system.

2. Related Art

There are conventional, known sensor devices that perform biometric sensing by using a Doppler radar (see Patent Literature 1, for example).

Patent Literature 1: Japanese Patent No. 6029108

However, Doppler sensor devices cannot detect a living body if there is not the Doppler shift. In addition, if there are a plurality of living bodies, those living bodies cannot be detected accurately.

SUMMARY

A first aspect of the present invention provides a sensor device that senses a living body by using an FMCW radar, the sensor device including: a signal processing unit that acquires a reception signal that is based on a reception wave of the FMCW radar, and senses the living body.

A second aspect of the present invention provides a system including: a transceiving unit that transmits and receives an FMCW radar signal; and the sensor device according to the first aspect of the present invention.

The summary clause does not necessarily describe all necessary features of the embodiments of the present invention. The present invention may also be a sub-combination of the features described above.

BRIEF DESCRIPTION OF THE DRAWINGS

FIG. 11 is a figure for explaining an exemplary method of configuring a chirp suited to detection of a living body 300.

FIG. 12 illustrates an exemplary configuration of the transmitting unit 12.

FIG. 20B illustrates, in a table format, an exemplary antenna arrangement according to Formula 12.

FIG. 22A illustrates an exemplary method of arranging antennas 1016 according to the first embodiment.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

First Embodiment

Figure 1A:
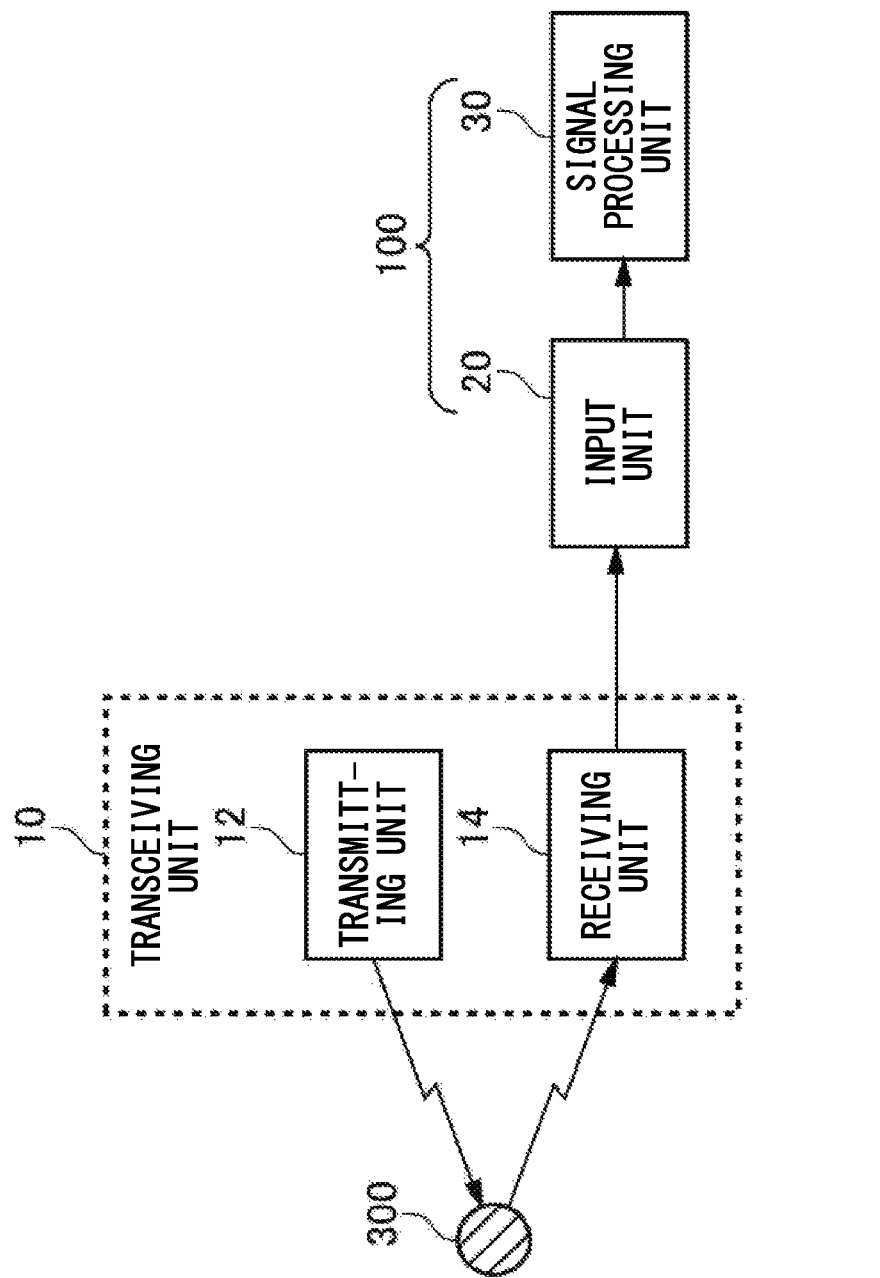
FIG. 1A illustrates main points of the configuration of a system 200.

FIG. 1A illustrates main points of the configuration of a system 200. The system 200 includes a transceiving unit 10, and a sensor device 100. The system 200 detects and senses a living body 300. The transceiving unit 10 has a transmitting unit 12, and a receiving unit 14.

The transmitting unit 12 transmits a frequency modulated continuous wave radar (FMCW radar) signal as a transmission wave to the living body 300. The FMCW radar signal is a frequency-modulated continuous oscillation radar signal. For example, the FMCW radar signal has a burst wave including a plurality of chirps. The frequency is swept temporally at each chirp. The sensor device 100 of the present example calculates the range R based on phases, and thereby uses an FMCW radar signal for biometric sensing to detect micro-vibrations on the order of several millimeters.

The receiving unit 14 receives a reflected wave of the FMCW radar signal reflected off the living body 300, and outputs an IF signal. The IF signal is a signal having a down-converted IF (intermediate frequency) proportional to the TOF (Time of Flight) of the reflected wave. The TOF is a length of time that elapses from transmission of a transmitted wave to reception of the transmission wave as a reflected wave. The TOF increases as the range R from the sensor device 100 to the living body 300 increases. The sensor device 100 performs AD conversion and signal processing on the IF signal to thereby calculate the range R and velocity V of the living body 300. The sensor device 100 may include a plurality of receiving units 14. If the sensor device 100 includes a plurality of receiving units 14, it can acquire information related to the angle θ of the position of the living body 300.

An input unit 20 receives the IF signal obtained through down-conversion of the reflected wave from the living body 300 received by the receiving unit 14. The input unit 20 converts the input analog IF signal into a digital signal. For example, the transceiving unit 10 and the input unit 20 are an integrated circuit such as an RFIC.

A signal processing unit 30 detects the living body 300 based on the digital reception signal output by the input unit 20. In the present specification, detection of the living body 300 means acquisition of the range R, velocity V, and angle θ of the living body 300, and the like, and identification of the presence of the living body 300. For example, the signal processing unit 30 is a digital signal processor (DSP). Note that the range R, velocity V, and angle θ of the living body 300 are mentioned below.

In addition, as a reception signal, the signal processing unit 30 uses micro-vibration data about the living body 300 to senses the living body 300. In the present specification, sensing of the living body 300 means acquisition of biometric signals such as micro-vibration data about the living body 300. Biometric signals are present if the living body 300 is alive, and are generated by respiration, heartbeat, and the like.

Micro-vibration data is data based on heartbeat or respiration of the living body 300. For example, as micro-vibration data, the sensor device 100 obtains an indication of vibrations at a resolution that is equal to or finer than the wavelength of an FMCW radar signal. For example, the resolution is one hundred times to one thousand times finer than one wavelength in the millimeter wave band (the frequency band of approximately 30 to 300 GHz) that is often used for FMCW radars.

The sensor device 100 senses the living body 300 by transmitting an FMCW radar signal to the living body 300. By appropriately performing signal processing on a reception signal that is based on the modulated frequency of the FMCW radar signal, the sensor device 100 can detect the living body 300 even if the relative velocity between the sensor device 100 and the living body 300 is zero, by judging that the range to the living body 300 has not changed.

Note that the signal processing unit 30 may detect and sense a plurality of living bodies 300 by identifying a plurality of peaks in the power conversion spectrum of a reception signal. By using an FMCW radar signal, the sensor device 100 can acquire the range R, velocity V, and angle θ of each of the plurality of living bodies 300.

Since the sensor device 100 uses an FMCW radar signal, it only has to perform scanning using a wide angle beam, but does not need to perform scanning using a narrow beam in a system that detects the range R, velocity V, and angle θ of each of one or more living bodies 300 that are present in a large space. In addition, simultaneously with detection of a living body 300 using an FMCW radar signal, the sensor device 100 can also realize biometric sensing only by additionally performing simple signal processing such as phase conversion.

Figure 1B:
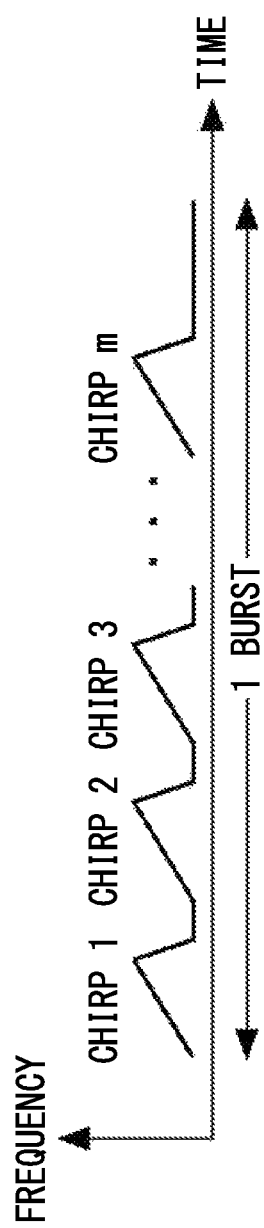
FIG. 1B illustrates an exemplary FMCW radar signal transmitted by a transmitting unit 12.

FIG. 1B illustrates an exemplary FMCW radar signal transmitted by the transmitting unit 12. The FMCW radar signal includes m chirps in one burst. m is an integer not smaller than two. The sensor device 100 modulates the chirp frequency, and analyzes differences between a transmission wave and a reception wave to thereby calculate the range R, velocity V, and angle θ of a living body 300. Depending on the position or state of the living body 300, the sensor device 100 may adjust the modulation width or cycle for the chirp frequency as appropriate. Although an FMCW radar signal of the present example includes m chirps with identical waveforms, it may include chirps with different waveforms.

An FMCW radar utilizes a temporal difference of an echo returning from a living body 300, and detects the range to or relative velocity of a target. An FMCW radar of the present example is a fast-chirp FMCW radar since emphasis is placed on wider angle, short-range detection. For example, the frequency of an FMCW radar signal is increased and decreased linearly at the cycle of approximately several microseconds to several hundreds of microseconds, and only the increasing or decreasing frequency is used for detection. It should be noted however that in the FMCW method, both the increasing frequency and decreasing frequency may be used for detection.

The FMCW radar can simultaneously detect angle information if a plurality of channels are arranged. For example, the FMCW radar realizes long-range detection in the 76-G band (76 to 77 GHz), and realizes middle-range detection or short-range detection in the 79-G band (77 to 81 GHz). Note that the FMCW radar may linearly increase or decrease the frequency at the cycle of approximately several milliseconds to several hundreds of milliseconds.

In contrast, Doppler radars utilize the Doppler shift resulting from a relative velocity of a target, and detects the range to or relative velocity of the target. For example, a representative Doppler radar is a dual-frequency CW radar. Doppler radars cannot detect a target if there is not the Doppler shift. In addition, Doppler radars cannot detect a plurality of targets since they inevitably recognize a plurality of targets as one target located at an intermediate range.

Figure 1C:
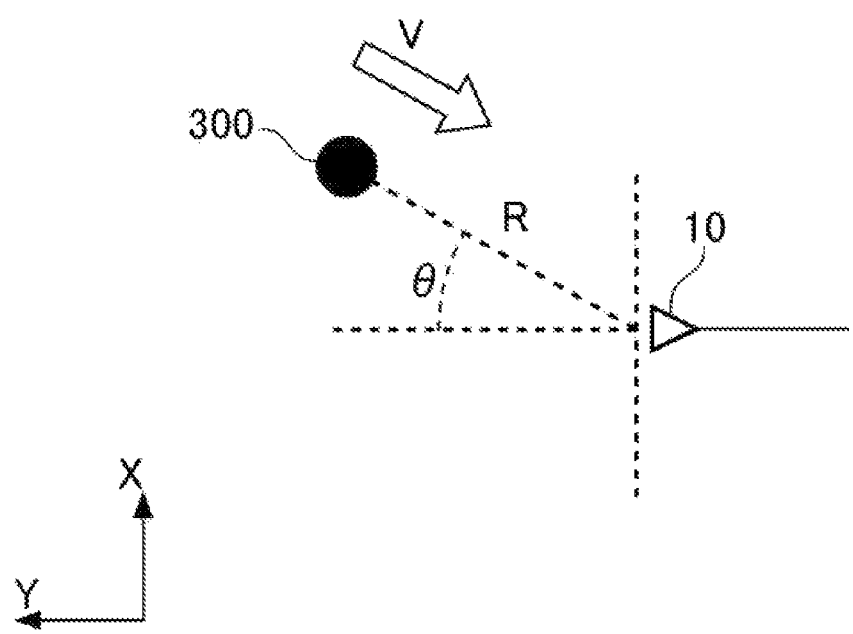
FIG. 1C is a figure for explaining the range R, velocity V, and angle θ of a living body 300.

FIG. 1C is a figure for explaining the range R, velocity V, and angle θ of a living body 300. The figure illustrates an example in which the transceiving unit 10 transmits an FMCW radar transmission wave, and the transceiving unit 10 receives a reflected wave from the living body 300. In the present example, it is supposed that the transmitting unit 12 and the receiving unit 14 are at the same position, for simplification.

The living body 300 is moving at the velocity V at the position which is apart from the transceiving unit 10 by the range R. The velocity V is a relative velocity between the transceiving unit 10 and the living body 300. The angle θ is an angle which the living body 300 is at, as seen from the transceiving unit 10. Specifically, if it is supposed that the direction in which receiving units 14 are arrayed is the X-axis direction, and the direction perpendicular to the X axis in which an FMCW radar signal is emitted is the Y axis, the angle θ is an angle formed between the Y axis and the position of the living body 300 on the X-Y plane.

Figure 1D:
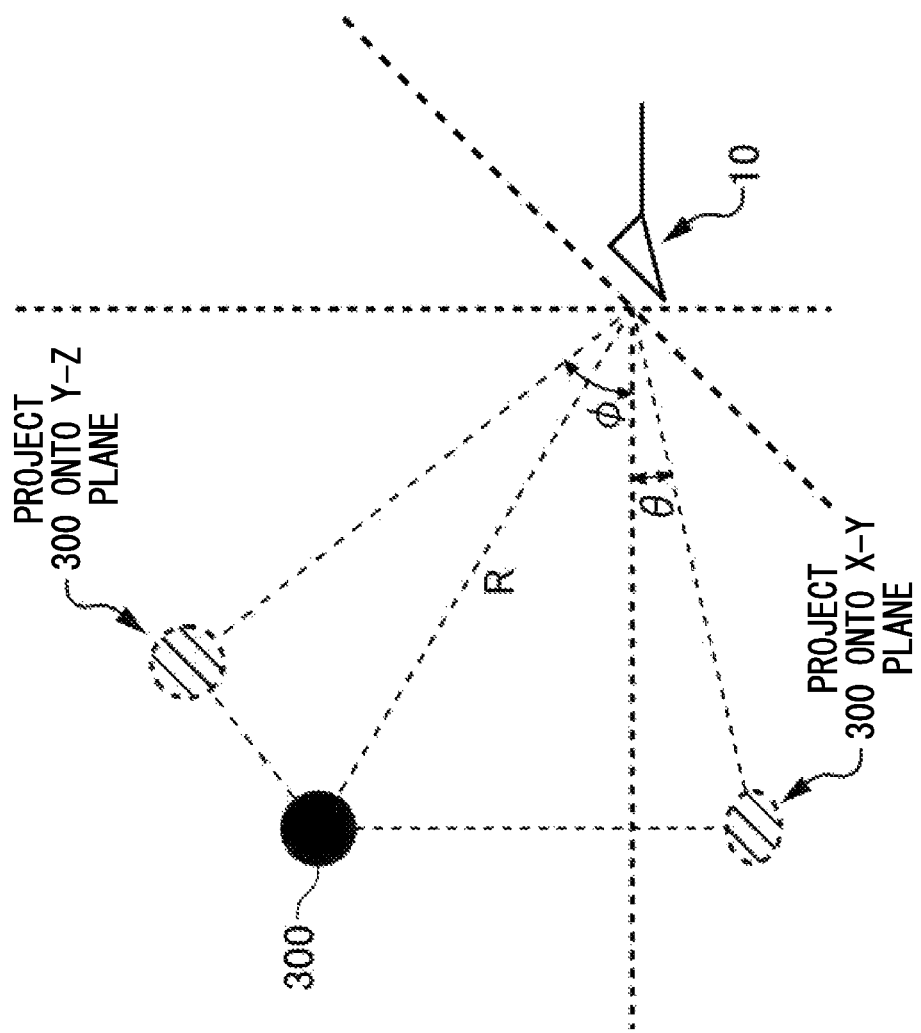
FIG. 1D is a figure for explaining the range R, velocity V, angle θ, and angle φ of a living body 300.

FIG. 1D is a figure for explaining the range R, velocity V, angle θ, and angle φ of a living body 300. The sensor device 100 can detect and sense the living body 300 based on similar principles, as a so-called 3D radar that performs detection for another axis (Z axis) perpendicular to the X-Y plane. In such a case, the sensor device 100 acquires three-dimensional information by using the angle φ obtained by projecting the living body 300 onto the Y-Z plane, in addition to the angle θ obtained by projecting the living body 300 onto the X-Y plane.

Figure 2:
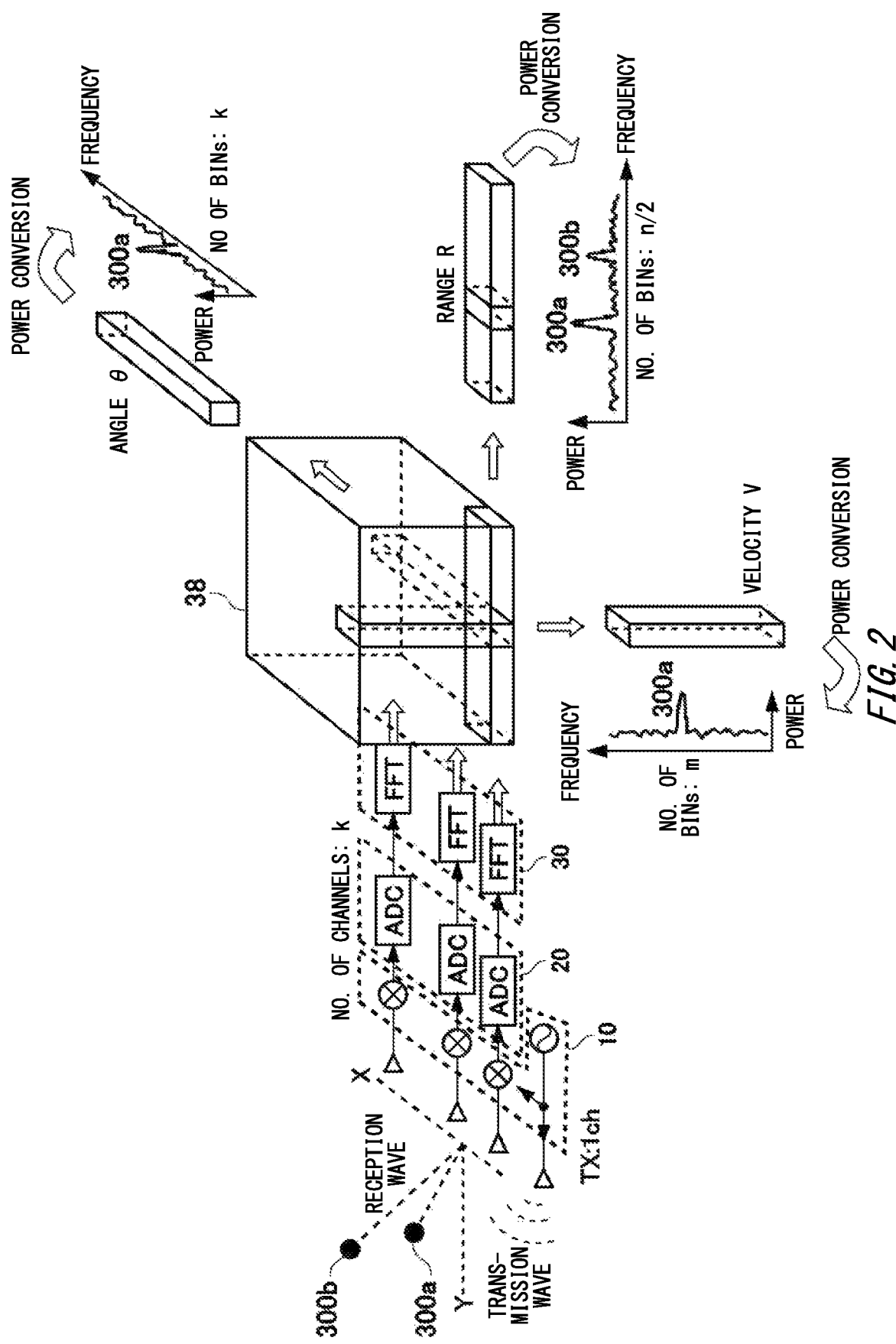
FIG. 2 is a figure for explaining operation principles of the system 200.

FIG. 2 is a figure for explaining operation principles of the system 200. The system 200 detects the range R, velocity V, and angle θ of a living body 300.

The transceiving unit 10 has a plurality of channels. For example, the transceiving unit 10 has one transmitting unit 12, and k receiving units 14. k is an integer not smaller than one. If the transceiving unit 10 has a plurality of channels, it can identify the angle θ. The k receiving units 14 each receive reflected signals from a living body 300a and a living body 300b. The input unit 20 receives IF signals from the transceiving unit 10, and AD conversion is performed on the IF signals. The signal processing unit 30 receives digital data from the input unit 20, and signal processing such as FFT is executed.

A data cube 38 includes data related to ranges R, velocities V, and angles θ. The data cube 38 includes data sequences obtained through a range-FFT, a velocity-FFT, and an angle-FFT.

Through power conversion on a range data sequence, a range power spectrum having n/2 BINs is obtained. The range power spectrum has two peak BINs corresponding to the ranges of the living body 300a and living body 300b.

By executing a velocity-FFT on a data sequence corresponding to a peak BIN position of the range power spectrum, and performing power conversion on a newly obtained velocity data sequence, a velocity power spectrum having m BINs is obtained. The velocity power spectrum includes a peak BIN corresponding to the velocity of the living body 300a or living body 300b. It depends on a peak BIN position of a selected range power spectrum which living body the velocity of the peak BIN corresponds to.

By executing an angle-FFT on a data sequence corresponding to a peak BIN position of the range power spectrum, and performing power conversion on a newly obtained angle data sequence, an angle power spectrum having k BINs is obtained. The angle power spectrum has a peak BIN corresponding to the angle of the living body 300a or living body 300b. It depends on a peak BIN position of a selected range power spectrum which living body the angle of the peak BIN corresponds to. The sensor device 100 calculates, as time-series information, phase information obtained through phase conversion on the range data sequence of a living body 300 obtained through a range-FFT, and acquires biometric signal data of the living body 300. Note that the BIN position of phase information used as biometric signal information corresponds to a peak BIN position of the range power spectrum.

Figure 3A:
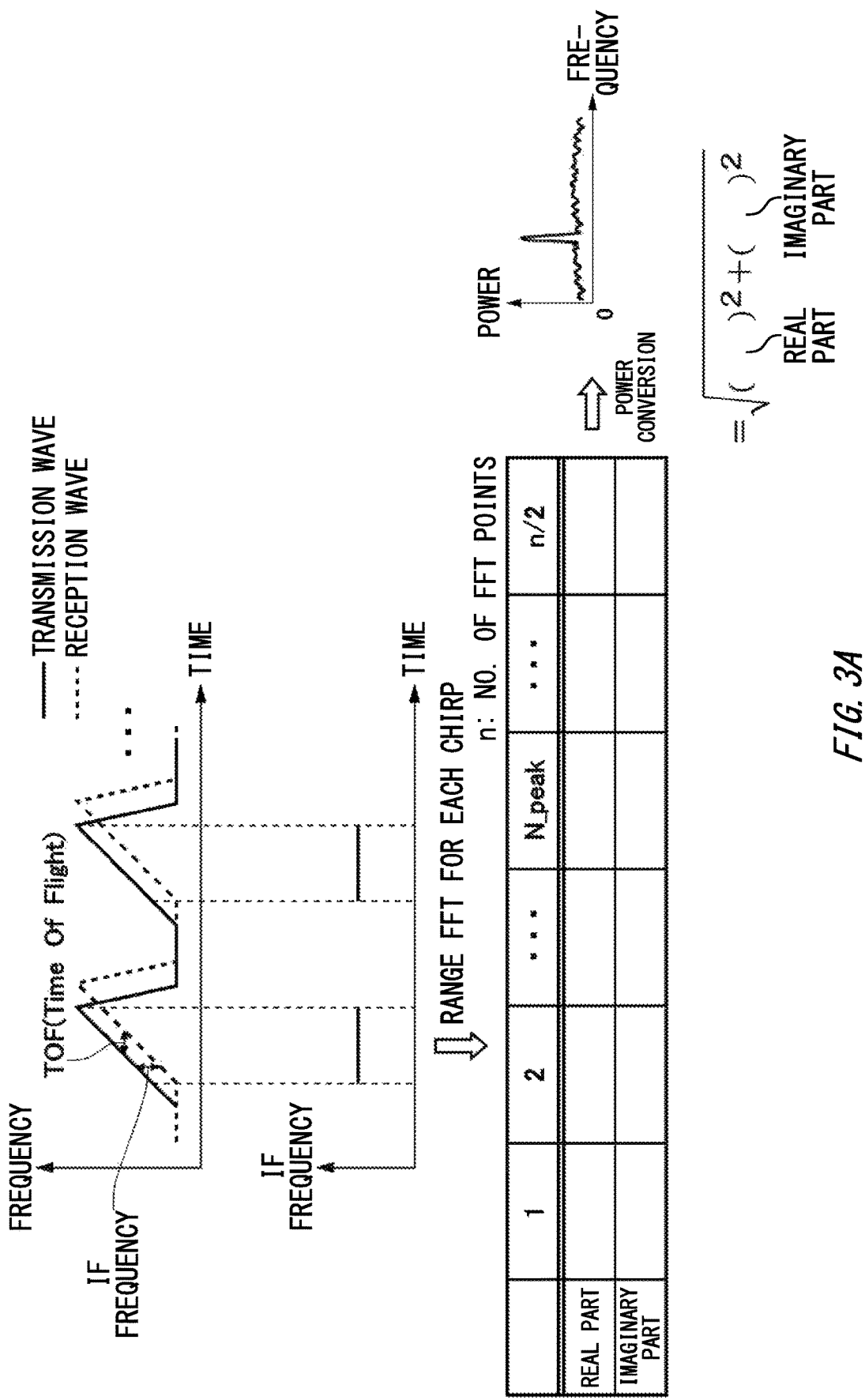
FIG. 3A is a figure for explaining principles about detection of the range R to a living body 300.

FIG. 3A is a figure for explaining principles about detection of the range R to a living body 300. The range R to the living body 300 is calculated by using a range-FFT performed on at least one chirp. The solid line in the graph indicates the waveform of an FMCW radar signal. The broken line in the graph indicates a reception wave of the FMCW radar signal. The vertical axis corresponds to frequency, and the horizontal axis corresponds to time.

The IF is a frequency obtained by mixing the transmission wave and reception wave of the FMCW radar signal. The IF increases as the range R from the sensor device 100 to the living body 300 increases. The sensor device 100 can obtain an IF proportional to the range R to the living body 300 for a certain period. That is, the sensor device 100 can acquire the range R to the living body 300 by analyzing the IF.

The sensor device 100 executes a range-FFT process for each chirp. For example, if the number of FFT points is n, the numbers of data sequences obtained for real parts and imaginary parts are n/2. That is, the number of BINs is n/2. The sensor device 100 calculates a peak BIN through power conversion based on a result of a range-FFT. The sensor device 100 can calculate the range R to the living body 300 based on a frequency at which a peak appears.

Figure 3B:
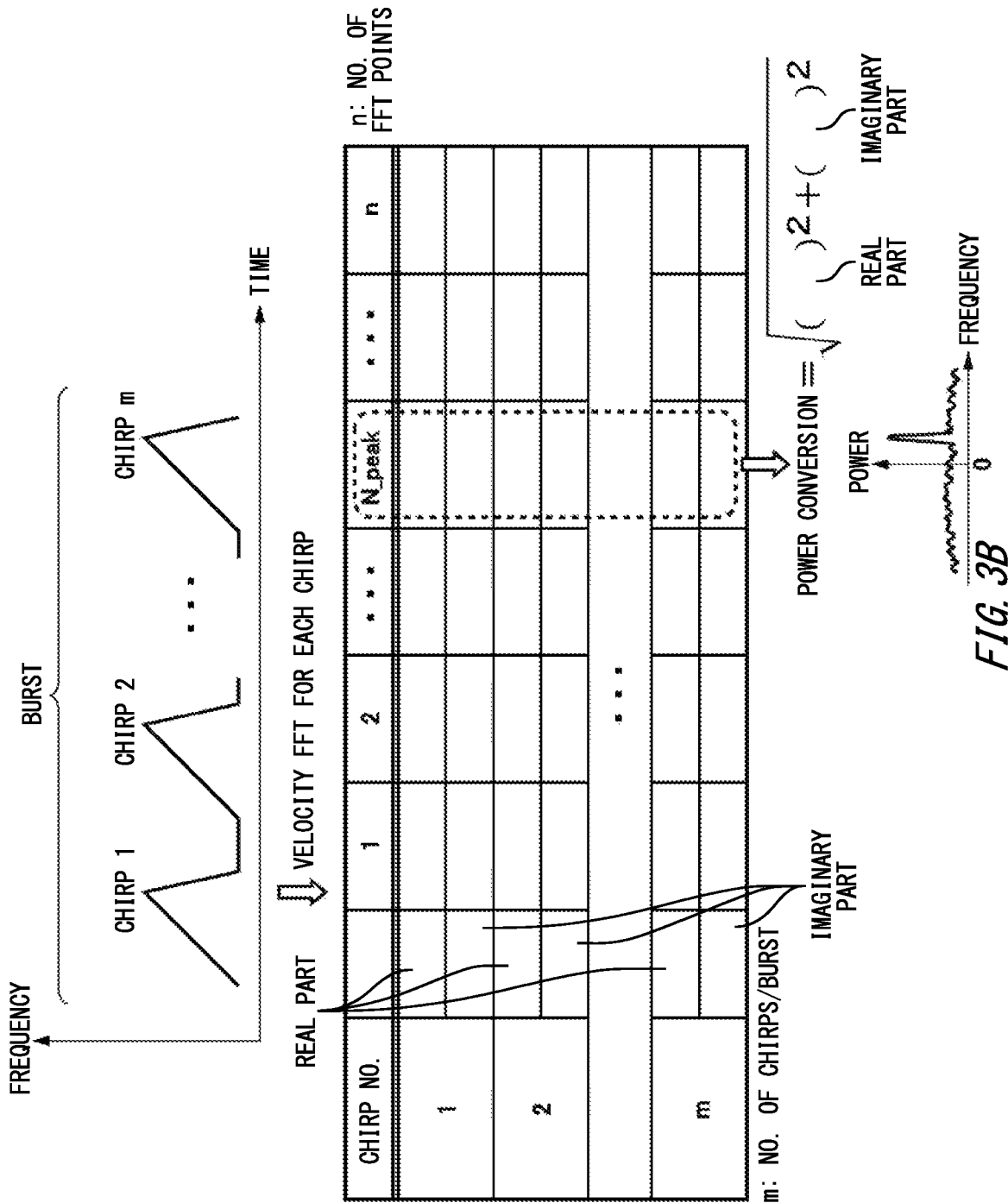
FIG. 3B is a figure for explaining principles about detection of the velocity V of a living body 300.

FIG. 3B is a figure for explaining principles about detection of the velocity V of a living body 300. For each data sequence obtained through a range-FFT performed on multiple chirps in a burst, a velocity-FFT is executed for a new data sequence corresponding to a peak BIN position in a range power spectrum. One burst includes m chirps. The velocity V of the living body 300 is calculated through power conversion based on a result of the velocity-FFT.

The sensor device 100 executes a velocity-FFT process for one burst. For example, if the number of chirps in one burst is m, the numbers of data sequences obtained for real parts and imaginary parts are m. That is, the number of BINs is m. The sensor device 100 calculates a peak BIN position through power conversion based on a result of the velocity-FFT. The sensor device 100 can calculate the velocity V based on the frequency at the peak.

Figure 3C:
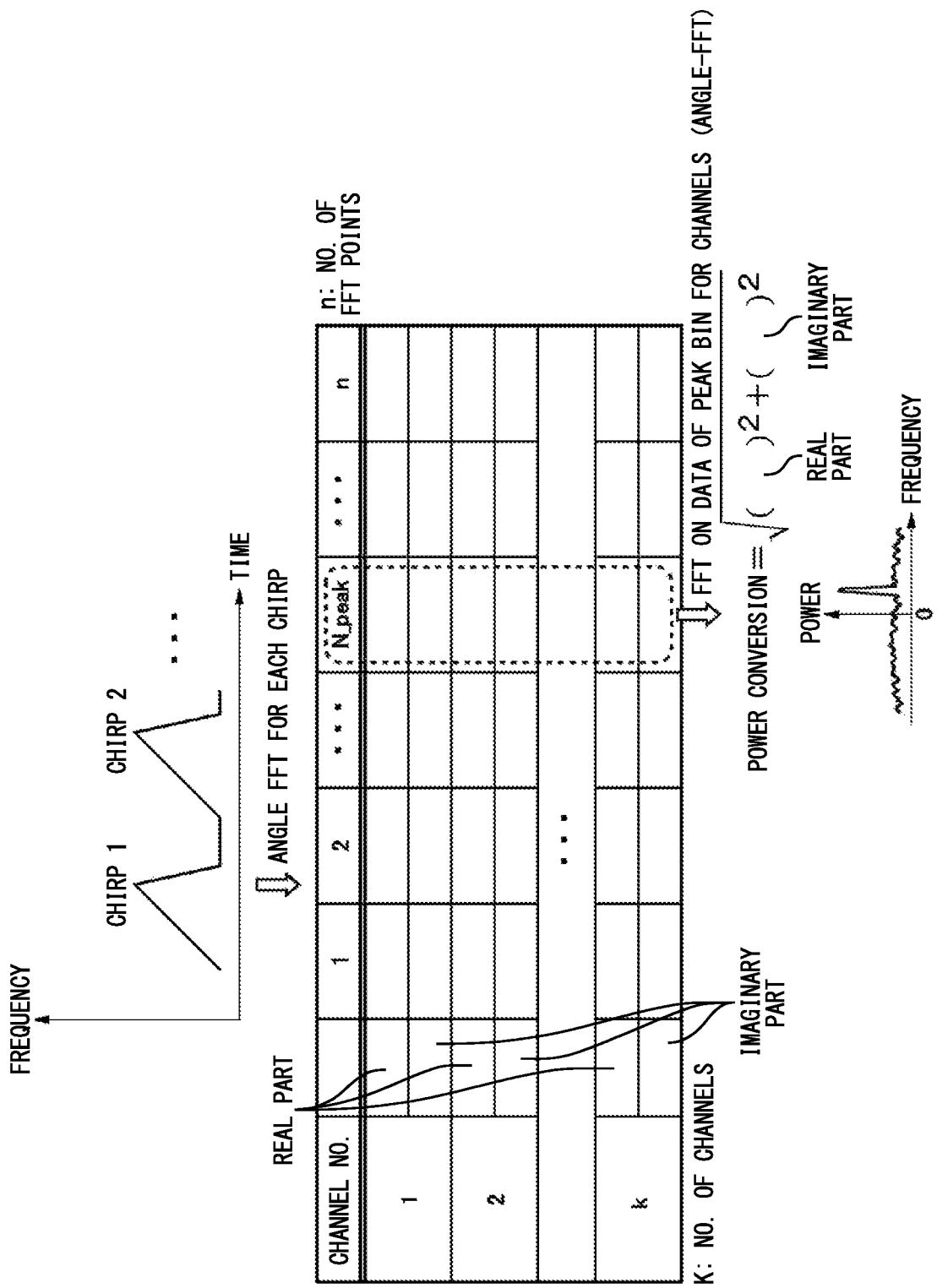
FIG. 3C is a figure for explaining principles about detection of the angle θ.

FIG. 3C is a figure for explaining principles about detection of the angle θ of a living body 300. About the angle θ, for each data sequence obtained through a range-FFT performed on chirps of each channel, an angle-FFT is executed for a new data sequence corresponding to a peak BIN position in a range power spectrum. For one chirp, there are k chirps corresponding to k channels.

The sensor device 100 executes an angle-FFT process for k channels. For example, if there are k channels, the numbers of data sequences obtained for real parts and imaginary parts are k. That is, the number of BINs is k. The sensor device 100 receives reception waves at receiving units 14 that are arrayed in the X-axis direction, and correspond to k channels. Since the reception waves received by the individual receiving units 14 have phase differences corresponding to the angle θ of the living body 300, the angle θ of the living body 300 can be calculated by analyzing the reception signals of the k channels. A peak BIN position is calculated through power conversion based on a result of the angle-FFT. The sensor device 100 can calculate the angle θ based on the frequency at the peak.

Figure 4A:
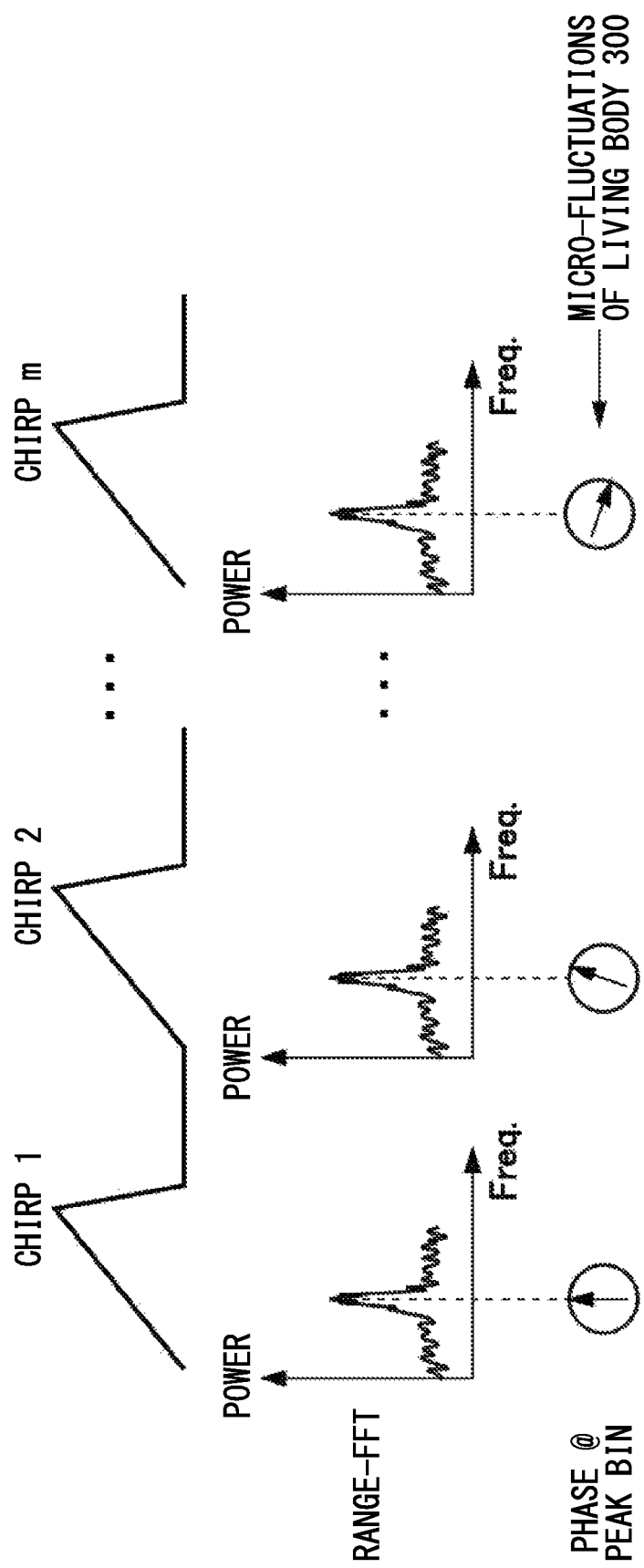
FIG. 4A is a figure for explaining a method of sensing a single living body 300.

FIG. 4A is a figure for explaining an exemplary method of sensing a single living body 300. The sensor device 100 calculates, for each chirp, the phase of a peak of a power spectrum obtained through a range-FFT. In the present example, one peak is obtained in a power spectrum having n/2 BINs. That is, the sensor device 100 is sensing one living body 300.

The sensor device 100 senses biometric signals of the living body 300 by acquiring phase information about a peak position of a power spectrum of the living body 300. The sensor device 100 identifies, as a micro range change of the living body 300, a change of phase information for each chirp. For example, for a 80-GHz FMCW radar, 360° is equivalent to about 4 mm which is one wavelength. The sensor device 100 of the present example acquires phase information about a living body 300 based on range data.

Phase information about a peak BIN is expressed by $\tan^{-1}$(imaginary part/real part). Note that although the sensor device 100 of the present example acquires phase information about a living body 300 based on range data, this is not the sole example. For example, the sensor device 100 may acquire phase information about a living body 300 based on velocity data or angle data. Arithmetic explanation follows.

Figure 4B:
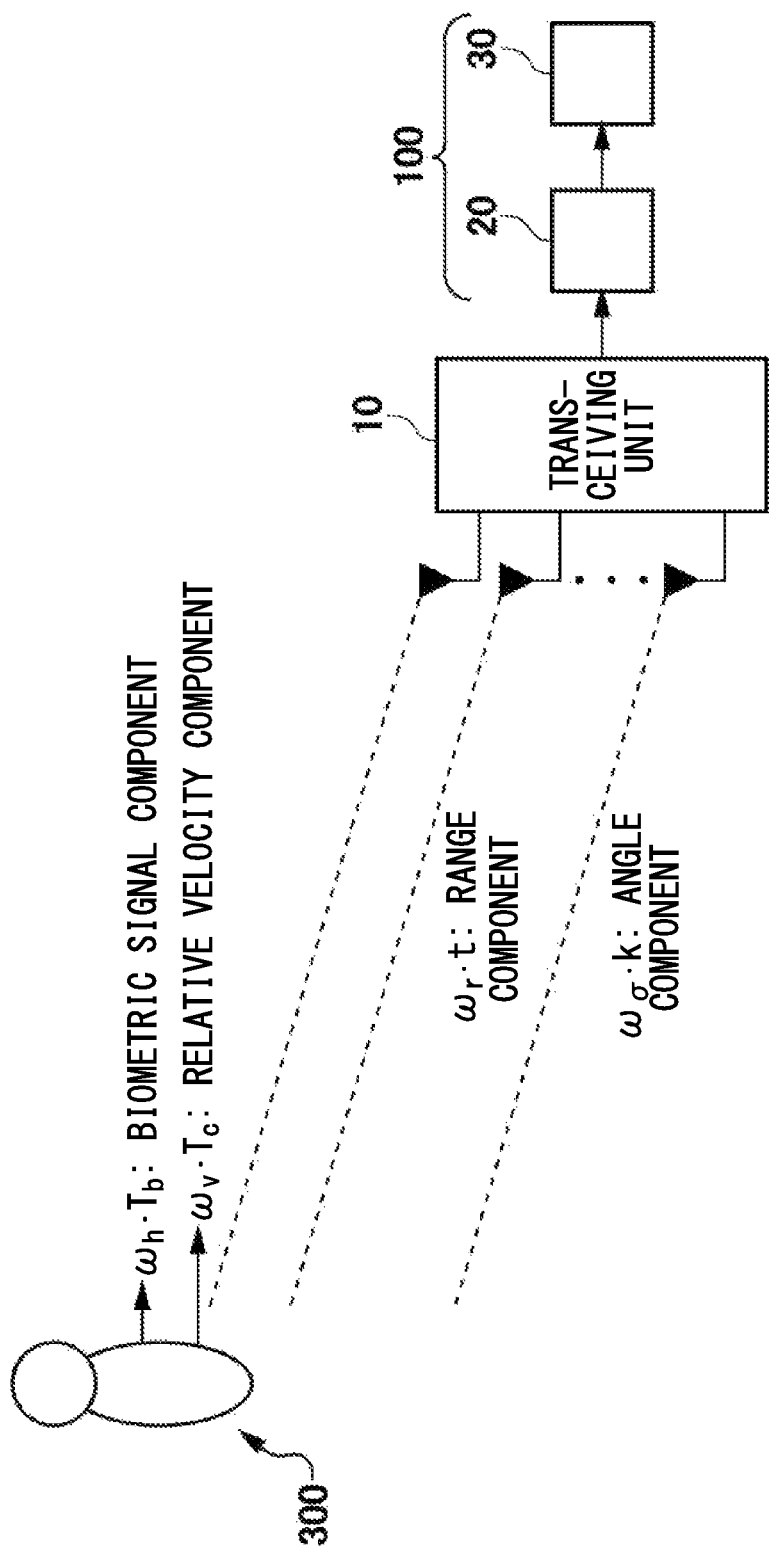
FIG. 4B is a figure for arithmetically explaining a method of sensing a single living body 300.

FIG. 4B is a figure for arithmetically explaining how each piece of information (range, velocity, angle, and biometric signals) sensed from a living body 300 is separated one by one through each FFT process by utilizing temporal scale differences or spatial scale differences, in an example where sensing of the living body 300 is performed by using the transceiving unit 10 and the sensor device 100.

The general formula of an IF signal which is output of the transceiving unit 10 is expressed as in the following formula using times and spaces (channels) with different scales as variables.

$$y(t, T_c, n, T_b) = \cos(\omega_r \cdot t + \omega_v \cdot T_c + \omega_\alpha \cdot k + \omega_h \cdot T_b) \quad [\text{Formula 1}]$$

Here, t indicates real time in a time scale for range detection. $\omega_r$ indicates a frequency component dependent on the range. $T_c$ indicates a chirp cycle (i.e., the time scale for relative velocity detection). $\omega_v$ indicates a frequency component dependent on the relative velocity. $\omega_\alpha$ indicates a frequency component dependent on the angle. $T_b$ indicates a burst cycle (i.e., the time scale for biometric signal detection). $\omega_h$ indicates a frequency component dependent on the biometric signal.

Performing a Fourier transform using t as a variable in Formula 1 is equivalent to executing a range-FFT, and Formula 1 is converted to the following formula.

$$Y_g(\omega_R, T_c, k, T_b) = \int \cos(\omega_r \cdot t + \omega_v \cdot T_c + \omega_\alpha \cdot k + \omega_h \cdot T_b) \cdot e^{-j \cdot W_R \cdot t} dt \quad [\text{Formula 2}]$$

$$Y_R(\omega_R, T_c, k, T_b) = \pi e^{-j(\omega_v \cdot T_c + \omega_\alpha \cdot k + \omega_h \cdot T_b)} \cdot \{\delta(\omega_R - \omega_r) + \delta(\omega_R + \omega_r)\} \quad [\text{Formula 3}]$$

It is assumed about Formula 3 that the range barely changes for a time scale which is longer by one step (in this case, $T_c$). If the frequency dependent on the range is $\omega_R$ ($\omega_R = \omega_r$) at the second term on the right side of Formula 3, Y assumes an extremum (peak), that is, represents a frequency indicating the range. In the case of an FFT, it is equivalent to a BIN position. If attention is paid only to the frequency, Formula 3 is expressed by the following formula.

$$Y_R(T_c, k, T_b) = \pi e^{-j(\omega_v \cdot T_c + \omega_\alpha \cdot k + \omega_h \cdot T_b)} \quad [\text{Formula 4}]$$

Subsequently, performing a Fourier transform using $T_c$ as a variable in Formula 4 is equivalent to executing a velocity-FFT, and Formula 4 is converted to the following formula.

$$Y_V(\omega_V, k, T_b) = \int Y_R(T_c, k, T_b) \cdot e^{j\omega_V^T c} dT_c = \int \pi e^{-j(\omega_v \cdot T_c + \omega_R \cdot k + \omega_R \cdot T_b)} \cdot e^{-j \omega_V \cdot T_c} dT_c \quad [\text{Formula 5}]$$

$$Y_V(\omega_V, k, T_b) = 2\pi^2 e^{-j(\omega_\alpha \cdot k + \omega_h \cdot T_b)} \quad [\text{Formula 6}]$$

It is assumed about Formula 6 that the velocity barely changes for a time scale which is longer by one step (in this case, $T_b$). If the frequency dependent on the velocity is $\omega_V$ ($\omega_V = \omega_v$) at the second term on the right side of Formula 6, Y assumes an extremum (peak), that is, represents a frequency indicating the velocity. In the case of an FFT, it is equivalent to a BIN position. If attention is paid only to the frequency, Formula 6 is expressed by the following formula.

$$Y_V(k, T_b) = 2\pi e^{-j(\omega_\alpha \cdot k + \omega_h \cdot T_b)} \quad [\text{Formula 7}]$$

Subsequently, performing a Fourier transform using k as a variable in Formula 7 is equivalent to executing an angle-FFT, and Formula 7 is converted to the following formula.

$$Y_\theta(\omega_\theta, T_b) = \int Y_T(k, T_b) \cdot e^{-j\omega_R \cdot k} \cdot dk = \int 2\pi^2 e^{-j(\omega_c \cdot k \cdot \omega_k + \omega_h \cdot T_b)} \cdot e^{-j\omega_c \cdot k} \cdot dk \quad \text{[Formula 8]}$$

$$Y_\theta(\omega_\theta, T_b) = 4\pi^3 e^{-j(\omega_h \cdot T_b)} \cdot \delta(\omega_\theta - \omega_\alpha) \quad \text{[Formula 9]}$$

It is assumed about Formula 9 that ranges and velocities detected at all the receiving units are the same. If the frequency dependent on the angle is $\omega_\theta$ ($\omega_\theta = \omega_\alpha$) at the second term on the right side of Formula 9, Y assumes an extremum (peak), that is, represents a frequency indicating the angle. In the case of an FFT, it is equivalent to a BIN position. If attention is only to the frequency, Formula 9 is expressed by the following formula.

$$Y_\theta(T_b) = 4\pi^3 e^{-j(\omega_h \cdot T_b)} \quad \text{[Formula 10]}$$

Through the three steps of Fourier transform (FFT) illustrated above, it becomes possible to separate information about range, velocity, and angle. Here, since all of Formula 4, Formula 7, and Formula 10 include the frequency component $\omega_h$ dependent on biometric signals, the frequency $\omega_H = \omega_h$ dependent on biometric information can be separated from all the separation results of each piece of information indicated by Formula 3 by paying attention to changes that are observed when $T_b$ in each formula is treated as the time scale.

Note that the time scale of an FMCW radar is configured based on a frequency modulation method called the fast-chirp FMCW method. $T_c$ is supposed to be on the order of microseconds, $T_b$ is supposed to be on the order of milliseconds, and biometric signals are recognized as having frequencies on the order of seconds. In addition, typically, change amounts (at the body surface of a living body 300) from which biometric signals result are very small as compared with the sensitivity of an FMCW radar to each piece of information about the range, velocity or angle of the living body 300 to be a target. Therefore, the biometric signals themselves never influence information about the range, velocity, and angle.

Figure 4C:
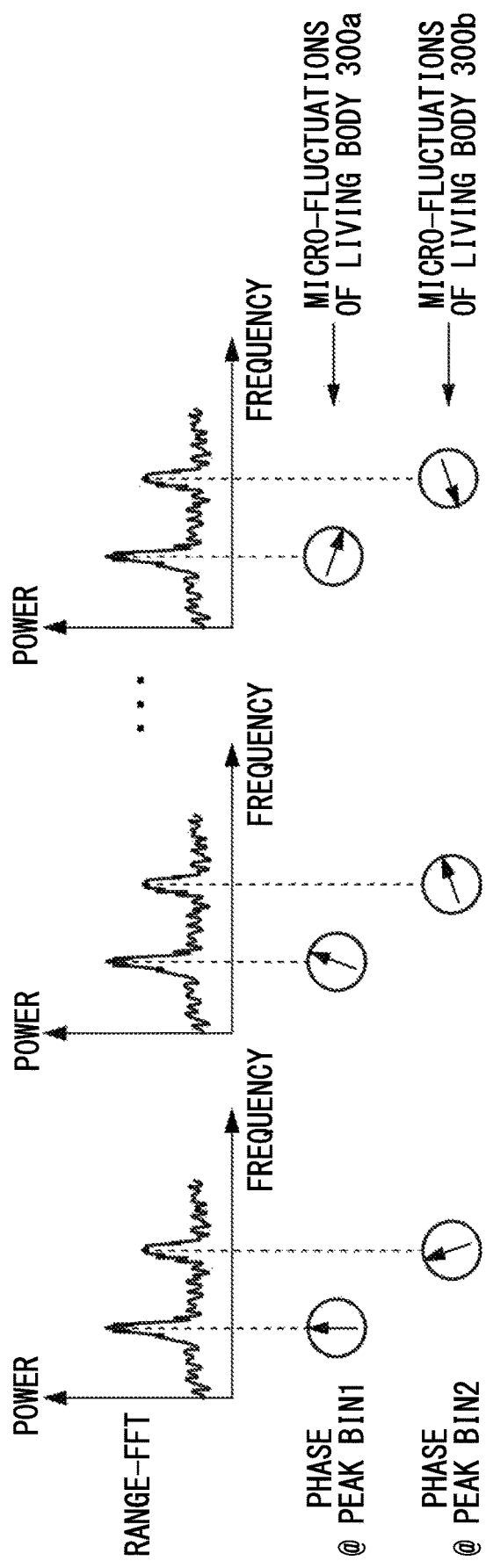
FIG. 4C is a figure for explaining a method of sensing a plurality of living bodies 300.

FIG. 4C is a figure for explaining an exemplary method of sensing a plurality of living bodies 300. The sensor device 100 of the present example senses a living body 300a and a living body 300b. Basically, the method of sensing the living bodies 300 is similar to that in an example where there is one living body 300.

The sensor device 100 calculates, for each chirp, the phase of a peak of a power spectrum obtained through a range-FFT. In the present example, two peaks are obtained in a power spectrum having n/2 BINs. That is, the sensor device 100 is sensing the two living body 300a and living body 300b positioned at different ranges R. The sensor device 100 senses biometric signals of the living bodies 300 by acquiring phase information about peak positions of the power spectrum of the living bodies 300. In this manner, the sensor device 100 can acquire biometric signals of the living body 300a and living body 300b simultaneously.

Figure 4D:
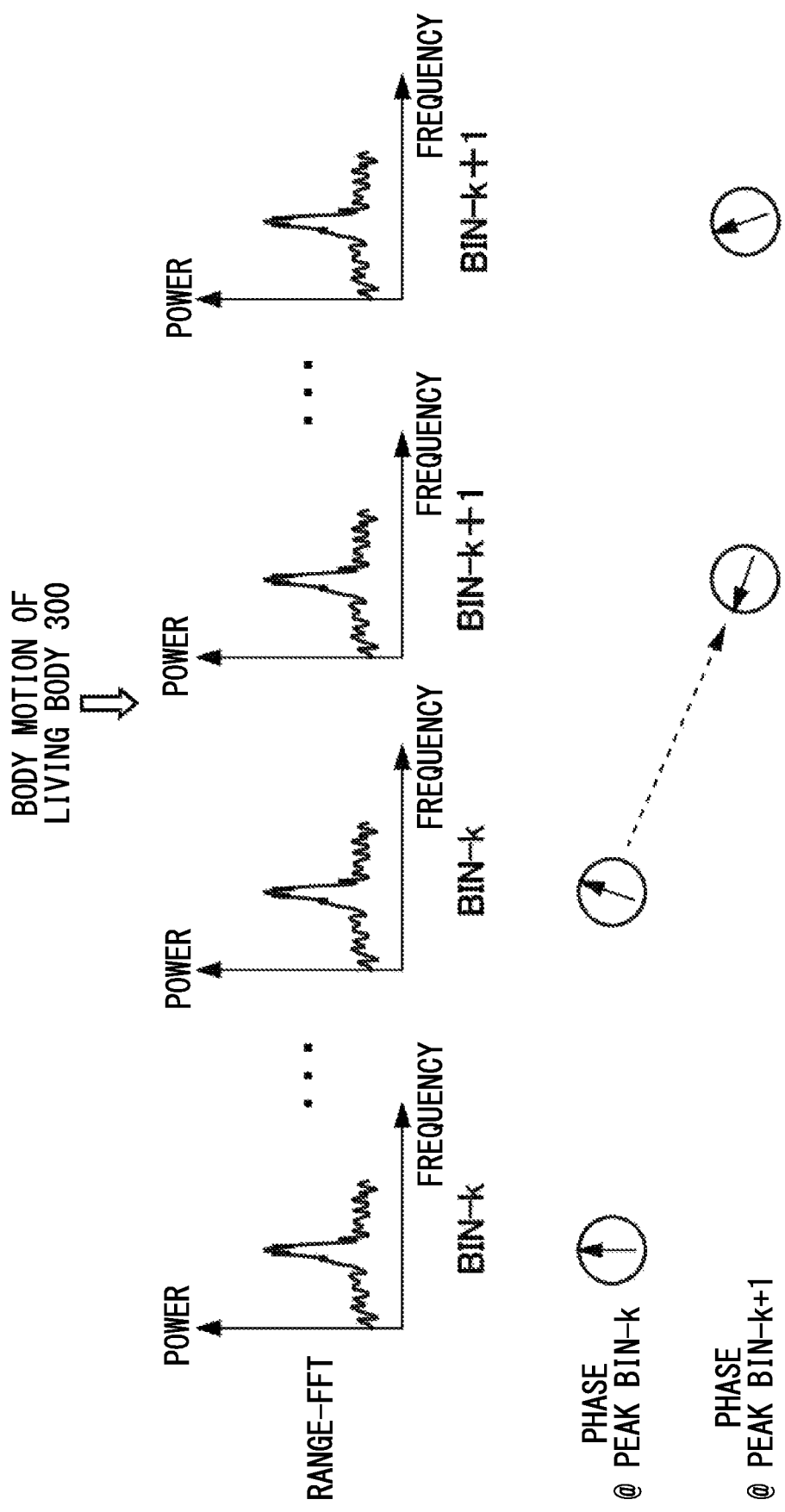
FIG. 4D is a figure for explaining a method of sensing a living body 300 making a body motion.

FIG. 4D is a figure for explaining a method of sensing a living body 300 making a body motion. Body motions of the living body 300 are large motions as compared to biometric signals resulting from heartbeat or the like. If there is a body motion of the living body 300, the position of a peak BIN in a power spectrum obtained through a range-FFT moves in some cases.

As basic principles of biometric sensing by using an FMCW radar, the sensor device 100 can obtain accurate range information about the living body 300 by tracking peak BINs of the living body 300 obtained through a range-FFT. On the other hand, if a peak BIN shifted, and only the same BIN is tracked, phase information accuracy attained inevitably deteriorates in some cases as compared with a peak BIN. The sensor device 100 of the present example can suppress such deterioration of phase information accuracy.

Figure 5:
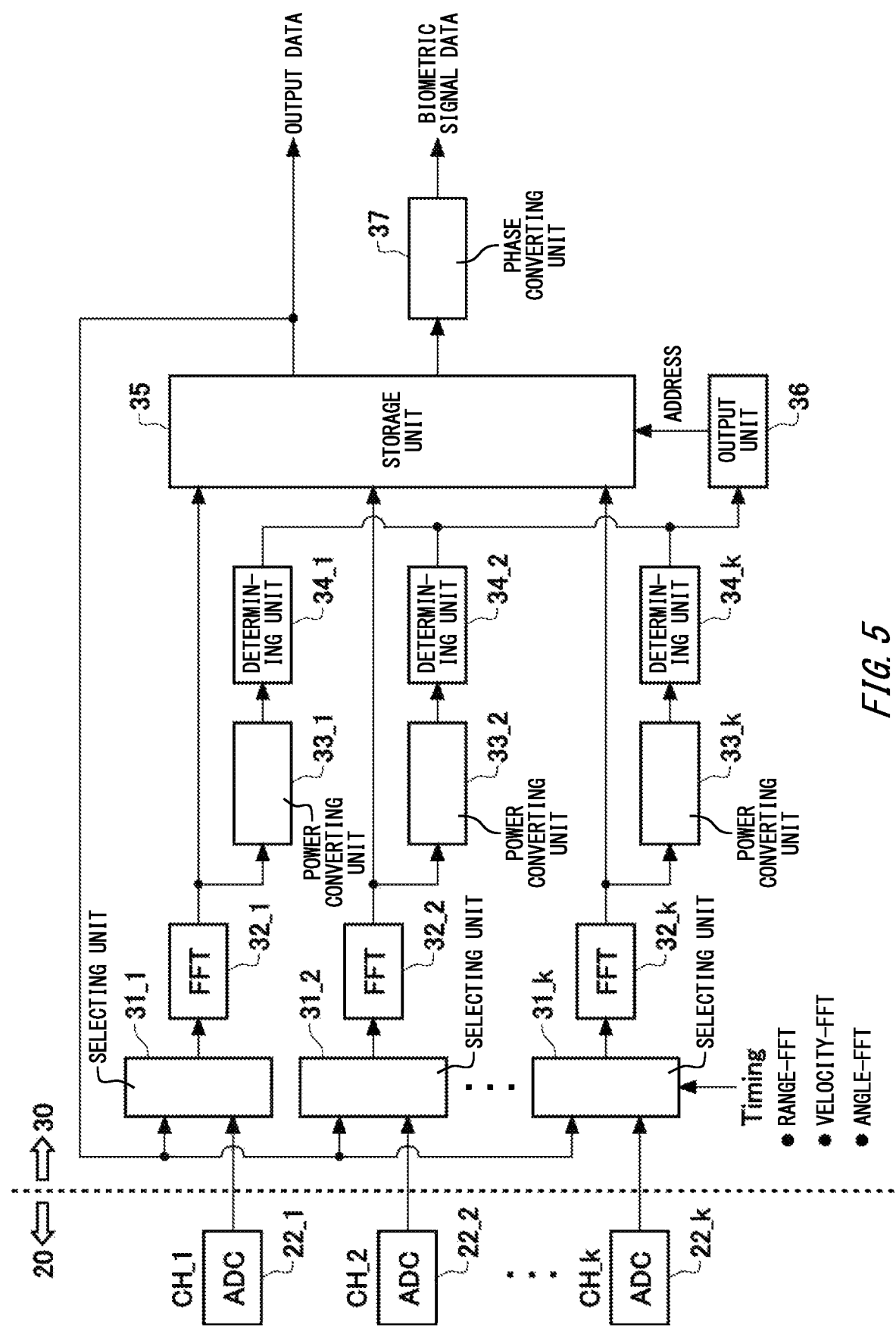
FIG. 5 illustrates an exemplary configuration of a sensor device 100.

FIG. 5 illustrates an exemplary configuration of the sensor device 100. The input unit 20 includes AD converting units 22. The signal processing unit 30 includes selecting units 31, FFT units 32, power converting units 33, determining units 34, a storage unit 35, an output unit 36, and a phase converting unit 37.

An AD converting unit 22 converts an IF signal output by a receiving unit 14 into a digital signal. An AD converting unit 22 may be provided for a set of k channels. The AD converting unit 22 transmits the converted digital reception signal to the signal processing unit 30. The AD converting unit 22 performs AD conversion using n samples when the waveform of a chirp is rising or falling.

A selecting unit 31 receives a digital reception signal obtained through conversion performed by an AD converting unit 22. The selecting unit 31 selects a digital reception signal at a time corresponding to any one of a range-FFT, a velocity-FFT, and an angle-FFT. The selecting unit 31 outputs the selected digital reception signal to an FFT unit 32. The number of selecting units 31 provided is k, corresponding to the k channels. For example, a selecting unit 31 selects a reception signal at a time of a range-FFT, and selects data stored in the storage unit 35 at times of a velocity-FFT and an angle-FFT.

An FFT unit 32 performs an FFT on a digital reception signal output by an AD converting unit 22 or a signal stored in the storage unit 35. The number of FFT units 32 provided is k, corresponding to the k channels. An FFT unit 32 executes any one of a range-FFT, a velocity-FFT, and an angle-FFT depending on data selected by a selecting unit 31.

A power converting unit 33 calculates a power spectrum based on a signal obtained through conversion performed by an FFT unit 32. Calculation of a power spectrum enables identification of the range R, velocity V, and angle θ of a living body 300. The number of power converting units 33 provided is k, corresponding to the k channels.

A determining unit 34 determines a peak position of a power spectrum. Thereby, the determining unit 34 detects the presence of a living body 300. For example, the determining unit 34 determines a BIN having a spectrum level higher than those of surrounding ones. For example, the determining unit 34 executes the constant false alarm ratio (CFAR) process. By executing the CFAR process, the determining unit 34 can separate unnecessary signals such as clutter, and execute more accurate peak BIN identification. The number of determining units 34 provided is k, corresponding to the k channels.

The storage unit 35 stores FFTed signals output by FFT units 32. The storage unit 35 outputs the stored data to a selecting unit 31. In addition, the storage unit 35 may output the stored data to the outside. The storage unit 35 stores a range data sequence having n/2 BINs, a velocity data sequence having m BINs, and an angle data sequence having k BINs. n is the number of ADC samples per chirp, m is the number of chirps per burst, and k is the number of channels.

The output unit 36 selects an address of the storage unit 35 according to a result of output from a determining unit 34.

The address indicated by the output unit 36 may mean peak BIN positions of power spectra of a range, a velocity, and an angle, that is, may be output to the outside as a detection result about the range, velocity, and angle of a living body 300.

The phase converting unit 37 performs phase conversion on a range data sequence, a velocity data sequence, and an angle data sequence obtained as individual FFT results to thereby acquire phase information about the living body 300. The phase converting unit 37 may output, to the outside, biometric signal data which is a sensing result about the living body 300.

Figure 6A:
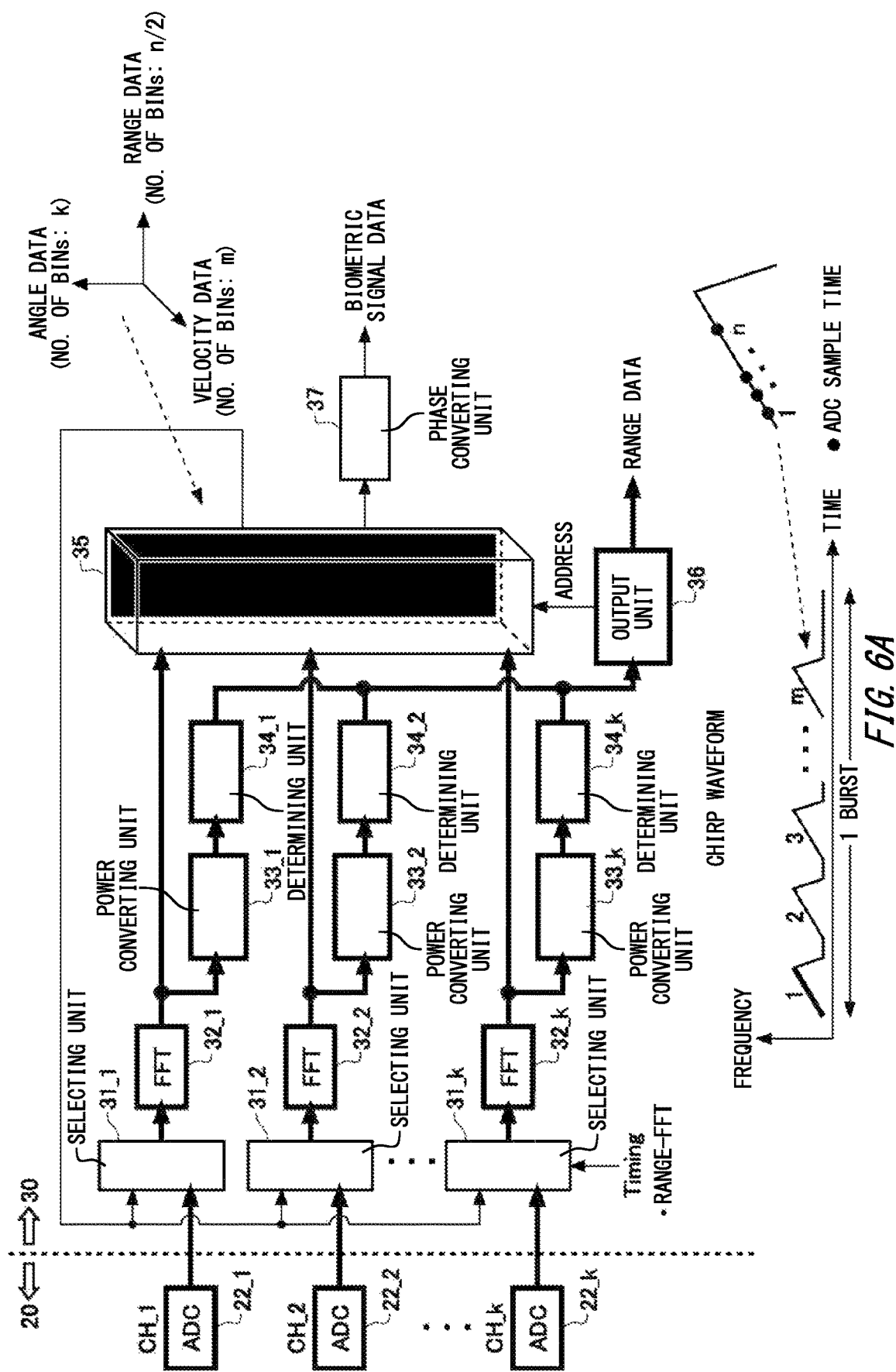
FIG. 6A illustrates an exemplary operation of the sensor device 100 at a time of execution of a range-FFT.

FIG. 6A illustrates an exemplary operation of the sensor device 100 at a time of execution of a range-FFT. The sensor device 100 of the present example acquires an IF signal from a reception wave of an FMCW radar signal, and calculates range data.

An AD converting unit 22 executes AD conversion on the first chirp of m chirps. The number of samples of the AD converting unit 22 is n. ADC sample times are configured such that samples are collected at uniform intervals. A selecting unit 31 selects a signal from the AD converting unit 22, and input the signal to an FFT unit 32.

The FFT unit 32 outputs an FFTed signal to the storage unit 35 and a power converting unit 33. The output unit 36 acquires a peak BIN according to a power spectrum input from a determining unit 34. The output unit 36 outputs range data to the outside.

Figure 6B:
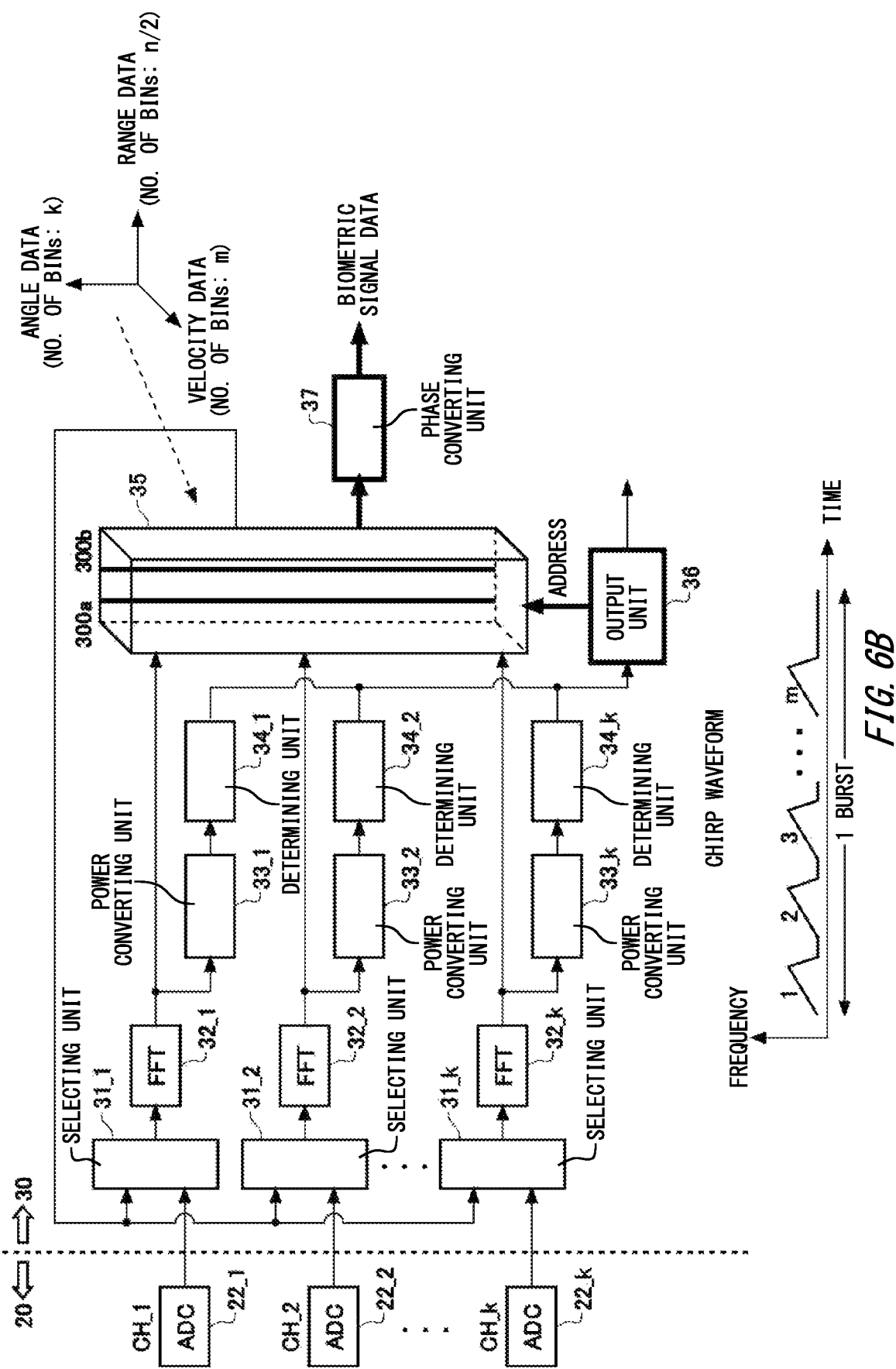
FIG. 6B illustrates an exemplary operation of the sensor device 100 at a time of output of biometric signal data.

FIG. 6B illustrates an exemplary operation of the sensor device 100 at a time of output of biometric signal data. The sensor device 100 of the present example outputs biometric signal data based on a range-FFT on the first chirp.

The output unit 36 outputs, to the storage unit 35, an address corresponding to a peak BIN in a power spectrum based on the first chirp. The storage unit 35 selects the address selected by the output unit 36 as data about a living body 300a and a living body 300b.

The phase converting unit 37 outputs, to the phase converting unit 37, data corresponding to the peak BIN selected by the output unit 36. Phase information obtained through conversion performed by the phase converting unit 37 is equivalent to micro-vibration data about a living body 300. The sensor device 100 of the present example identifies two living bodies 300, the living body 300a and the living body 300b. For example, the sensor device 100 executes detection of a plurality of living bodies 300 simultaneously by distinguishing the plurality of living bodies 300 based on differences in range.

Figure 6C:
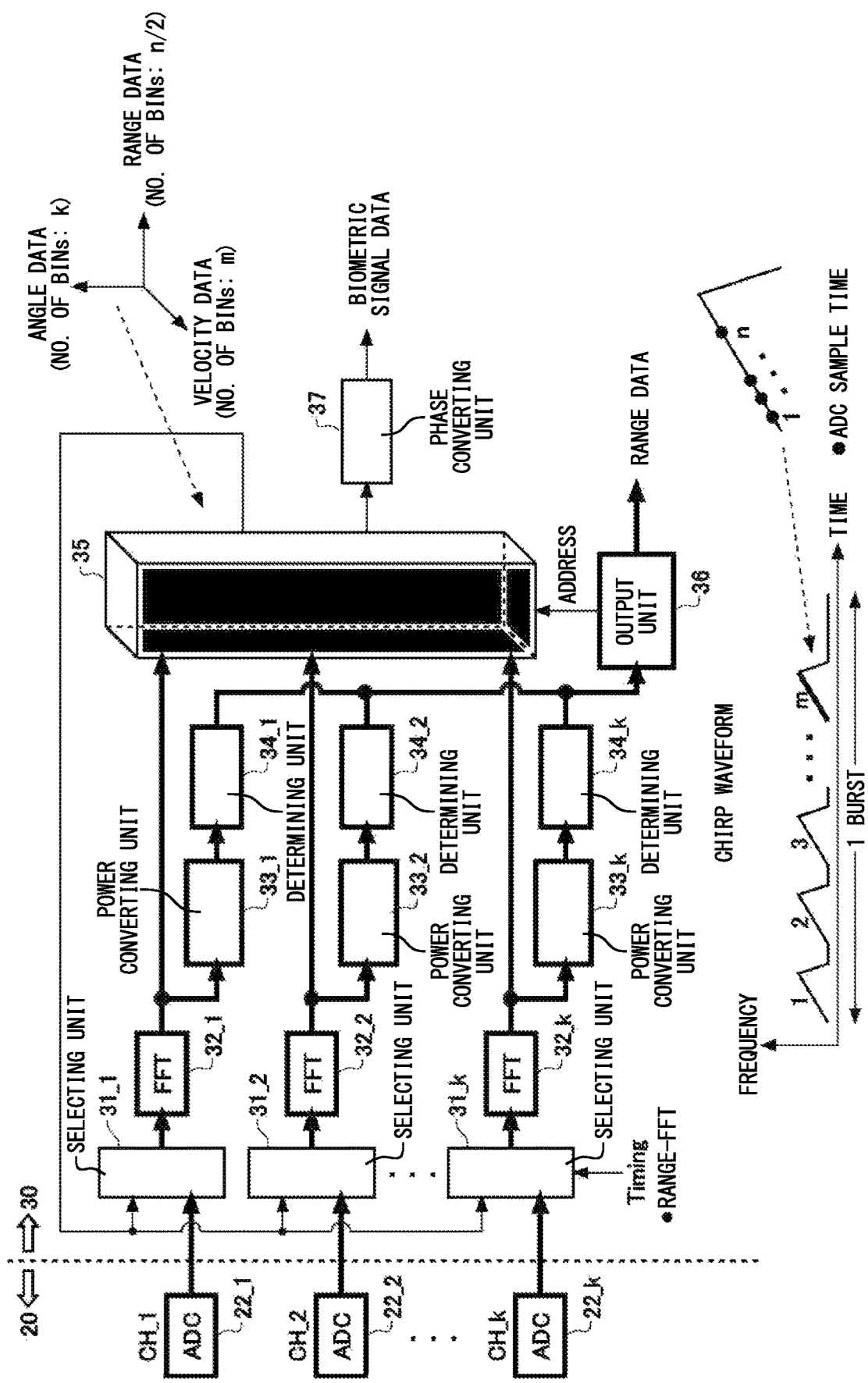
FIG. 6C illustrates an exemplary operation of the sensor device 100 at a time of execution of a range-FFT targeted at a chirp different from a target chirp in FIG. 6A.

FIG. 6C illustrates an exemplary operation of the sensor device 100 at a time of execution of a range-FFT targeted at a chirp different from the target chirp in FIG. 6A. The sensor device 100 of the present example collects samples from an m-th chirp. The m-th chirp is the last chirp in the burst.

The sensor device 100 collects samples from the m-th chirp, and acquires a range data sequence. The sensor device 100 may take the average of arbitrary data sequences among range data sequences of the first chirp to the last chirp in the burst. In addition, the sensor device 100 may take the average of the range data sequences of all the first to m-th chirps in the burst. The sensor device 100 can improve the S/N ratio by using a result of a range-FFT performed on an average data sequence of a plurality of chirps.

Figure 6D:
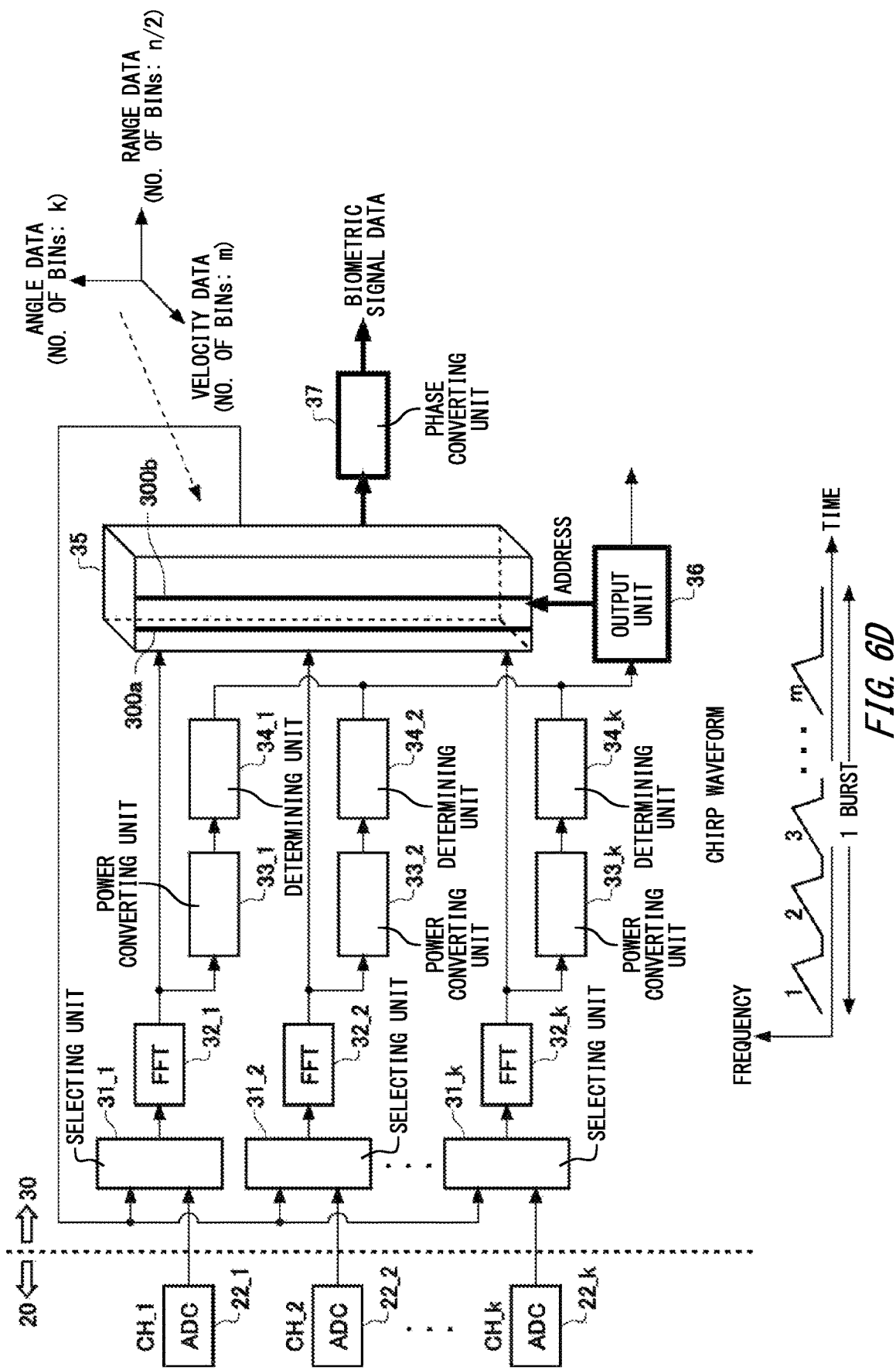
FIG. 6D illustrates an exemplary operation of the sensor device 100 at a time of output of biometric signal data.

FIG. 6D illustrates an exemplary operation of the sensor device 100 at a time of output of biometric signal data. The sensor device 100 of the present example outputs biometric signal data based on a range-FFT on an m-th chirp.

The output unit 36 outputs, to the storage unit 35, an address corresponding to a peak BIN in a power spectrum based on the m-th chirp. The storage unit 35 selects the address selected by the output unit 36 as data about a living body 300a and a living body 300b. The present example is different from the example illustrated in FIG. 6B in that biometric signal data is output based on a range-FFT performed on the m-th chirp.

The sensor device 100 may improve the S/N ratio by taking the average of range data sequences of the chirps 1 to m. For example, the sensor device 100 performs power conversion on data sequences stored in the storage unit 35 after taking the average of the data sequences after the end of the last chirp, and outputs, to the phase converting unit 37, data correspond to a peak BIN of the power spectrum. Phase information obtained through conversion performed by the phase converting unit 37 is equivalent to micro-vibration data about a living body 300.

Figure 7A:
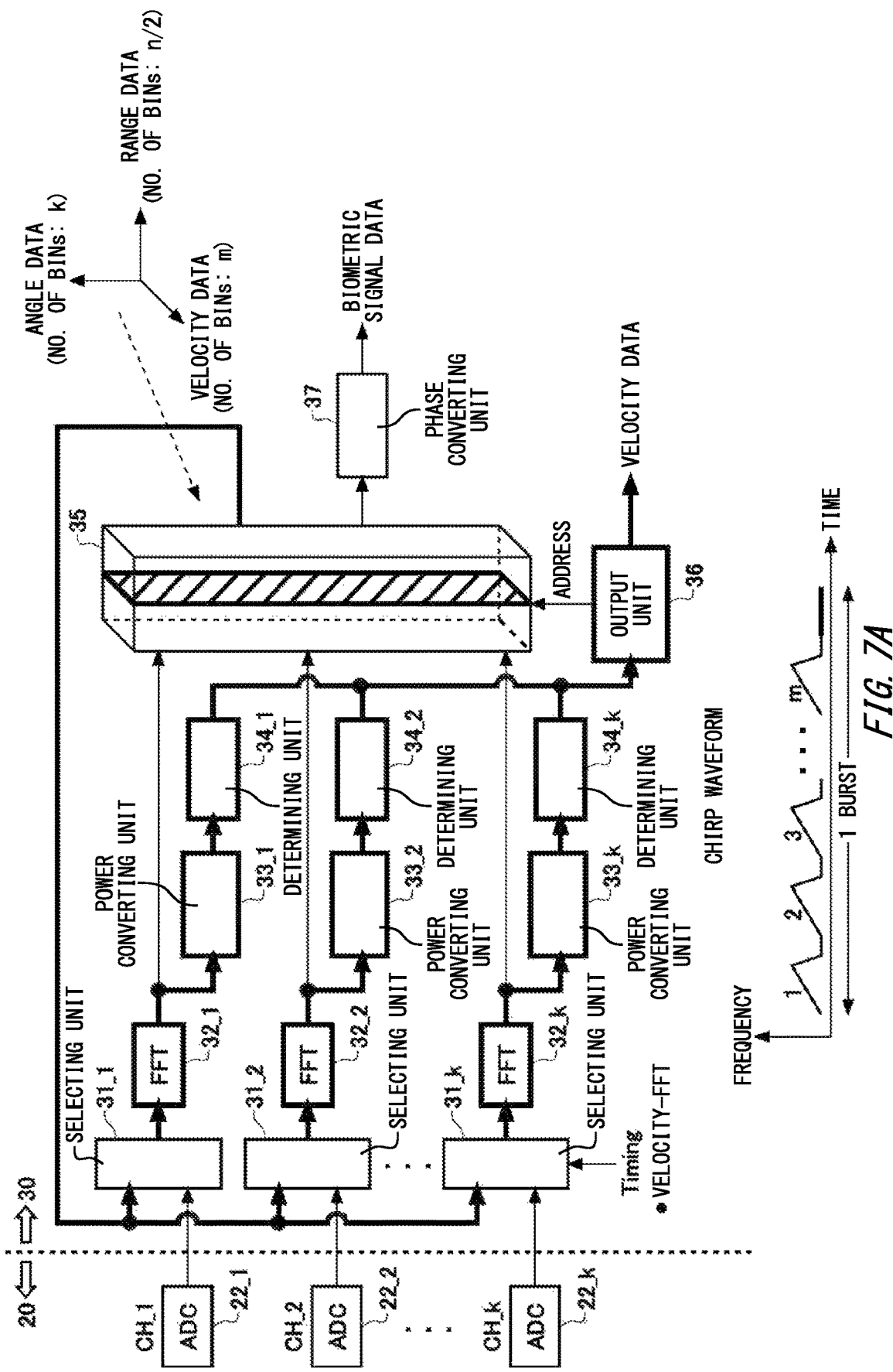
FIG. 7A illustrates an exemplary operation of the sensor device 100 at a time of execution of a velocity-FFT.

FIG. 7A illustrates an exemplary operation of the sensor device 100 at a time of execution of a velocity-FFT. The sensor device 100 executes a velocity-FFT after storing data about the first to m-th chirps in the storage unit 35. That is, the sensor device 100 executes a velocity-FFT after the end of the burst. The sensor device 100 of the present example outputs velocity data from the output unit 36.

The storage unit 35 outputs stored data sequences to a selecting unit 31. The storage unit 35 of the present example outputs, to the selecting unit 31, data corresponding to a peak BIN position of a power spectrum obtained through a range-FFT. The selecting unit 31 outputs, to an FFT unit 32, data input from the storage unit 35. That is, if velocity data is to be output, the selecting unit 31 does not receive a new reception signal from an AD converting unit 22.

In this manner, the sensor device 100 selectively executes a velocity-FFT according to a peak BIN of a power spectrum of a living body 300 identified through a range-FFT. Thereby, the number of pieces of data to be processed at the signal processing unit 30 can be reduced. Note that the sensor device 100 may execute a velocity-FFT on BINs adjacent to a peak BIN, in addition to the peak BIN.

Figure 7B:
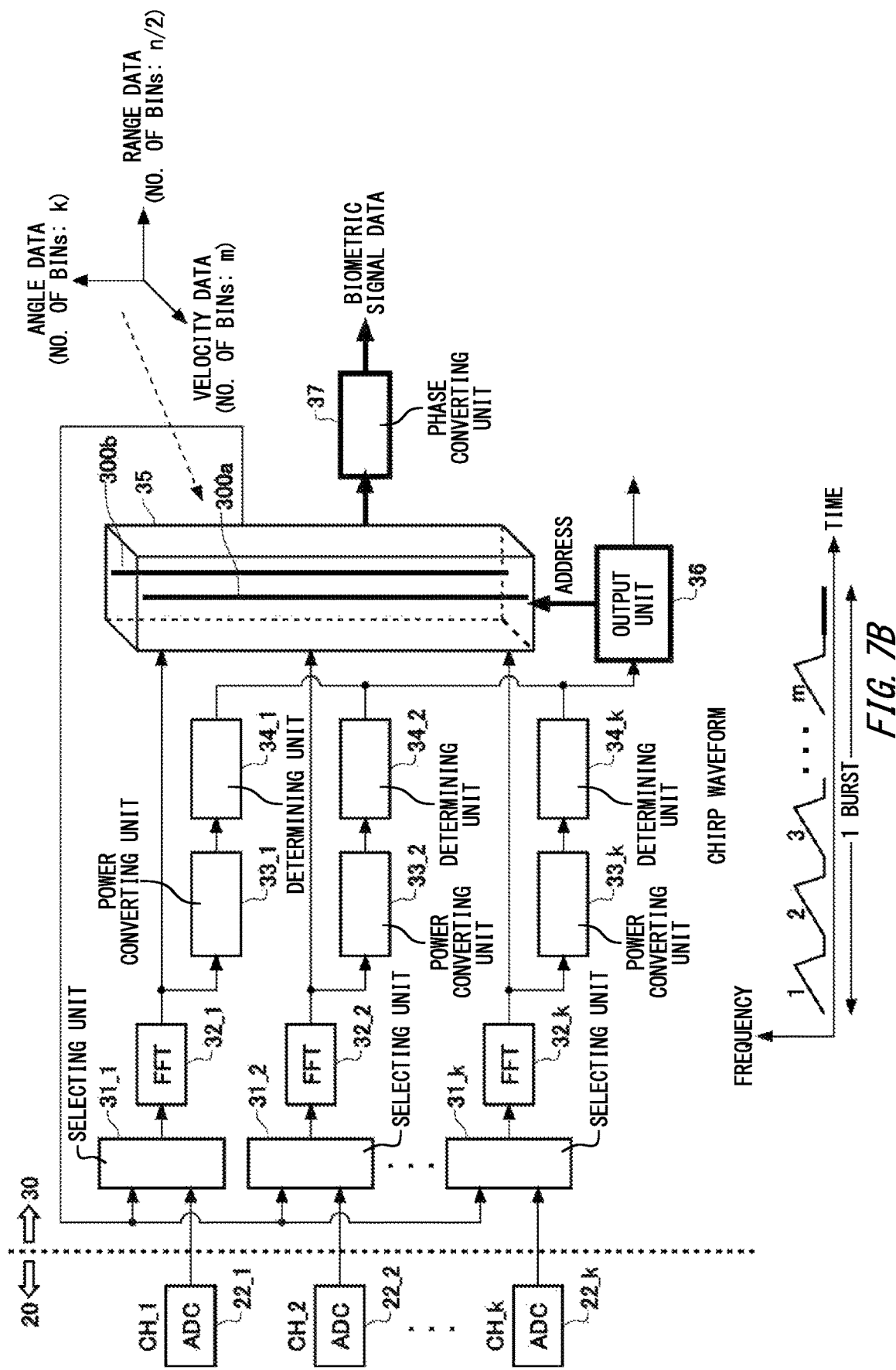
FIG. 7B illustrates an exemplary operation of the sensor device 100 at a time of output of biometric signal data.

FIG. 7B illustrates an exemplary operation of the sensor device 100 at a time of output of biometric signal data. The sensor device 100 of the present example outputs biometric signal data based on a velocity-FFT.

The phase converting unit 37 outputs, to the phase converting unit 37, data corresponding to the peak BIN selected by the output unit 36. Phase information obtained through conversion performed at the phase converting unit 37 is output as biometric signal data to the outside. The sensor device 100 of the present example senses biometric signals of two living bodies 300, the living body 300a and the living body 300b. On the other hand, the sensor device 100 can also execute detection of a plurality of living bodies 300 simultaneously by distinguishing the plurality of living bodies 300 based on differences in velocity.

Figure 8A:
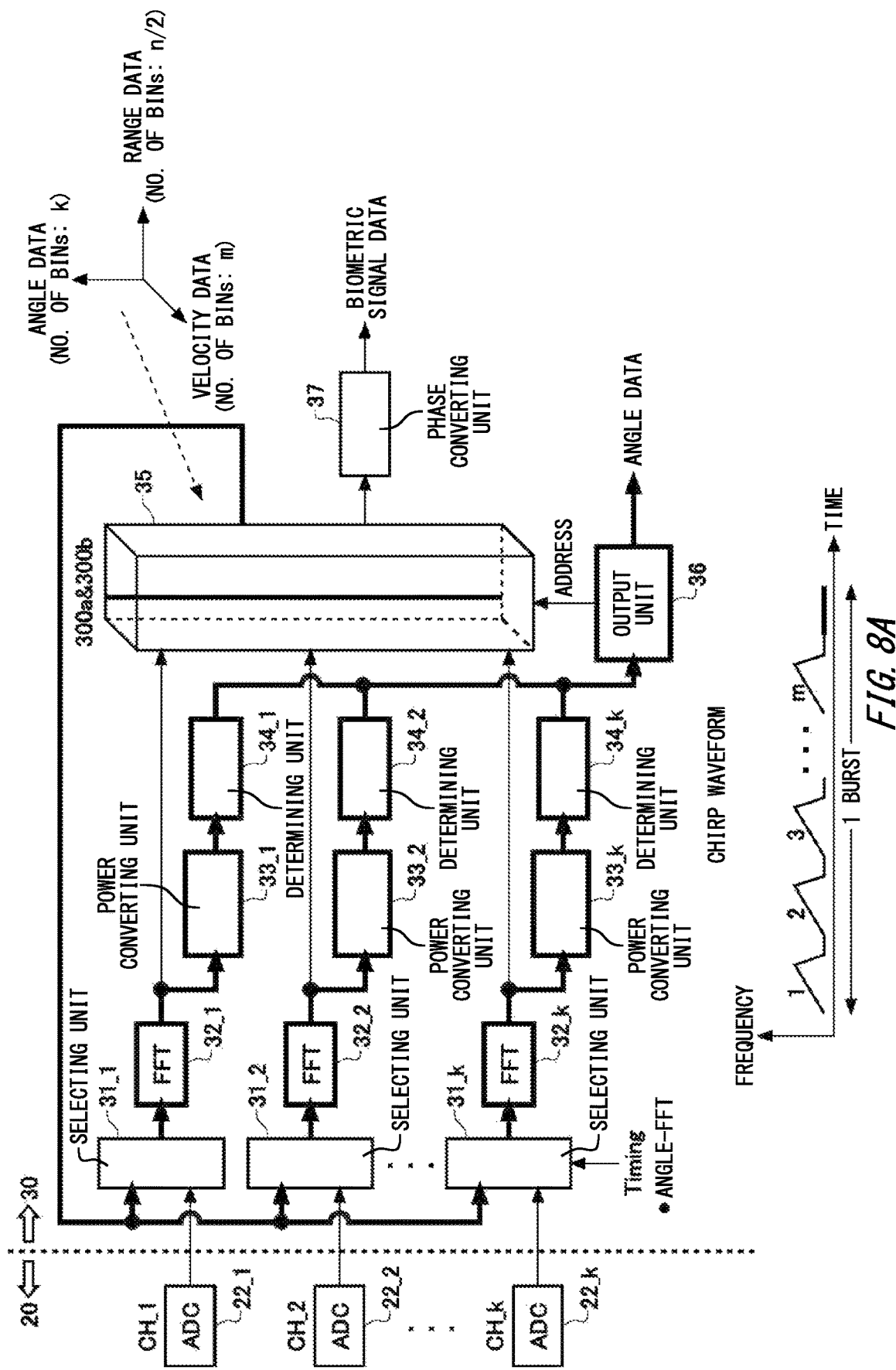
FIG. 8A illustrates an exemplary operation of the sensor device 100 at a time of execution of an angle-FFT.

FIG. 8A illustrates an exemplary operation of the sensor device 100 at a time of execution of an angle-FFT. The sensor device 100 executes an angle-FFT after storing data about the first to k-th channels in the storage unit 35. That is, the sensor device 100 executes an angle-FFT after the end of the burst. The sensor device 100 of the present example outputs angle data from the output unit 36.

The storage unit 35 outputs stored data sequences to a selecting unit 31. The storage unit 35 of the present example outputs, to the selecting unit 31, data about the frequency of a peak BIN of a power spectrum obtained through a range-FFT. The selecting unit 31 outputs, to an FFT unit 32, data input from the storage unit 35. That is, in the present example, the selecting unit 31 does not receive a new digital reception signal from an AD converting unit 22.

In this manner, the sensor device 100 selectively executes an angle-FFT according to a peak BIN of a power spectrum of a living body 300 identified through a range-FFT. Thereby, the number of pieces of data to be processed at the signal processing unit 30 can be reduced. Note that the sensor device 100 may execute an angle-FFT on BINs adjacent to a peak BIN, in addition to the peak BIN.

Figure 8B:
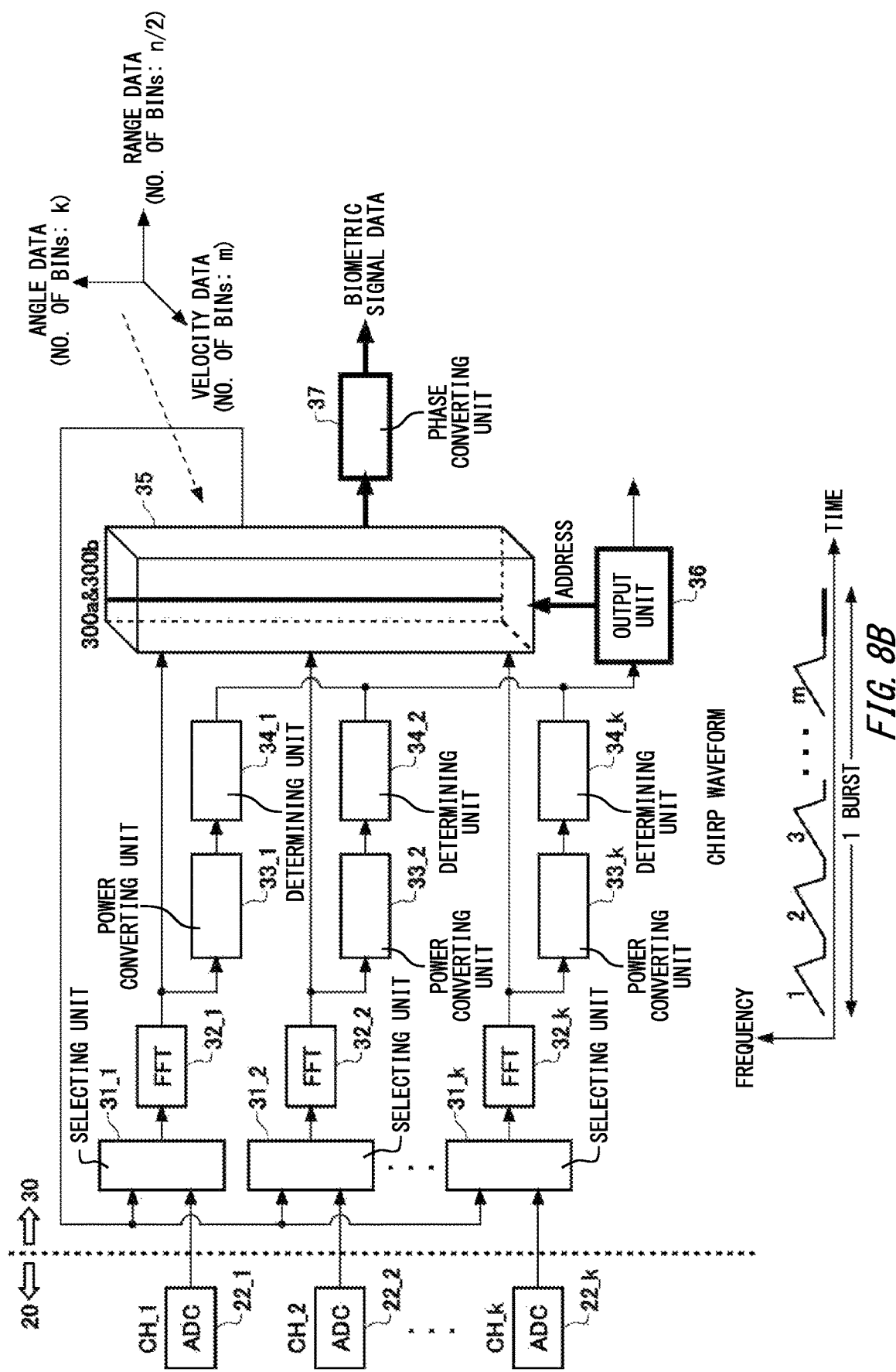
FIG. 8B illustrates an exemplary operation of the sensor device 100 at a time of output of biometric signal data.

FIG. 8B illustrates an exemplary operation of the sensor device 100 at a time of output of biometric signal data. The sensor device 100 of the present example outputs biometric signal data based on an angle-FFT. On the other hand, the sensor device 100 can also execute detection of a plurality of living bodies 300 simultaneously by distinguishing the plurality of living bodies 300 based on differences in angle.

Figure 9A:
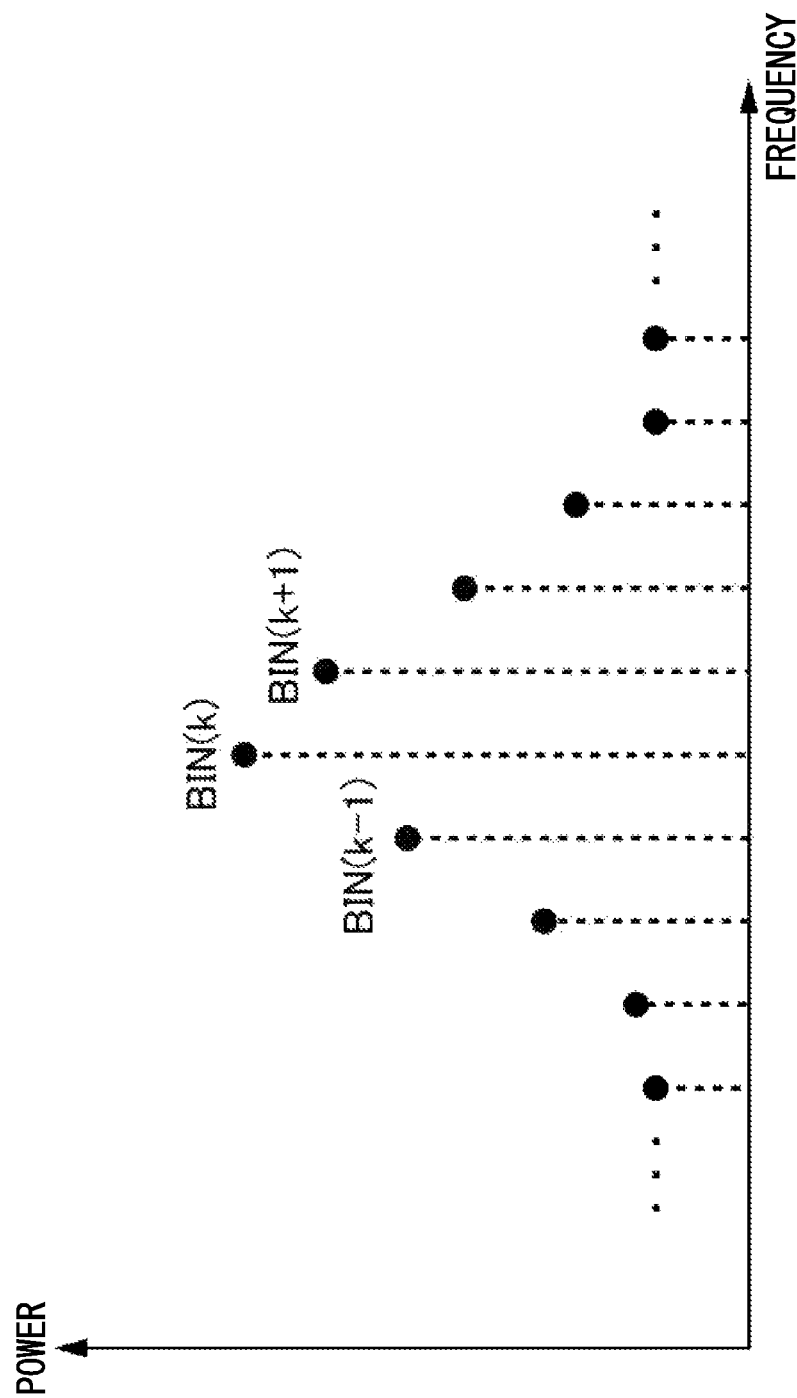
FIG. 9A illustrates a power spectrum of and around a peak BIN.

FIG. 9A illustrates a power spectrum of and around a peak BIN. By using phase information, the sensor device 100 of the present example can track peak BINs even if a living body 300 moves.

Referring back to FIG. 4D again, the BIN position moves from k to k+1 due to a body motion of the living body 300 in some cases, for example. If the BIN position moves in this manner, continuity of phase information is inevitably lost. The following explanation is about a method of preventing loss of continuity of phase information even if such BIN position shift occurs.

The phase converting unit 37 acquires phase information from a reception signal. The phase converting unit 37 acquires phase information about peak-adjacent BINs, in addition to phase information about a peak BIN.

Peak-adjacent BINs are BINs adjacent to the peak BIN before and after the peak BIN. For example, if the peak BIN is BIN(k), the peak-adjacent BINs are BIN(k−1) and BIN(k+1). The sensor device 100 can use not only the peak BIN(k), but also the peak-adjacent BIN(k−1) and peak-adjacent BIN(k+1) as biometric signals of the living body 300.

The phase converting unit 37 monitors the peak BIN, and phase offsets between the peak BIN and the other BINs based on the phase information. A phase offset is a phase difference between the peak BIN and each of the peak-adjacent BINs. The phase converting unit 37 may monitor only the phase offsets between the peak BIN and the adjacent BINs. Since the sensor device 100 is detecting biometric signals of a single living body 300, the phase offsets of the adjacent BINs are basically a constant value.

If the living body 300 moves, the position of the peak BIN moves in some cases. The sensor device 100 tracks the peak BIN of the living body 300 based on phase offsets. For example, if the peak BIN shifted due to a body motion of the living body 300, the sensor device 100 causes the phase monitoring to shift to the peak BIN. In addition, the sensor device 100 can maintain phase continuity by taking into consideration phase offsets that it has monitored up to that point.

Here, a power spectrum of a range-FFT has side lobes of the peak BIN±several BINs due to the effect of noise, window functions, or the like. If the chirp frequency width is defined as $F_{swp}$, the BIN interval in a result of a range-FFT on an FMCW radar signal is expressed by the following formula.

$$\text{BIN interval} = C/(2 \cdot F_{swp})$$

For example, if $F_{swp}$=4 GHz, the BIN interval is 3.75 cm. For example, a chirp cycle in the fast-chirp FMCW method is several microseconds to several hundreds of microseconds. The body motion velocity ($V_{body}$) that generates peak BIN shift corresponding to two BINs is expressed by the following formula.

$$V_{body} = 2 \times 3.75/100 \text{ (cm/}\mu\text{sec)} = 750 \text{ (m/sec)}$$

Accordingly, the sensor device 100 only has to monitor the phases of the previous BIN and following BIN next to a peak BIN, since it is unlikely that there is a body motion velocity that results in peak BIN shift of two BINs. Therefore, the sensor device 100 only has to monitor a peak BIN(k), and a peak-adjacent BIN(k−1) and a peak-adjacent BIN(k+1).

Note that, for example, the phase converting unit 37 calculates phase information about a living body 300 based on range-FFT data. In this case, the phase converting unit 37 may calculate the phase information about the living body 300 based on range-FFT data obtained by taking the average for a plurality of chirps. In addition, the phase converting unit 37 may calculate the phase information about the living body 300 based on velocity-FFT or angle-FFT data. If the phase information about the living body 300 is calculated based on the velocity-FFT or angle-FFT data, the S/N ratio improves more easily since the phase information is based on a plurality of chirps.

The sensor device 100 of the present example calculates, in advance, phase information about peak-adjacent BINs if a peak BIN obtained through a range-FFT shifted during detection due to body motions of one or more living bodies 300 or the like, and avoids phase information becoming discontinuous even if such peak BIN shift occurs. Thereby, the sensor device 100 can detect and sense living bodies 300 accurately even if there are body motions of the living bodies 300.

Even if a living body 300 is stationary (i.e., not generating biometric signals), the sensor device 100 can recognize the living body 300 as a "target which is stationary, and not generating biometric signals", without losing track of the target. For example, the sensor device 100 can also detect sudden changes of a living body 300 whose biometric signals have stopped due to an unexpected situation.

In addition to being able to achieve the original purpose of detecting (the range, velocity, and angle of) an object, the sensor device 100 can also sense biometric signals. For example, if the sensor device 100 is used as a sensor device for an ADAS (Advanced Driver Assistance System) or a self-driving system, it becomes possible to instantaneously classify whether or not a detected object is a living body (e.g., a human, etc.), without requiring complicated signal processing such as image recognition. Thereby, it becomes possible to recognize humans easily, and take earlier action for avoidance in situations such as crossings where non-living bodies such as cars and living bodies (e.g., humans, etc.) are mixedly present. Therefore, serious accidents such as accidents to result in injuries of humans can be prevented before they actually happen.

If the sensor device 100 is used for disaster relief or the like, it becomes possible to easily classify living bodies (humans, etc.) from numerous objects that are buried in earth and sand, snow, collapsed houses, or the like. Thereby, it is possible to make use of the sensor device 100 for rescuing humans at a time of disaster.

If the sensor device 100 is used, elimination of the influence of body motions other than biometric signals, which has been one of drawbacks of contactless biometric sensing, can be achieved easily, and it becomes unnecessary to make ready a superfluous dynamic range. The following explanation is about this feature.

As mentioned above, a BIN interval of a power spectrum of a range-FFT detected by the sensor device 100 is expressed by $C/(2 \cdot F_{swp})$. For example, if $F_{swp}$=4 GHz, the BIN interval is 3.75 cm. That is, if there is movement of 3.75 cm due to a body motion of a living body 300, this leads to movement of a peak BIN position of the power spectrum to an adjacent BIN. If movement between BINs is observed in the operation explained with reference to FIG. 9A, a data sequence to be input to the phase converting unit 37 may be changed according to the peak BIN shift. Thereby, deterioration of the biometric sensing accuracy can be suppressed. In other words, if there is movement of 3.75 cm due to a body motion of a living body 300, it is not necessary to consider it as a result of micro-motions due to biometric signals of the living body 300, but it may be coped with by movement between BINs. This means that the dynamic range for biometric signal detection can be significantly reduced.

For example, the maximum movement area of a living body 300 (i.e., the movement area supposed to be observed in performing biometric sensing) is configured to 10 m, and the resolution of micro-displacement necessary for biometric sensing is configured to 0.01 mm. If the resolution is 0.01 mm, heartbeat and the like can also be detected. In this case, the necessary dynamic range can be calculated in the following manner.

If peak BIN shift due to a body motion is not taken into consideration, the following formula is satisfied.

$$D_{range1}=10 \text{ [m]}/0.01 \text{ [mm]}=1000000 \text{ (120 dB)}$$

If peak BIN shift is taken into consideration, the following formula is satisfied.

$$D_{range2}=3.75 \text{ [cm]}/0.01 \text{ [mm]}=3750 \text{ (72 dB)}$$

Performing biometric sensing by using an FMCW radar is nothing but being able to significantly reduce a necessary dynamic range.

On the other hand, a BIN interval of a power spectrum of a velocity-FFT detected by the sensor device 100 can be calculated by using the following formula.

$$\text{BIN interval} = \pm \frac{c}{2 \cdot f_o \cdot T_c \cdot m} \quad \text{[Formula 11]}$$

Here, c is the velocity of light, f0 is the central frequency of transmission and reception (the central chirp frequency), $T_c$ is the chirp cycle, and m is the number of chirps in one burst. For example, if f0=79 GHz, $T_c$=100 μsec, and m=256, the BIN interval is ±0.074 [m/sec], and this is the resolution of velocity detection for a living body 300.

Figure 9B:
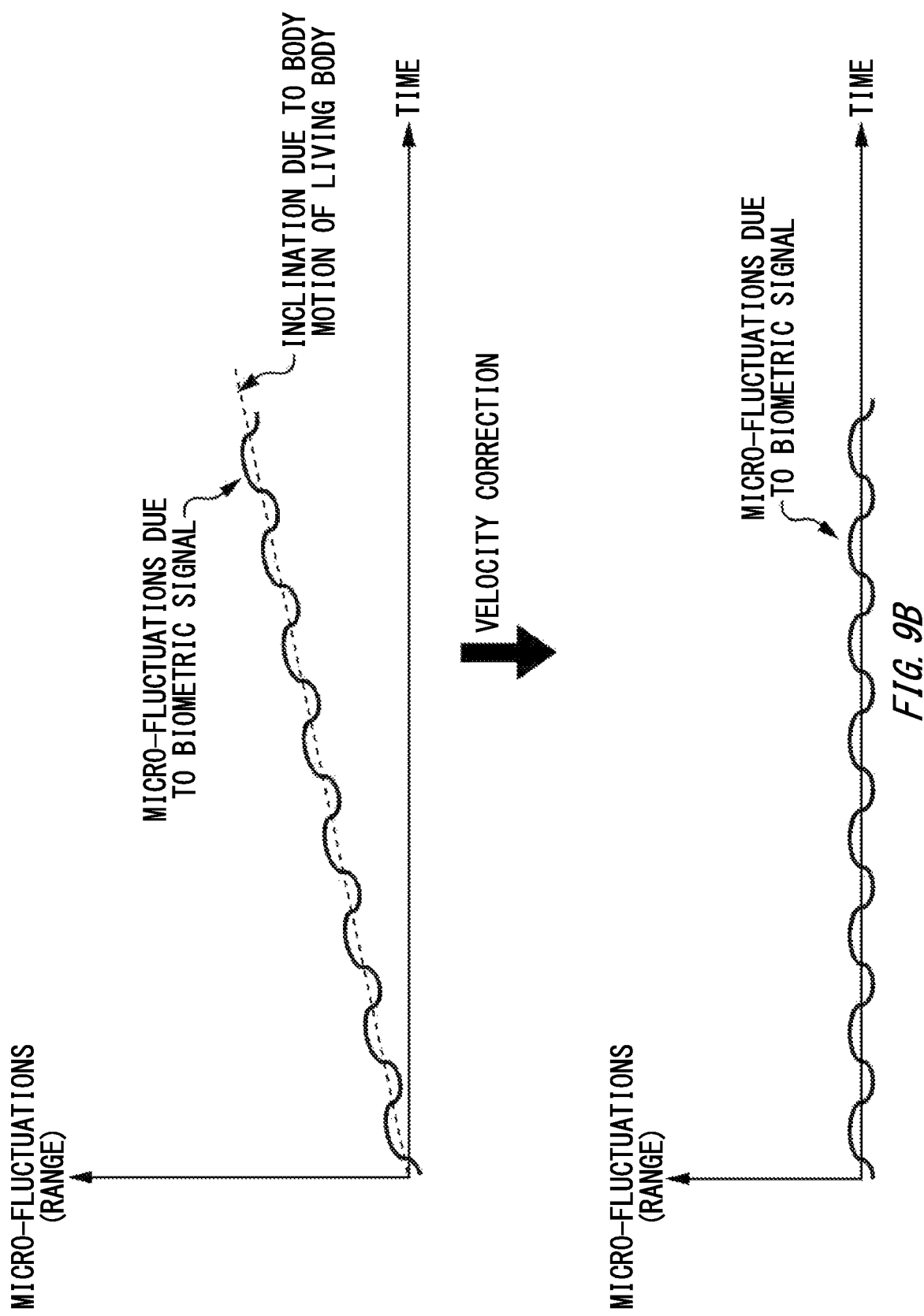
FIG. 9B illustrates a figure illustrating exemplary temporal fluctuations of a biometric signal of a living body 300 making a body motion, and a figure illustrating exemplary temporal fluctuations from which the influence of the body motion is eliminated by correction based on velocity information.

FIG. 9B illustrates a figure illustrating exemplary temporal fluctuations of a biometric signal of a living body 300 making a body motion, and a figure illustrating exemplary temporal fluctuations from which the influence of the body motion is eliminated by correction based on velocity information. FIG. 9B illustrates the concept of reduction of a dynamic range by utilizing velocity information for biometric sensing. Vibrations indicated in the graphs indicate micro-fluctuations due to the living body 300, and the overall inclination indicates a velocity (=range/time) due to a body motion of the living body 300.

For example, if $F_{swp}$=4 GHz (the resolution for range is 3.75 [cm]), and the velocity of a body motion of the living body 300 is 1 [m/sec], the length of time during which movement corresponding to one range BIN occurs as a result of a body motion of the living body 300 is 3.75 [cm]/1 [m/sec]=37.5 [msec]. On the other hand, the range resolution that can be corrected at the velocity resolution of 0.074 [m/sec] in this length of time which is equal to 3.75 [msec] is 37.5 [msec]×0.074 [m/sec]=2.775 [mm]. Since this value is not greater than one wavelength (about 3.8 [mm]) of f0=79 GHz, this means that if velocity information is used for biometric sensing, a necessary dynamic range is that corresponding to one wavelength.

$$D_{range3}=3.8 \text{ [mm]}/0.01 \text{ [mm]}=380 \text{ (52 dB)}$$

Accordingly, if velocity information is utilized for biometric sensing, more significant reduction of a dynamic range can be expected as compared with reduction of a dynamic range realized by using range information for biometric sensing.

Figure 10:
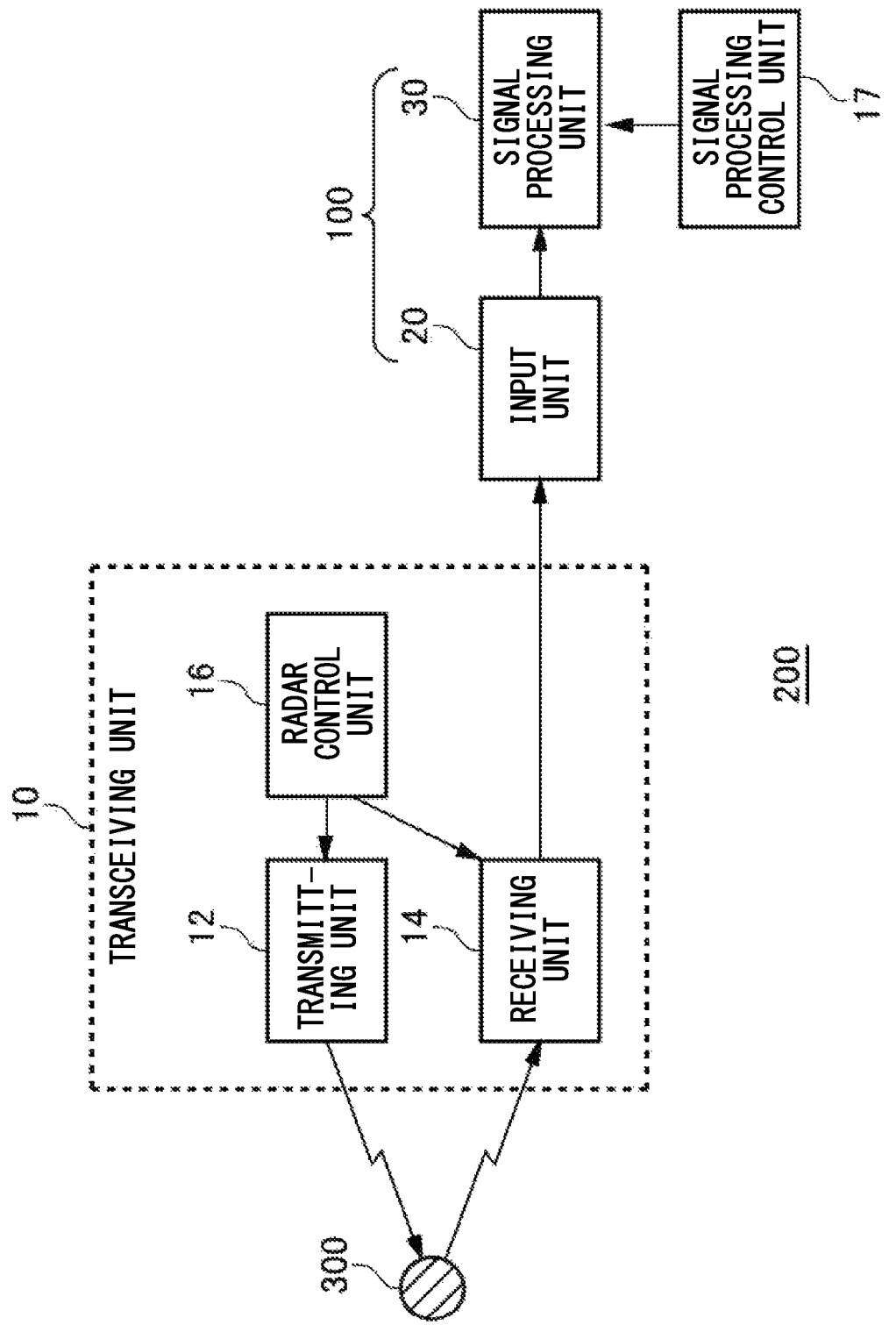
FIG. 10 illustrates an exemplary configuration of the system 200 according to another embodiment.

FIG. 10 illustrates an exemplary configuration of the system 200 according to another embodiment. The system 200 of the present example is different from the system 200 illustrated in FIG. 1A in that a radar control unit 16 at the transceiving unit 10, and a signal processing control unit 17 are provided.

The radar control unit 16 controls the state of transmission of an FMCW radar signal transmitted by the transmitting unit 12, or the state of reception of an FMCW radar signal received by the receiving unit 14.

The radar control unit 16 configures, for the transmitting unit 12, a first FMCW radar condition suited to living body detection. A first FMCW radar has a chirp waveform, transmission power, transmission beamforming or the like appropriate for detecting the range, velocity, and angle of a living body 300. In addition, the radar control unit 16 configures, for the receiving unit 14, a first FMCW radar condition suited to living body detection. The first FMCW radar has reception sensitivity, reception beamforming or the like suited to detecting the living body 300. The radar control unit 16 may change the transmission and reception conditions of the first FMCW radar as appropriate according to a living body 300 to be detected by the sensor device 100. For example, in order to detect a position of a living body that is likely to be present in a large space, the radar control unit 16 configures, for the transmitting unit 12 or the receiving unit 14, a chirp waveform suited to relatively long range detection, relatively high transmission power, relatively high reception sensitivity, beamforming that achieves a detection area with a relatively wide angle or the like.

The signal processing control unit 17 configures, for the signal processing unit 30, a signal processing condition suited to a first FMCW radar condition suited to living body detection. The first FMCW radar has digital beamforming, the number of FFT points, an FFT window function, the average number of individual FFT results, a peak determination condition (e.g., a CFAR condition) or the like appropriate for detecting the range, velocity, and angle of a living body 300. The signal processing control unit 17 may change the signal processing condition of the first FMCW radar as appropriate according to a living body 300 to be detected by the sensor device 100. For example, in order to detect a position of a living body that is likely to be present in a large space, the signal processing control unit 17 configures, for the signal processing unit 30, digital beamforming suited to relatively long range or a relatively large number of detection targets (including also non-living bodies), the number of FFT points, an FFT window condition, an FFT average number, a peak determination condition (e.g., a CFAR condition), or the like.

In addition, the radar control unit 16 configures, for the transmitting unit 12, a second FMCW radar condition suited to biometric sensing. A second FMCW radar has a chirp waveform, transmission power, transmission beamforming or the like appropriate for sensing biometric information about a living body 300. In addition, the radar control unit 16 configures, for the receiving unit 14, a second FMCW radar condition suited to biometric sensing. The second FMCW radar has reception sensitivity, reception beamforming or the like appropriate for sensing biometric information about the living body 300. The radar control unit 16 may change the transmission and reception conditions of the second FMCW radar as appropriate according to a living body 300 to be sensed by the sensor device 100. If it is known that there are a relatively small number of living bodies in relatively short ranges and in a relatively small area, for example, based on the ranges, velocities, and angles of living bodies 300 detected by using the first FMCW radar, the radar control unit 16 configures, for the transmitting unit 12 or the receiving unit 14, a chirp waveform, transmission power, reception sensitivity, beamforming or the like suited to them, as conditions of the second FMCW radar.

The signal processing control unit 17 configures, for the signal processing unit 30, a signal processing condition suited to a second FMCW radar condition suited to biometric sensing. The second FMCW radar has digital beamforming, the number of FFT points, an FFT window function, the average number of individual FFT results, a peak determination condition (e.g., a CFAR condition) or the like appropriate for sensing biometric information about a living body 300. The signal processing control unit 17 may change the signal processing condition of the second FMCW radar as appropriate according to a living body 300 to be detected by the sensor device 100. If it is known that there are a relatively small number of living bodies in relatively short ranges and in a relatively small area, for example, based on the ranges, velocities, and angles of living bodies 300 detected by using the first FMCW radar, the signal processing control unit 17 configures, for the signal processing unit 30, digital beamforming, the number of FFT points, an FFT window condition, an FFT average number, a peak determination condition (e.g., a CFAR condition), or the like suited to them, as the configuration of the second FMCW radar.

The sensor device 100 of the present example detects, under an FMCW radar condition suited to living body detection, the ranges R, velocities V, and angles θ of one or more living bodies 300 present in a large space, and then senses a living body 300 recognized as a living body 300 under an FMCW radar condition suited to biometric sensing. Thereby, the sensor device 100 can more accurately acquire biometric signals of one or more living bodies 300 that are present in a larger detection region.

FIG. 11 is a figure for explaining an exemplary FMCW radar condition suited to detection and sensing of a living body 300. The sensor device 100 performs detection and sensing under two types of FMCW radar conditions which are a first FMCW radar condition and a second FMCW radar condition.

Differences between the first FMCW radar condition and the second FMCW radar condition are explained by presenting one example. As mentioned above, the first FMCW radar condition is configured such that it is suited to detection of a relatively large number of detection targets (including non-living bodies) that are present in a relatively large space. The second FMCW radar condition is configured such that it is suited to sensing of biometric signals of a relatively small number of living bodies that are present in a relatively small space among living bodies detected under the first FMCW radar condition.

As compared with the second FMCW radar condition, under the first FMCW radar condition, a chirp waveform is configured for a relatively long range, a relatively low range resolution, and a relatively low velocity resolution, and a chirp frequency width is configured to be narrow, a chirp cycle is configured to be long, and the number of chirps in one burst is configured to be small. As compared with the second condition, under the first condition, transmission power and reception sensitivity are configured to be high transmission power, and high reception sensitivity (both lead to high power consumption). As compared with the second condition, under the first condition, beamforming is configured for a lower directionality and a large area. As compared with the second condition, under the first condition, signal processing is configured to be performed by using a small number of FFT points, and a CFAR calculation method suited to a large number of detection targets is configured.

Note that the sensor device 100 may configure the same condition for the first FMCW radar condition and the second FMCW radar condition. For example, if a relatively small number of detection targets and living bodies are present in a relatively small and limited space, it is unnecessary to bother to configure different conditions for the first FMCW radar condition and the second FMCW radar condition.

FIG. 12 illustrates an exemplary configuration of the transmitting unit 12. The transmitting unit 12 includes an FMCW generating unit 40, phase shifters 41, power amplifiers 42, and transmit antennas 43. The transmitting unit 12 has p channels. p is an integer not smaller than two.

The FMCW generating unit 40 generates a transmission wave of an FMCW radar. The FMCW generating unit 40 inputs the generated transmission wave to the p phase shifters 41.

A phase shifter 41 adjusts the phase of the input transmission wave under control of the radar control unit 16. The number of phase shifters 41 provided is p, corresponding to the number of channels of the transmitting unit 12.

A power amplifier 42 amplifies the power of output from a phase shifter 41. The number of power amplifiers 42 provided is p, corresponding to the p phase shifters 41.

A transmit antenna 43 emits a transmission wave into the air. The number of transmit antennas 43 provided is p, corresponding to the p power amplifiers 42. Transmission waves emitted from the p transmit antennas 43 are combined in the air, and head to a target. The directionality of the transmission waves such as emission direction and radiation width is controlled based on phases controlled by the phase shifters 41. In this manner, control on the directionality of the transmission waves at the transmitting unit 12 is called transmission beamforming.

Note that although in the present example explained, the transmitting unit 12 has p channels, it can be considered that a single beam is formed after emission of the transmission waves into the air. That is, by considering that a single transmission wave is emitted from the transmitting unit 12 having p channels, it can be considered also that the transmitting unit 12 has only one channel.

For example, the radar control unit 16 shifts the phase of the phase shifter 41_2 by 10° relative to the phase of the phase shifter 41_1, and moreover shifts the phase of the phase shifter 41_$p$ by (+10°×p). Thereby, the radar control unit 16 can control emission angles such that they are shifted in the direction of +10° as compared to emission in the case where the phases of all the phase shifters 41 are the same (i.e., directionality can be given to them). Note that that the phases of all the phase shifters 41 are the same means that their phase shift is 0°.

In addition, for example, in the p phase shifters 41, the phase shifter 41_(p/2+1) is shifted by +Y° relative to the phase of the middle phase shifter 41_(p/2), and moreover the phase of the phase shifter 41 (p/2+X) is shifted by +Y°×(X). Furthermore, the radar control unit 16 shifts the phase of the phase shifter 41_(p/2−1) by −Y°, and shifts the phase of the phase shifter 41 (p/2−X) by −Y°×(X). Thereby, the radar control unit 16 can realize directionality with a wide radiation width as compared to emission in the case where the phases of all the phase shifters 41 are the same.

In this manner, the transmitting unit 12 can change the condition of an FMCW radar by transmission beamforming. For example, as the second FMCW radar condition for biometric sensing, the transmitting unit 12 executes beamforming which gives directionality with a narrower angle as compared to that under the first FMCW radar condition, and in a direction in which a living body is detected.

In addition, the radar control unit 16 may control the p power amplifiers 42. For example, the radar control unit 16 realizes relatively long range living body detection by emission with a larger power amplification amount, as the first FMCW radar condition. On the other hand, the radar control unit 16 adjusts the power amplification amount of a power amplifier 42 according to a detection result about a living body 300. For example, if a living body 300 is detected in a relatively short range, as the second FMCW radar condition, the radar control unit 16 causes an FMCW radar signal to be emitted with a power amplification amount smaller than that under the first FMCW radar condition. Thereby, the transmitting unit 12 can sense a living body 300 located in a relatively short range while reducing power consumption.

Figure 13:
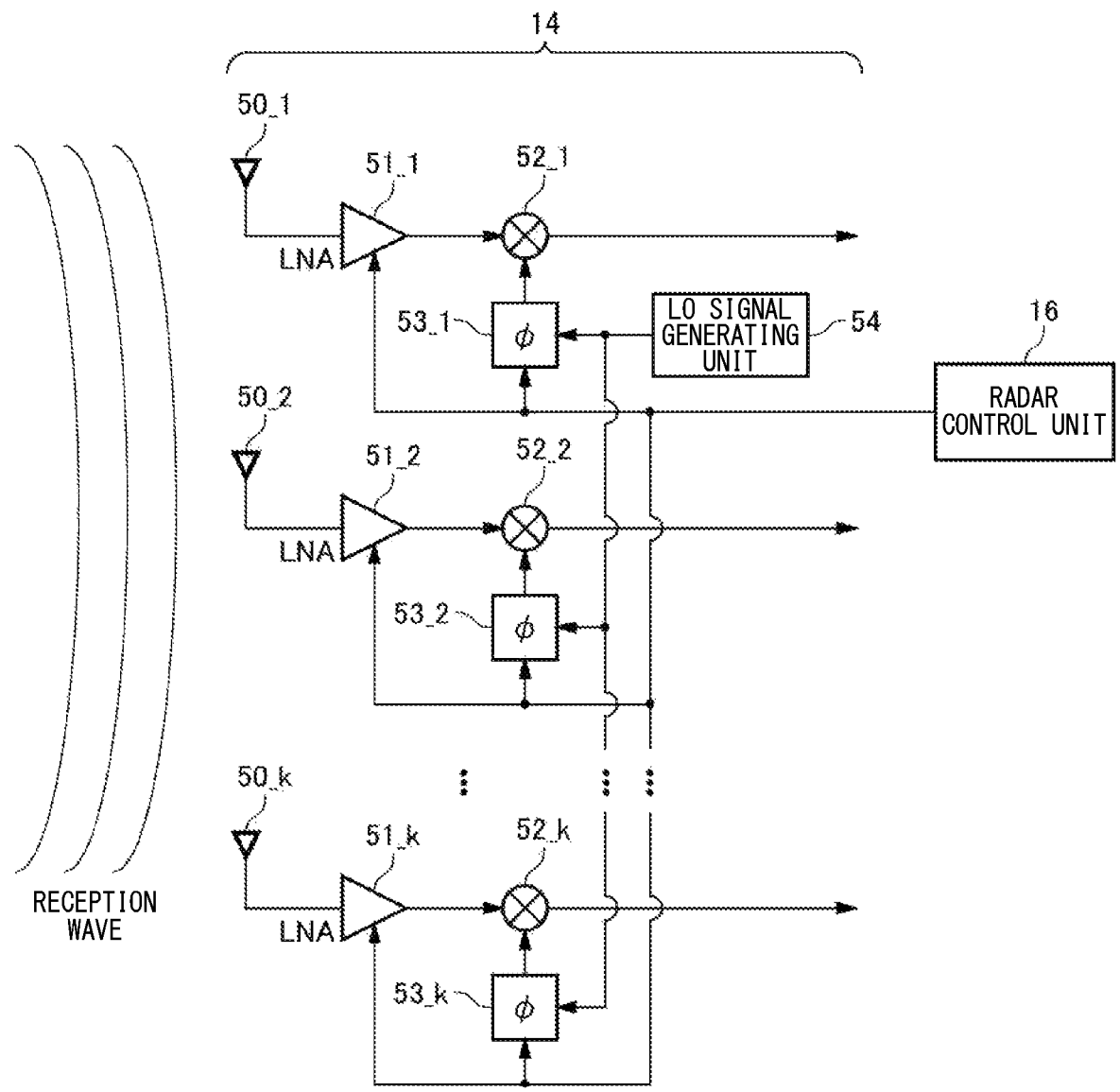
FIG. 13 illustrates an exemplary configuration of a receiving unit 14.

FIG. 13 illustrates an exemplary configuration of the receiving unit 14. The receiving unit 14 includes receive antennas 50, LNAs 51, mixers 52, phase shifters 53, and an LO signal generating unit 54. The receiving unit 14 has k channels. k is an integer not smaller than two.

A receive antenna 50 receives a reception wave which is a reflected wave of an FMCW radar signal off a living body 300. k receive antennas 50 are arrayed at arbitrary intervals. The receive antenna 50 outputs a reception wave to an LNA 51.

The LNAs 51 are low noise amplifiers (LNAs). The number of LNAs 51 provided is k, corresponding to the k receive antennas 50. Note that the receiving unit 14 may not have the LNAs 51, but may directly input reception waves to the downstream mixers 52.

A mixer 52 mixes a reception wave with output from a phase shifter 53. The number of mixers 52 provided is k, corresponding to the k LNAs 51. The mixer 52 mixes a reception wave with output from a phase shifter 53 to thereby down-convert to the reception wave to an IF signal.

A phase shifter 53 adjusts the phase of an LO signal from an LO signal generating unit 54 based on control by the radar control unit 16. The radar control unit 16 can control the directionality of reception waves by appropriately controlling a phase shifter 53. In this manner, control on the directionality of reception waves at the receiving unit 14 is called reception beamforming.

For example, the radar control unit 16 shifts the phase of the phase shifter 53_2 by +10° relative to the phase of the phase shifter 53_1, and moreover shifts the phase of the phase shifter 53_p by (+10°×p). Thereby, the radar control unit 16 can control reception angles such that they are shifted in the direction of +10° as compared to emission in the case where the phases of all the phase shifters 53 are the same (i.e., directionality can be given to them). Note that that the phase of all the phase shifters 53 are the same means that their phase shift is 0°.

In this manner, the receiving unit 14 can change the condition of an FMCW radar by reception beamforming. For example, as the second FMCW radar condition for biometric sensing, the receiving unit 14 executes beamforming which gives higher directionality in a direction in which a living body is detected, as compared to that under the first FMCW radar condition.

In addition, the radar control unit 16 may control the k LNAs 51. For example, the radar control unit 16 realizes relatively long range living body detection by reception with a higher amplification ratio (i.e., reception sensitivity), as the first FMCW radar condition. On the other hand, the radar control unit 16 adjusts the amplification ratio of an LNA 51 according to a detection result about a living body 300. For example, if a living body 300 is detected in a relatively short range, as the second FMCW radar condition, the radar control unit 16 causes a reception wave to be received at an amplification ratio lower than that under the first FMCW radar condition. Thereby, the receiving unit 14 can sense a living body 300 located in a relatively short range while reducing power consumption.

Figure 14:
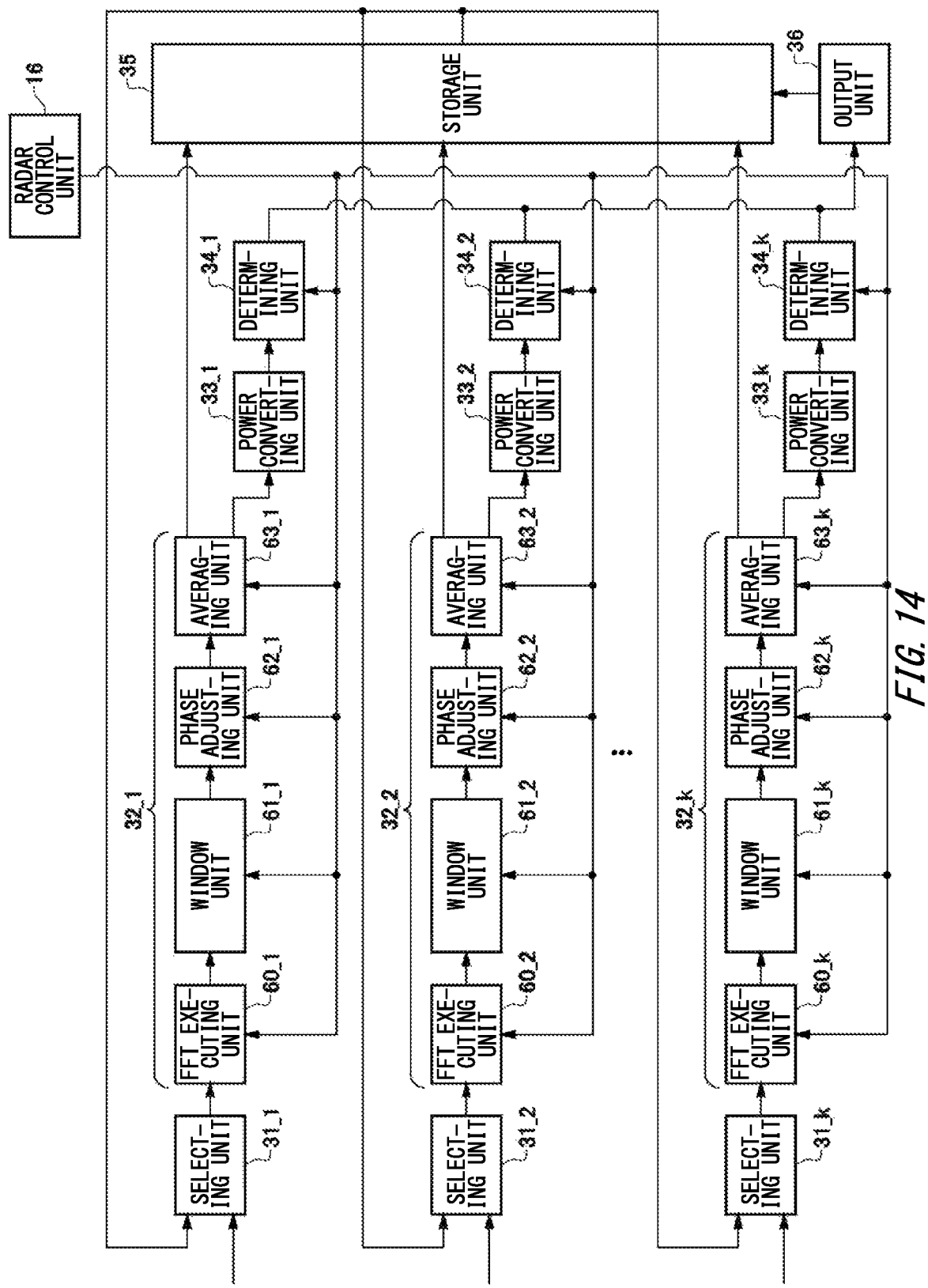
FIG. 14 is a specific exemplary configuration of a signal processing unit 30.

FIG. 14 is a specific exemplary configuration of the signal processing unit 30. The signal processing unit 30 includes, as an FFT unit 32, an FFT executing unit 60, a window unit 61, a phase adjusting unit 62, and an averaging unit 63.

A selecting unit 31 selects either one of an AD-converted IF signal, and a data sequence selected from the storage unit 35. k selecting units 31 input selected signals to k FFT executing units 60.

The FFT executing unit 60 performs an FFT on an input signal. The window unit 61 performs window processing on the FFTed signal. Although the window unit 61 is provided downstream of the FFT executing unit 60, it may be provided upstream of the FFT executing unit 60. That is, the FFT executing unit 60 may perform an FFT on a signal having been subjected to window processing at the window unit 61.

The phase adjusting unit 62 performs digital phase adjustment on a signal having been subjected to window processing. The averaging unit 63 performs averaging processing on an input signal. The averaging unit 63 transmits a signal having been subjected to averaging processing to the storage unit 35 or a power converting unit 33. The output unit 36 may use an output signal from a determining unit 34 as an address signal at a time of data selection at the storage unit 35.

The radar control unit 16 may control operations of each of the k FFT executing units 60, k window units 61, k phase adjusting units 62, k averaging units 63, and k determining units 34. For example, the radar control unit 16 controls the number of FFT points at the FFT executing units 60. The radar control unit 16 realizes longer-range detection by increasing the number of FFT points, if the chirp frequency width is constant.

The radar control unit 16 controls the number of FFT points as an FMCW radar condition. For example, as the first FMCW radar condition, the radar control unit 16 configures a larger number of FFT points as compared with that under the second FMCW radar condition. Thereby, a living body 300 positioned in a long range is detected. In addition, the radar control unit 16 can realize sensing of a living body 300 positioned in a short range by configuring, as the second FMCW radar condition, a smaller number of FFT points than that under the first FMCW radar condition.

Figure 15:
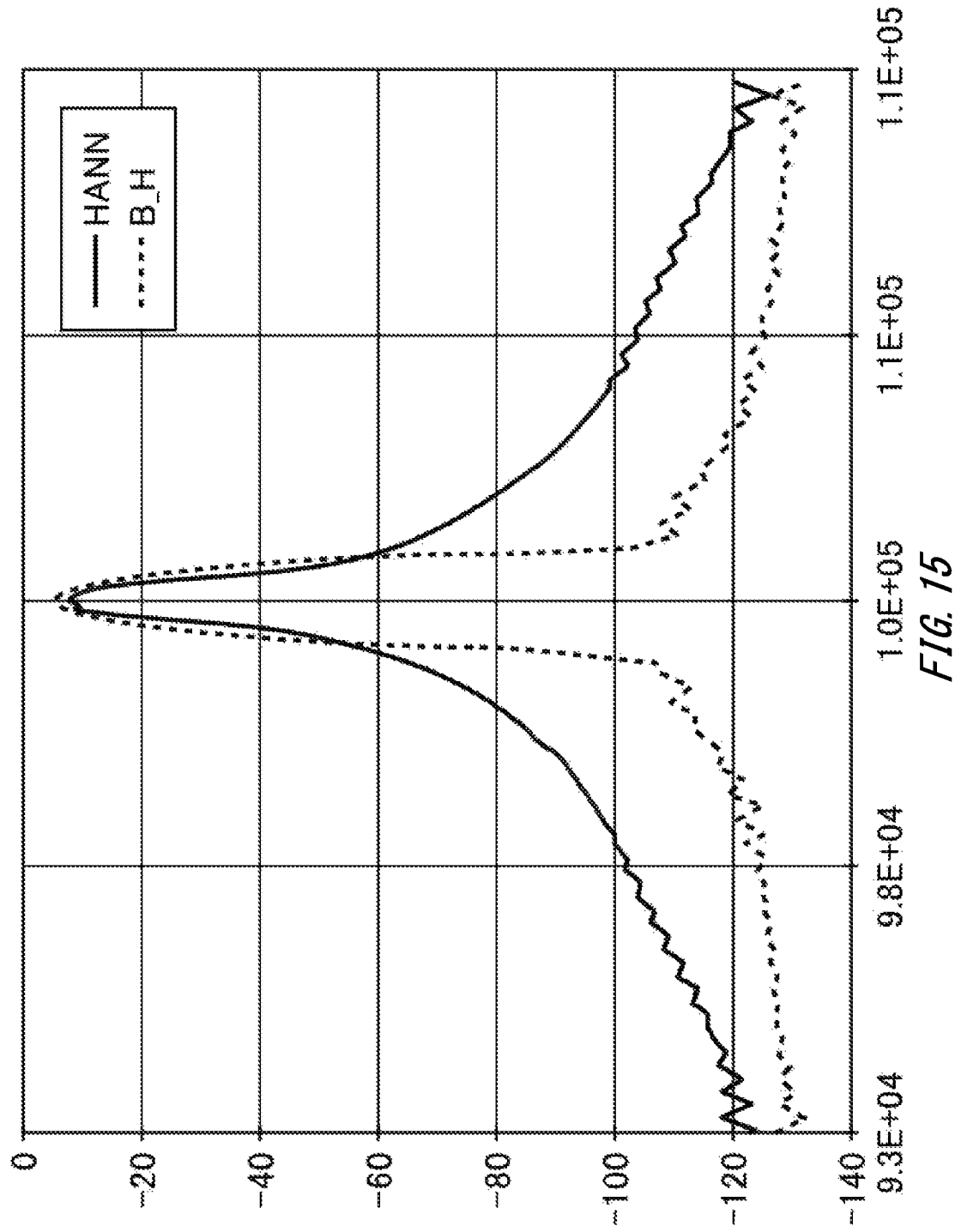
FIG. 15 illustrates differences between power spectra resulting from two window processing methods.

FIG. 15 illustrates differences between power spectra resulting from two window processing methods. A method of window processing by a window unit 61 may be controlled by the radar control unit 16. In the present example, a process using the Hann window and a process using the B_H (Blackman_Harris) window are compared. For example, the Hann window has narrower side lobes around a peak, but has a higher floor noise level at locations apart from the peak, as compared to the B_H window.

As an FMCW radar condition, the radar control unit 16 may control a method of a process performed by the window unit 61. For example, the radar control unit 16 uses the Hann window as the first FMCW radar condition, and uses the B_H window as the second FMCW radar condition. Thereby, the sensor device 100 can detect a living body 300 by making side lobes narrow as much as possible in a situation where there are a large number of targets. In addition, the sensor device 100 can sense a living body 300 while reducing floor noise, although this limits the number of targets.

In addition, the radar control unit 16 may digitally shift phases in an FFT result of each channel by controlling the phase adjusting unit 62. In this manner, to digitally shift a phase, and give reception directionality as a result of it is called digital beamforming. The radar control unit 16 regards digital beamforming as an FMCW radar condition, and controls the phase adjusting unit 62, similar to reception beamforming. For example, as the second FMCW radar condition, the radar control unit 16 executes beamforming which give higher directionality in a direction in which a living body is detected, as compared to that under the first FMCW radar condition.

The radar control unit 16 may adjust the data average number by controlling the averaging unit 63. The radar control unit 16 regards the average number as an FMCW radar condition, and may improve the S/N ratio by increasing the average number for detecting a living body located at a relatively long range, as the first FMCW radar condition. For example, after a living body 300 is detected in a relatively short range, as the second FMCW radar condition, the radar control unit 16 reduces the average number as compared to that under the first FMCW radar condition. Thereby, the length of time required for signal processing can be made short.

Figure 16:
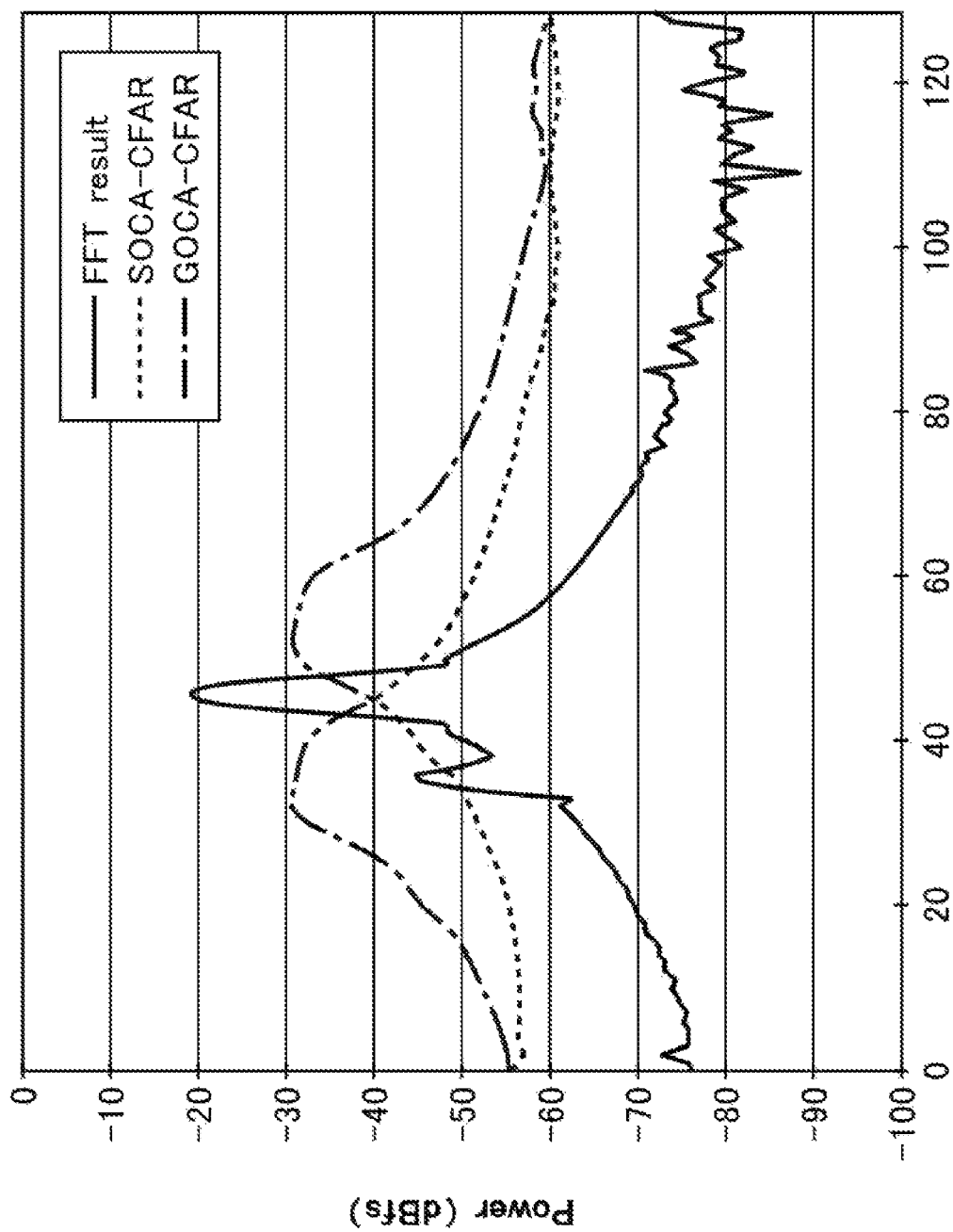
FIG. 16 illustrates results of CFAR judgement performed by using different CFAR conditions.

FIG. 16 illustrates results of CFAR judgement performed by using different CFAR conditions. The radar control unit 16 changes the CFAR condition by controlling a determining unit 34. In the present example, two CFAR conditions, SOCA-CFAR (Smallest Of Cell Averaging CFAR) and GOCA-CFAR (Greatest Of Cell Averaging CFAR), are used.

FFT result is an exemplary power spectrum result. FIG. 16 illustrates a result of judgement about threshold for the presence or absence of a target under two types of CFAR condition. In SOCA-CFAR, the threshold level becomes lower around a spectrum peak than in GOCA-CFAR. As a result, there is a level higher than the threshold even for a small peak located apart a little from a large peak. That is, it is judged that there is a target.

In this manner, the sensor device 100 may regard the CFAR condition as an FMCW radar condition, and adjust the CFAR condition. If the sensor device 100 selects SOCA-CFAR as the first FMCW radar condition, it can detect a relatively large number of targets that are present in a relatively large space without missing any of them. In addition, if the sensor device 100 selects GOCA-CFAR as the second FMCW radar condition, it can sense a limited number of living bodies.

Second Embodiment

Figure 17:
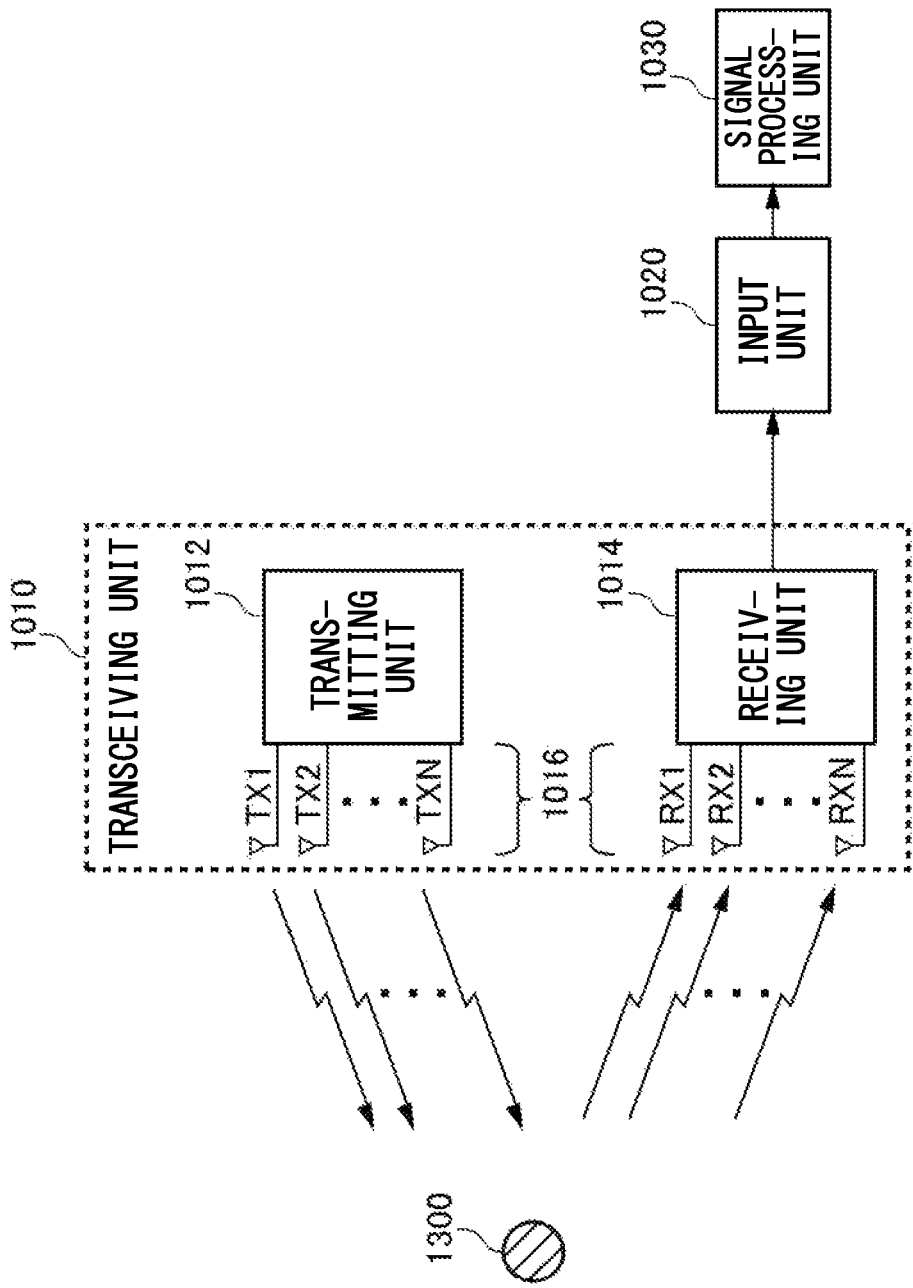
FIG. 17 illustrates main points of the configuration of a sensor device 1100 according to a first embodiment.

FIG. 17 illustrates main points of the configuration of a sensor device 1100 according to a first embodiment. The sensor device 1100 includes a transceiving unit 1010, an input unit 1020, and a signal processing unit 1030. The sensor device 1100 detects a target 1300. The transceiving unit 1010 has a transmitting unit 1012 and a receiving unit 1014. The transmitting unit 1012 and receiving unit 1014 have a plurality of antennas 1016.

The transmitting unit 1012 transmits transmission waves to the target 1300. The transmitting unit 1012 has one or more transmit antennas TX. The transmitting unit 1012 of the present example has N transmit antennas, a transmit antenna TX1 to a transmit antenna TXN. A transmit antenna TX is an exemplary antenna 1016.

The receiving unit 1014 receives a reflected wave reflected off the target 1300. The receiving unit 1014 has one or more receive antennas RX. The receiving unit 1014 of the present example has N receive antennas, a receive antenna RX1 to a receive antenna RXN. By having a plurality of receive antennas RX, the receiving unit 1014 can acquire information related to the angle θ of the position of the target 1300. A receive antenna RX is an exemplary antenna 1016. Note that as mentioned below, the angle θ is an angle of incidence of a transmission wave from the target 1300 relative to an axis perpendicular to the direction in which a plurality of antennas 1016 are arrayed.

For example, the receiving unit 1014 outputs an IF signal. The IF signal is a signal having a frequency down-converted to an IF (intermediate frequency) proportional to the TOF (Time of Flight) of the reflected wave. The TOF is a length of time that elapses from transmission of a transmitted wave to reception of the transmission wave as a reflected wave. The TOF increases as the range R between the sensor device 1100 and the target 1300 increases. The sensor device 1100 performs AD conversion and signal processing on the IF signal to thereby calculate the range R and velocity V of the target 1300.

The input unit 1020 receives a signal received by a receive antenna RX of the receiving unit 1014. The input unit 1020 receives the IF signal obtained through down-conversion of the reflected wave from the target 1300 received by the receiving unit 1014. The input unit 1020 converts the input analog IF signal into a digital signal. For example, the transceiving unit 1010 and the input unit 1020 are an integrated circuit such as an RFIC.

The signal processing unit 1030 detects the target 1300 based on the digital reception signal output by the input unit 1020. In the present specification, detection of the target 1300 means acquisition of the range R, velocity V, and angle θ of the target 1300, and the like, and identification of the presence of the target 1300. Note that, for example, the signal processing unit 1030 is a digital signal processor (DSP).

For example, the sensor device 1100 operates as a millimeter wave radar that transmits a millimeter wave to the target 1300, and detects the target 1300. By devising the arrangement of a plurality of antennas 1016, and by using the MIMO technique and correlation processing technique as mentioned below, the sensor device 1100 of the present example can cover the entire space of the aperture length of the sensor device 1100.

Figure 18:
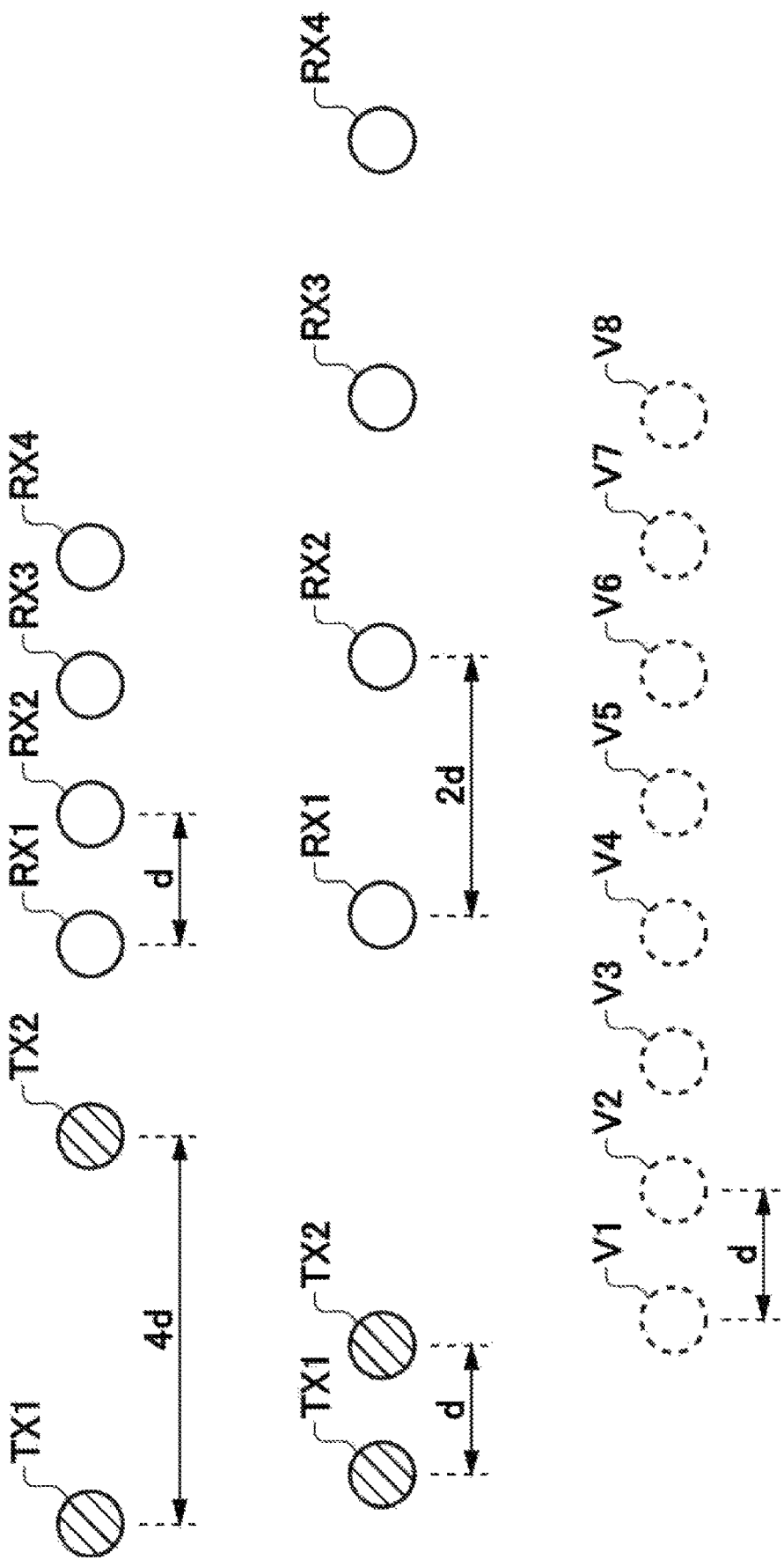
FIG. 18 is a figure for explaining a MIMO radar technique.

FIG. 18 is a figure for explaining a MIMO radar technique. In the present example explained, two transmit antennas TX and four receive antennas RX are used to configure eight virtual antennas V.

In the MIMO (Multi-In/Multi-Out) radar technique, a plurality of transmit antennas TX and a plurality of receive antennas RX are used to configure a plurality of virtual antennas V. Thereby, the angle resolution improves. For example, in the MIMO technique, if the number of transmit antennas is defined as $N_{TX}$, and the number of receive antennas is defined as $N_{RX}$, the maximum value of the number $N_{MIMO}$ of virtual antennas by the MIMO technique becomes $N_{TX} \times N_{RX}$. In the MIMO technique, the angle resolution can be improved at low cost, as compared to cases where the number of antennas is simply increased.

As virtual antennas V of the present example, eight virtual antennas V, a virtual antenna V1 to a virtual antenna V8, arrayed at intervals d are obtained. For example, the virtual antennas V are generated by using two transmit antennas TX arrayed at an interval 4d, and four receive antennas RX arrayed at intervals d. In addition, in another example, the virtual antennas V are generated by using two transmit antennas TX arrayed at an interval d, and four receive antennas RX arrayed at intervals 2d.

Figure 19A:
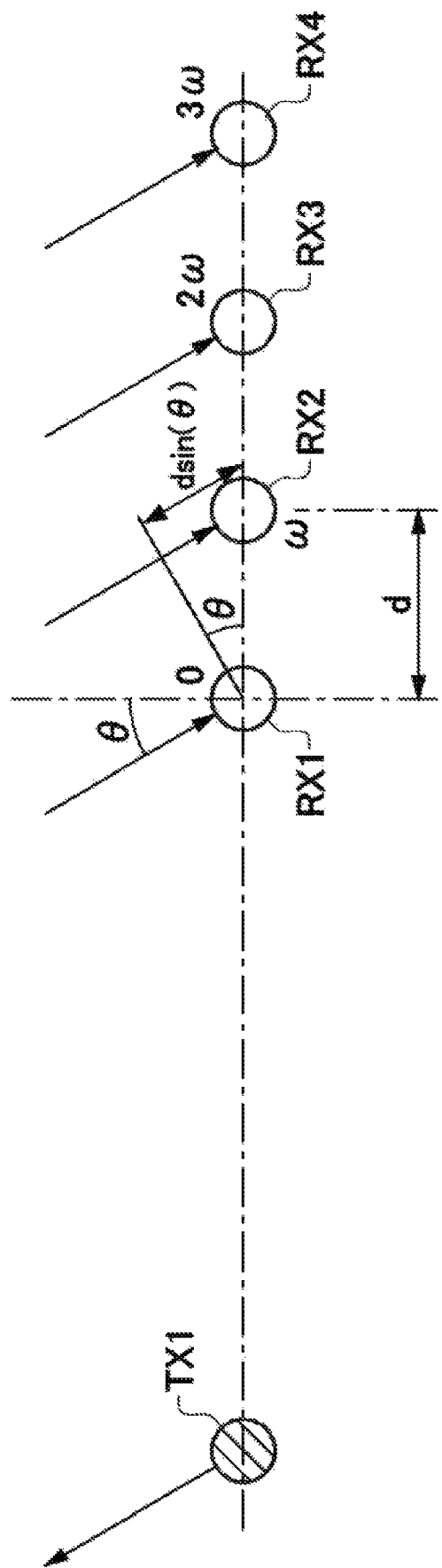
FIG. 19A is a figure for explaining principles of a MIMO radar.

FIG. 19A is a figure for explaining principles of a MIMO radar. In the present example, principles of the MIMO radar are explained by using one transmit antenna TX and four receive antennas RX. The four receive antennas, a receive antenna RX1 to a receive antenna RX4, are arrayed at intervals d. Corresponding to the interval d, a range difference of a radar signal which is equal to $d \cdot \sin(\theta)$ is generated between adjacent receive antennas RX. Thereby, a phase difference ω is generated between adjacent receive antennas RX. The sensor device 1100 can calculate the angle θ by utilizing the phase difference ω.

Figure 19B:
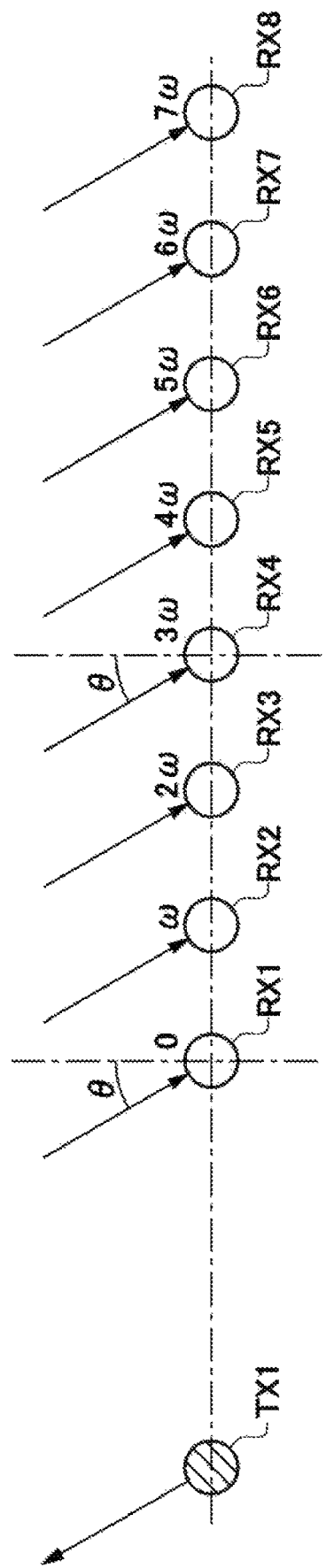
FIG. 19B is a figure for explaining an example in which one transmit antenna TX and eight receive antennas RX are used.

FIG. 19B is a figure for explaining an example in which one transmit antenna TX and eight receive antennas RX are used. By providing eight receive antennas RX, eight types of range difference, 0 to $7d \cdot \sin(\theta)$ can be generated. Thereby, eight types of phase difference, 0 to 7ω, can be obtained. In this manner, the resolution for the angle θ can be improved by increasing the number of antennas.

Figure 19C:
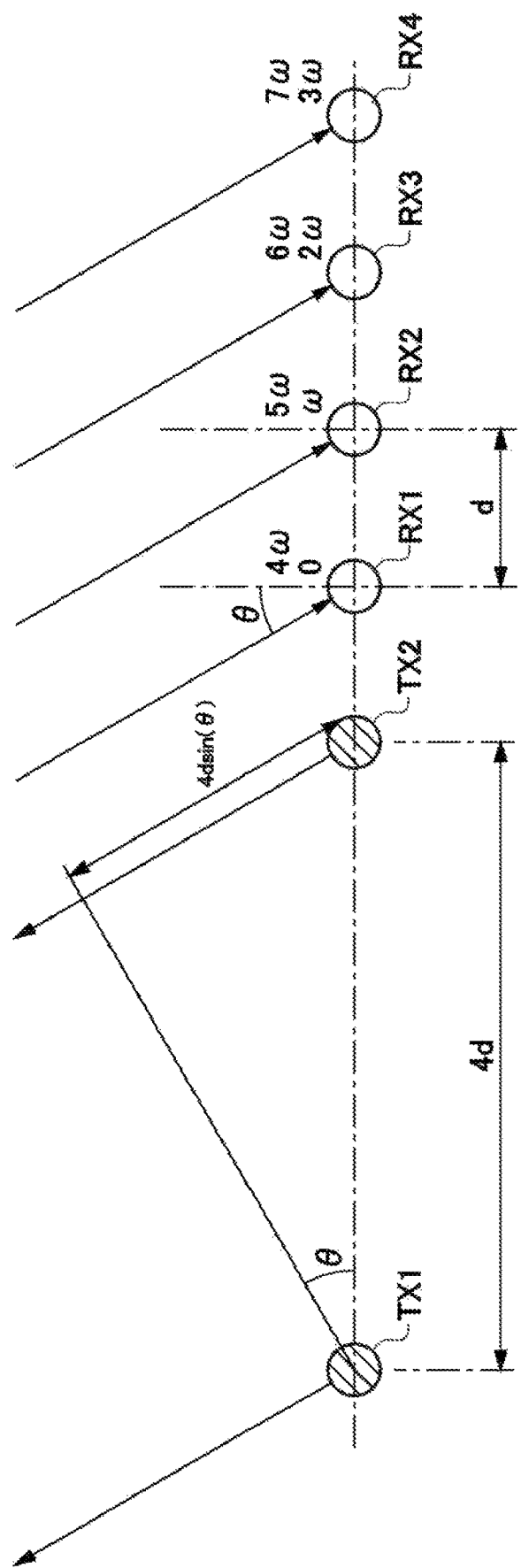
FIG. 19C is a figure for explaining an example in which two transmit antennas TX and four receive antennas RX are used.

FIG. 19C is a figure for explaining an example in which two transmit antennas TX and four receive antennas RX are used. The two transmit antennas, the transmit antenna TX1 and the transmit antenna TX2, are arrayed at an interval 4d. Thereby, a phase difference of $4d \cdot \sin(\theta)$ can be generated on the transmitting unit 1012 side.

On the other hand, the four receive antennas RX are arrayed at intervals d. Thereby, the receive antennas RX can generate four types of range difference, 0 to $3d \cdot \sin(\theta)$. Thereby, eight types of phase difference, 0 to 3ω, can be obtained.

Here, if reception at the individual transmit antennas TX can be distinguished, eight types of range difference, 0 to $7d \cdot \sin(\theta)$, can be generated even with the four receive antennas RX. As a result, eight types of phase difference, 0 to 7ω, can be obtained. That is, in the configuration illustrated in FIG. 19C, phase differences substantially equivalent to those in the configuration illustrated in FIG. 19B can be calculated.

Figure 20A:
FIG. 20A illustrates exemplary arrangements of antennas 1016 according to an embodiment.

FIG. 20A illustrates exemplary arrangements of antennas 1016 according to an embodiment. FIG. 20A illustrates exemplary antenna arrangements in which the numbers of antennas is one to eight, and the number of antennas is 16. In the present example, exemplary antenna arrangements in one direction are illustrated.

The antennas 1016 are arrayed at predetermined intervals. By devising the manner how the antennas 1016 are arrayed, the sensor device 1100 can cover a wide aperture length with a smaller number of antennas 1016. The exemplary arrangements of antennas 1016 of the present example may be applied to the arrangement of transmit antennas TX or may be applied to the arrangement of receive antennas RX.

For example, antennas 1016 are arranged such that an n-th antenna position pos(n) satisfies Formula 12.

$$pos(n) = \left\{ \sum_{m=0}^{\left\lceil \frac{\log(\lfloor \frac{n}{4} \rfloor + 1)}{\log(2)} \right\rceil - 1} 11 \cdot 3^m \cdot \left( \left\lfloor \frac{\lfloor \frac{n}{4} \rfloor}{2^m} \right\rfloor \mod 2 \right) \right\}$$ [Formula 12]

$$pos(n) = \left\{ \sum_{m=1}^{(n \bmod 4)} 2^{\left\lfloor \frac{\log(m \bmod 4)}{\log(2)} \right\rfloor} \right\} +$$

$$\left\{ \sum_{m=0}^{\left\lceil \frac{\log(\lfloor \frac{n}{4} \rfloor + 1)}{\log(2)} \right\rceil - 1} 11 \cdot 3^m \cdot \left( \left\lfloor \frac{\lfloor \frac{n}{4} \rfloor}{2^m} \right\rfloor \mod 2 \right) \right\}$$

otherwise $\lfloor x \rfloor$ = floor(x)

(n = 0, 1, 2, 3, ...)

$\lceil x \rceil$ = ceiling(x)

x mod a modulus(x, a)

Here, floor(x) is the floor function defined as the maximum integer not greater than a real number x, for x. ceiling(x) is the ceiling function defined as the minimum integer not smaller than the real number x, for x. modulus(x, a) indicates remainder calculation using x as the dividend, and a as the divisor. For example, if x=3a, modulus(x, a)=0, and if x=3a+1, modulus(x, a)=1.

By arraying antennas 1016 so as to satisfy Formula 12, the sensor device 1100 can cover the entire space in the aperture length with a small antenna area using minimum signal processing (correlation processing mentioned below). For example, the sensor device 1100 has transmit antennas TX arrayed so as to satisfy Formula 12. In addition, the sensor device 1100 may have receive antennas RX arrayed so as to satisfy Formula 12.

FIG. 20B illustrates, in a table format, an exemplary antenna arrangement according to Formula 12. FIG. 20B illustrates antenna numbers n, antenna positions pos(n), and intervals Δ between the antenna positions. The antennas 1016 are given antenna numbers n corresponding to the order of array.

An antenna position pos(n) indicates a position using an antenna 1016 with the antenna number 1 as the reference position. An interval Δ between antenna positions pos(n) indicates an interval between adjacent antennas 1016. For example, Δ(n)=pos(n+1)−pos(n). Here, n is an integer not smaller than one.

In addition, by separately considering situations based on values of n, Formula 12 is substantially equivalent to the following conditions using Formula 13 to Formula 16.

If n=4m−3, the antennas 1016 are provided so as to satisfy the following formula.

$$\Delta(n) = \Delta(4m-3) = 1$$ [Formula 13]

If n=4m−2, the antennas 1016 are provided so as to satisfy the following formula.

$$\Delta(4m-2)=2 \qquad \text{[Formula 14]}$$

If n=4m−1, the antennas 1016 are provided so as to satisfy the following formula.

$$\Delta(4m-1)=2 \qquad \text{[Formula 15]}$$

Here, m is an integer not smaller than one.
Specifically, $$\Delta(1)=\Delta(5)=\Delta(9)=\ldots=1$$

$$\Delta(2)=\Delta(6)=\Delta(10)=\ldots=2$$

$$\Delta(3)=\Delta(6)=\Delta(10)=\ldots=2$$

Furthermore, for other values of n, the antennas 1016 are provided so as to satisfy the following formula using an integer m not smaller than one and an integer l not smaller than one.

$$\Delta\{2^{(m+1)}\cdot(2l-1)\} = \left\{\sum_{k=1}^{2^{(m+1)}} \Delta(k)\right\} + 1 \qquad \text{[Formula 16]}$$

Specifically,
If m=1, assigning an integer not smaller than one to l gives the following formula.

$$\Delta(4)=\Delta(12)=\Delta(20)=\ldots=6$$

If m=2, assigning an integer not smaller than one to l gives the following formula.

$$\Delta(8)=\Delta(24)=\Delta(40)=\ldots=17$$

If m=3, assigning an integer not smaller than one to l gives the following formula.

$$\Delta(16)=\Delta(48)=\Delta(80)=\ldots=50$$

In this manner, formulae used for arraying the antennas 1016 are not limited to Formula 12 as long as they can achieve an array of the antennas 1016 equivalently to Formula 12.

Figure 21:
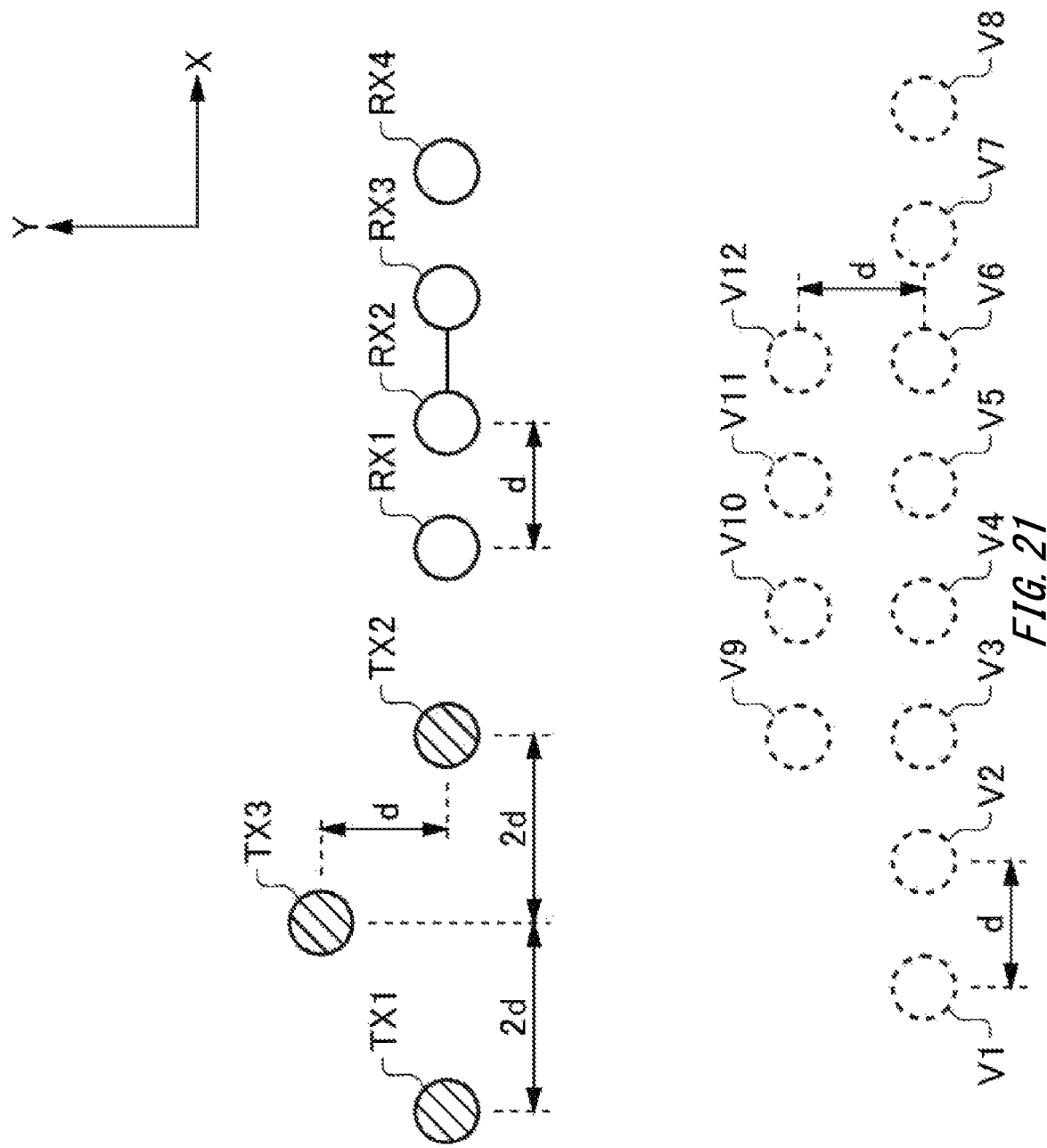
FIG. 21 is a figure for explaining principles of MIMO in an example in which antennas are arrayed two-dimensionally.

FIG. 21 is a figure for explaining principles of MIMO in an example in which antennas are arrayed two-dimensionally. Receive antennas RX and transmit antennas TX may be arrayed not only in a single direction, but also two-dimensionally. In the present example explained, the antennas 1016 are arrayed in two directions, the X-axis direction and Y-axis direction.

The receive antennas RX include four receive antennas, a receive antenna RX1 to a receive antenna RX4, that are arrayed in the X-axis direction. The receive antenna RX1 to the receive antenna RX4 are arrayed at predetermined intervals d.

The transmit antennas TX include three transmit antennas, a transmit antenna TX1 to a transmit antenna TX3. The transmit antenna TX1 to the transmit antenna TX3 are arrayed at intervals 2d in the array direction of the receive antennas RX. In addition, the transmit antenna TX3 is arrayed at an interval d from the transmit antenna TX1 and transmit antenna TX2 in the Y-axis direction perpendicular to the direction in which the transmit antenna TX1 and the transmit antenna TX2 are arrayed. In the present example, the four receive antennas RX and the three transmit antennas TX are used to obtain 12 virtual antennas, a virtual antenna V1 to a virtual antenna V12.

The virtual antenna V1 to the virtual antenna V8 are virtual antennas V based on the transmit antenna TX1 and transmit antenna TX2, and the receive antenna RX1 to the receive antenna RX4. The virtual antenna V1 to the virtual antenna V8 are provided at intervals d in the X-axis direction.

The virtual antenna V9 to the virtual antenna V12 are virtual antennas V based on the transmit antenna TX3, and the receive antenna RX1 to the receive antenna RX4. Since the transmit antenna TX3 is provided at the interval d from the transmit antenna TX1 and the transmit antenna TX2 in the Y-axis direction, the virtual antenna V9 to the virtual antenna V12 are also provided at the intervals d from the virtual antenna V1 to the virtual antenna V8 in the Y-axis direction.

Accordingly, the sensor device 1100 can have a two-dimensional array of the virtual antennas V by arraying the antenna 1016 two-dimensionally. In this case also, the sensor device 1100 may have an array of at least either transmit antennas TX or receive antennas RX that satisfies Formula 12.

FIG. 22A illustrates an exemplary method of arranging antennas 1016 according to the first embodiment. The sensor device 1100 is constituted by eight antennas 1016. The sensor device 1100 of the present example includes four transmit antennas TX and four receive antennas RX. In an embodiment explained here, a 5×5 antenna area is used.

A receive antenna RX1 to a receive antenna RX4 are arrayed in the X-axis direction. The receive antenna RX1 to the receive antenna RX4 are arrayed so as to satisfy Formula 12. For example, an interval between the receive antenna RX1 and the receive antenna RX2 is a predetermined interval Dh. An interval between the receive antenna RX2 and the receive antenna RX3 is 2·Dh. An interval between the receive antenna RX3 and the receive antenna RX4 is 2·Dh.

A transmit antenna TX1 to a transmit antenna TX4 are arrayed in the Y-axis direction. The transmit antenna TX1 to the transmit antenna TX4 are arrayed so as to satisfy Formula 12. For example, an interval between the transmit antenna TX1 and the transmit antenna TX2 is a predetermined interval Dv. An interval between the transmit antenna TX2 and the transmit antenna TX3 is 2·Dv. An interval between the transmit antenna TX3 and the transmit antenna TX4 is 2·Dv.

Note that although the receive antennas RX of the present example are arrayed in order from the X-axis negative side to the X-axis positive side, they may be arrayed in order from the X-axis positive side to the X-axis negative side. Similarly, although the transmit antennas TX are arrayed in order from the Y-axis positive side to the Y-axis negative side, they may be arrayed in order from the Y-axis negative side to the Y-axis positive side.

In addition, the number of receive antennas RX is the same as the number of transmit antennas TX in the present example. It should be noted however that the number of receive antennas RX may be different from the number of transmit antennas TX. Even if the number of receive antennas RX is different from the number of transmit antennas TX, both the transmit antennas TX and the receive antennas RX are arrayed so as to satisfy Formula 12.

The antenna arrangement illustrated in FIG. 22A has an L-shape mainly so as not to cause deterioration of characteristics of isolation between the transmitting end and the receiving end. As long as both transmit antennas and receive antennas are arranged according to the embodiments disclosed in the present specification, relative antenna positions between the transmitting end and the receiving end are essentially of no relevance.

Figure 22B:
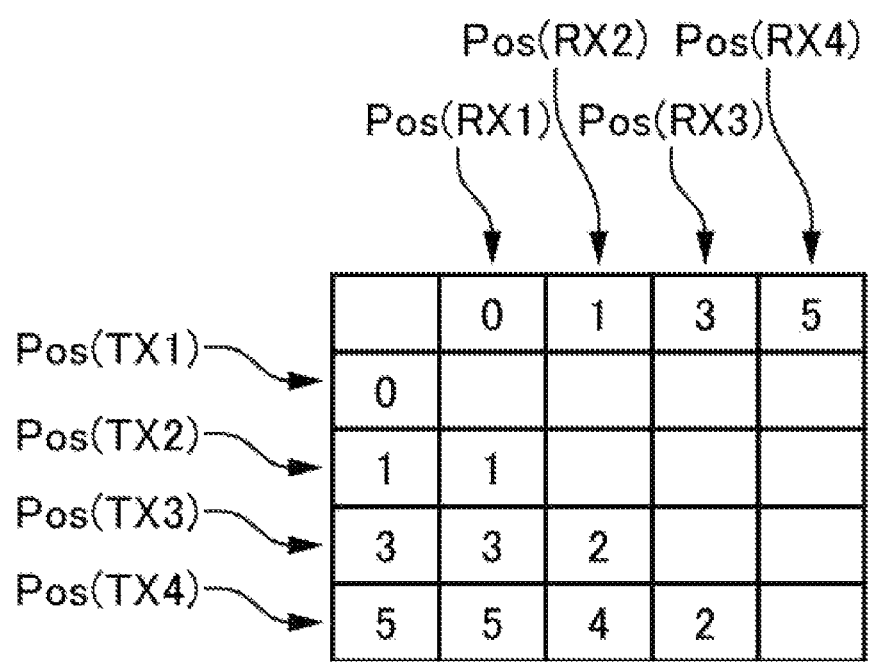
FIG. 22B is a figure for explaining antenna intervals obtained by the antenna arrangement illustrated in FIG. 22A.

FIG. 22B is a figure for explaining, in an easy-to-understand manner, what type of aperture length and space coverage can be realized if, for example, four antennas are arranged at the positions 0, 1, 3, 5 according to main points of the embodiments disclosed in the present specification. Using an antenna positioned at the position 0 as a reference antenna, relative positions of individual antenna positions from the reference antenna are indicated. For example, the relative position of the antenna at the position 0 indicated along the horizontal axis is 3 (=3−0), and the relative position of the antenna at the position 1 indicated along the horizontal axis is 2 (=3−1) if they are seen from the antenna at the position 3 indicated along the vertical axis. In this manner, a result of calculation of the relative positions between all the antennas is illustrated in FIG. 22B.

In FIG. 22B, the maximum value of the relative positions is 5, and this value indicates the aperture length of this antenna arrangement. In addition, all the integers from 1 to 5 are included, and this indicates that this antenna arrangement can cover the entire space of the aperture length. On the other hand, the presence of 2's at multiple positions (two positions) indicates that this antenna arrangement includes redundancy.

The sensor device 1100 can improve the resolution for the angle θ by having different antenna intervals. With the sensor device 1100 of the present example, all the integers from 1 to 5 can be obtained as differences between antenna positions Pos(TX) and antenna positions Pos(RX) due to the array indicated by Formula 12. In this manner, by obtaining the differences between the antenna positions Pos(TX) and the antenna positions Pos(RX) without missing any of them, the sensor device 1100 can improve the resolution for the angle θ with a smaller number of antennas.

Figure 22C:
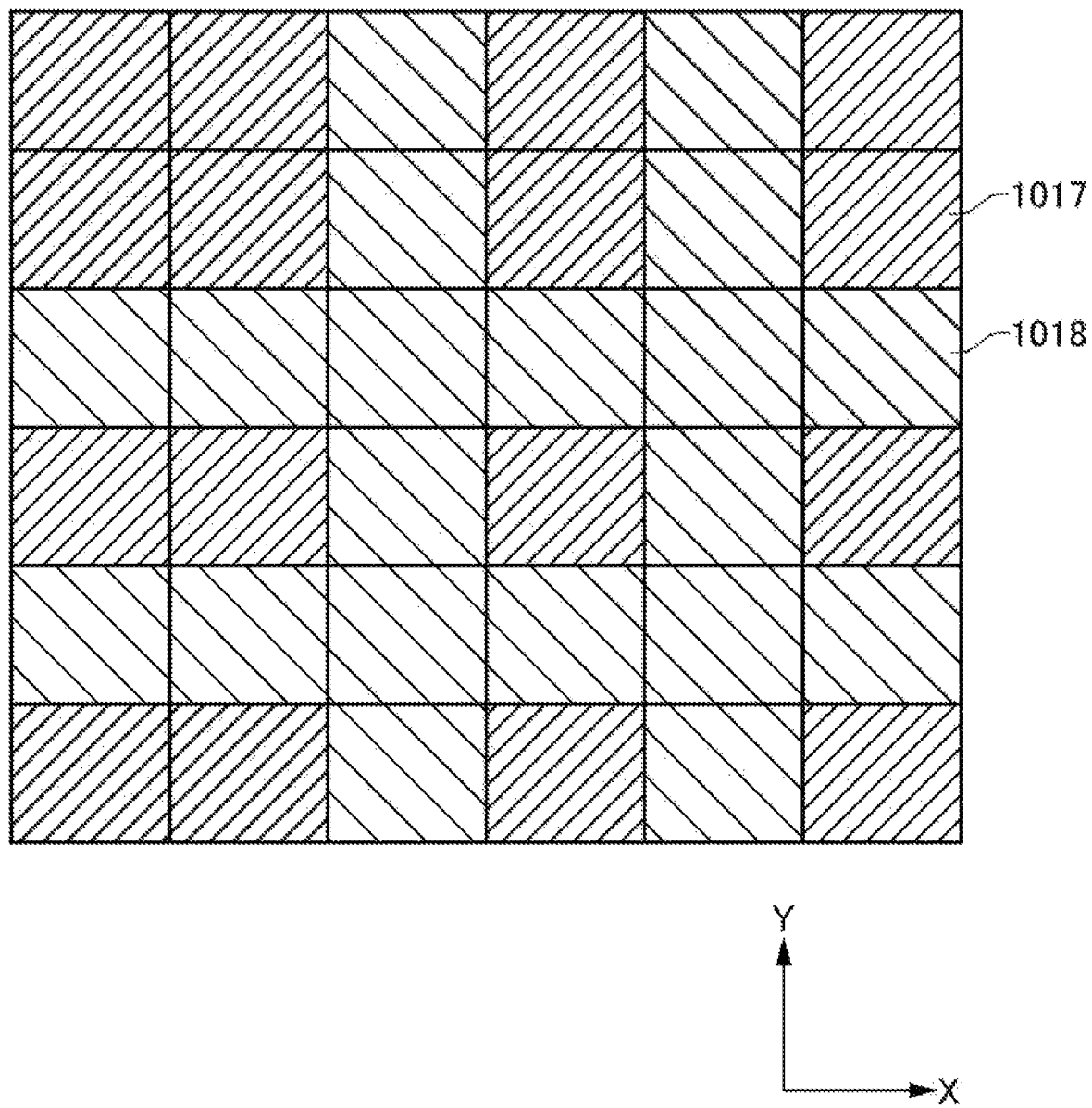
FIG. 22C is a figure illustrating a virtual antenna V in the aperture length of the sensor device 1100.

FIG. 22C is a figure illustrating a virtual antenna V in the aperture length of the sensor device 1100. The sensor device 1100 of the present example realizes the numerical aperture of 6×6 by using a 5×5 antenna area. The sensor device 1100 covers the entire space of the aperture length by using MIMO antennas 1017 and correlation antennas 1018.

The MIMO antennas 1017 are virtual antennas V that can be directly obtained based on a relationship between receive antennas RX and transmit antennas TX. In the present example, 16 MIMO antennas 1017 are obtained in the numerical aperture of 6×6.

The correlation antennas 1018 are virtual antennas V that are configured through correlation processing between the MIMO antennas 1017. The correlation antennas 1018 are provided to supplement the MIMO antennas 1017 through correlation processing between the MIMO antennas 1017. In the present example, 20 correlation antennas 1018 are provided in the numerical aperture of 6×6.

For example, the signal processing unit 1030 processes signals at antenna positions where there are the MIMO antennas 1017. In addition, through correlation processing on signals at the MIMO antennas 1017, the signal processing unit 1030 may generate correlation antennas 1018 at antenna positions where there are not MIMO antennas 1017. The signal processing unit 1030 can cover the entire space of the aperture length through relatively simple signal processing (i.e., correlation processing). For example, the sensor device 1100 can cover the entire 6×6 area by using the 5×5 antenna area.

Figure 23A:
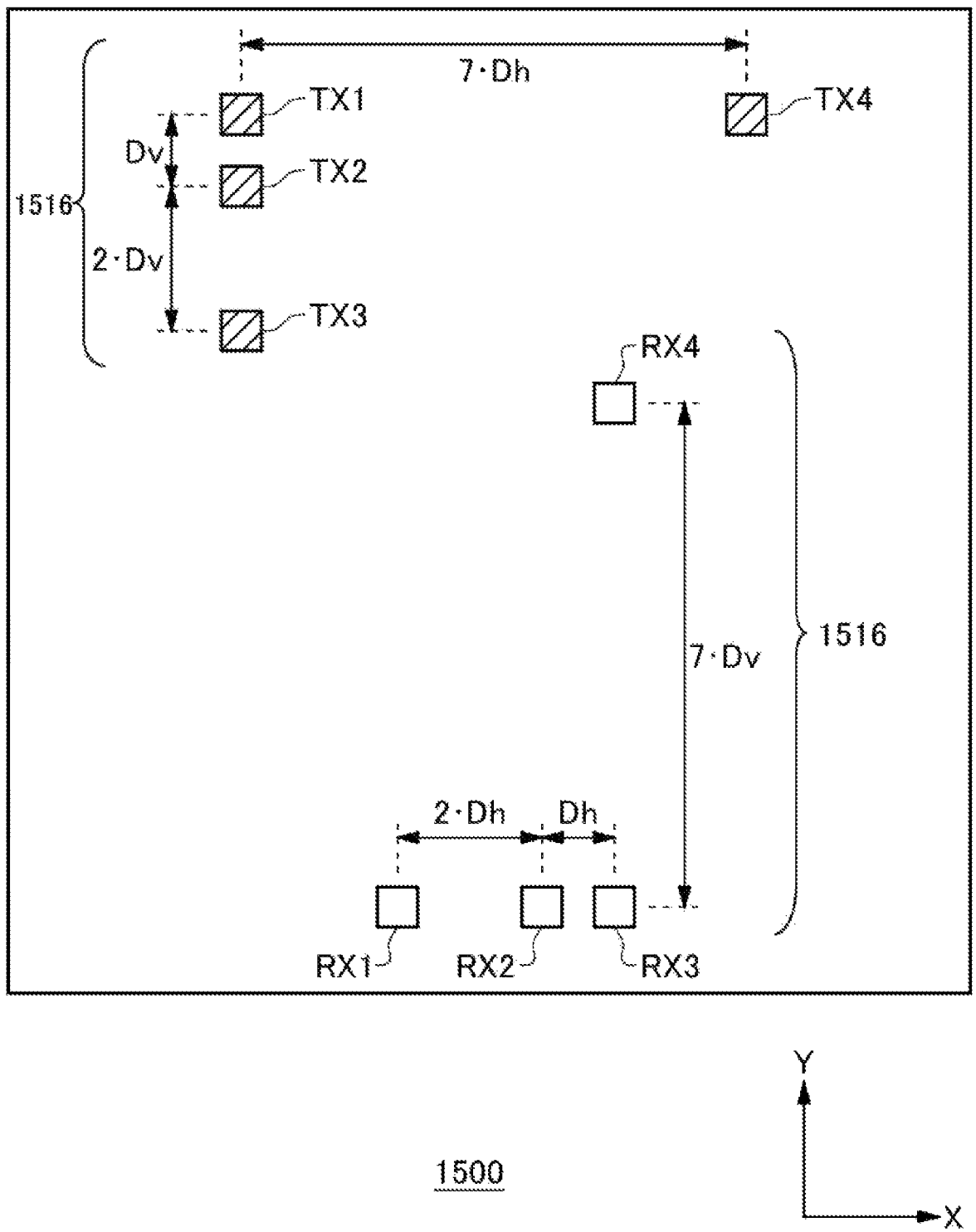
FIG. 23A illustrates an exemplary configuration of a sensor device 1500 according to a comparative example.

FIG. 23A illustrates an exemplary configuration of a sensor device 1500 according to a comparative example. The sensor device 1500 is constituted by eight antennas 1516. The sensor device 1500 of the present example includes four transmit antennas TX and four receive antennas RX. The sensor device 1500 uses a 7×7 antenna area.

Three transmit antennas TX, a transmit antenna TX1 to a transmit antenna TX3, are arrayed in the Y-axis direction. The transmit antenna TX4 is provided at the same position in the Y-axis direction as the position of the transmit antenna TX1 in the Y-axis direction, and is provided on the X-axis positive side relative to the transmit antenna TX1.

Three receive antennas RX, a receive antenna RX1 to a receive antenna RX3, are arrayed in the X-axis direction. The receive antenna RX4 is provided at the same position in the X-axis direction as the position of the receive antenna R3 in the X-axis direction, and is provided on the Y-axis positive side relative to the receive antenna RX3.

Figure 23B:
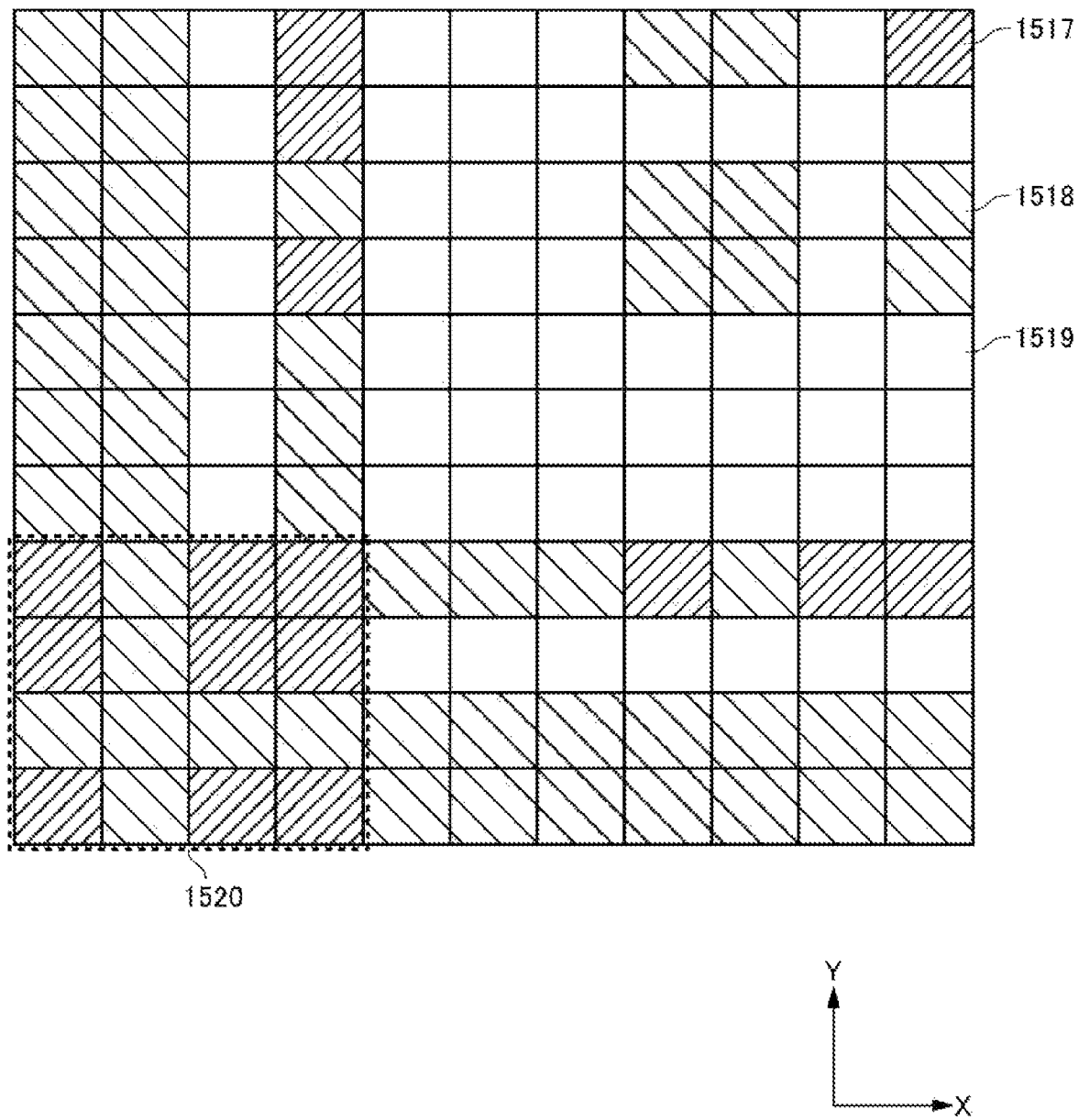
FIG. 23B is a figure illustrating a virtual antenna V in the aperture length of the sensor device 1500.

FIG. 23B is a figure illustrating a virtual antenna V in the aperture length of the sensor device 1500. The sensor device 1500 realizes the numerical aperture of 11×11 by using a 7×7 antenna area.

The sensor device 1500 realizes the numerical aperture of 11×11 by using MIMO antennas 1517 and correlation antennas 1518. It should be noted however that the sensor device 1500 has non antenna regions 1519 not provided with MIMO antennas 1517 or correlation antennas 1518. Because of this, the planar surface that is entirely covered by MIMO antennas 1517 and correlation antennas 1518 is a 4×4 region 1520 only. Accordingly, with the sensor device 1500, only the 4×4 area can be entirely covered by the 7×7 antenna area. With the sensor device 1500, detection is not possible in regions other than the 4×4 region 1520 in some cases, even if a target is present in the aperture length.

Figure 24A:
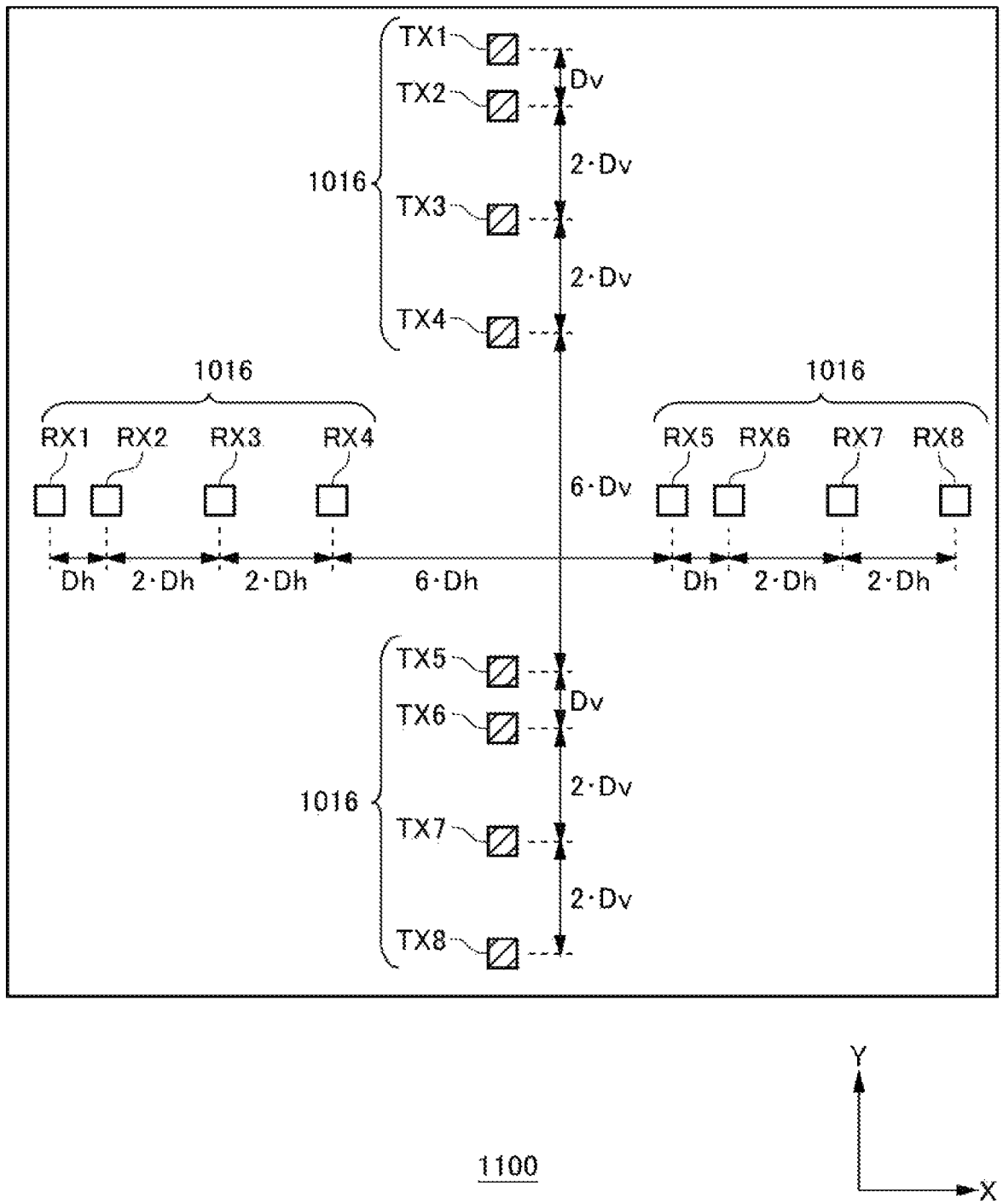
FIG. 24A illustrates an exemplary method of arranging antennas 1016 according to a second embodiment.

FIG. 24A illustrates an exemplary method of arranging antennas 1016 according to a second embodiment. The sensor device 1100 is constituted by 16 antennas 1016. The sensor device 1100 of the present example includes eight transmit antennas TX and eight receive antennas RX. In an embodiment explained here, a 16×16 antenna area is used.

A receive antenna RX1 to a receive antenna RX8 are arrayed in the X-axis direction. The receive antenna RX1 to the receive antenna RX8 are arrayed so as to satisfy Formula 12. For example, an interval between the receive antenna RX1 and the receive antenna RX2 is a predetermined interval Dh. An interval between the receive antenna RX2 and the receive antenna RX3 is 2·Dh. An interval between the receive antenna RX3 and the receive antenna RX4 is 2·Dh. An interval between the receive antenna RX4 and the receive antenna RX5 is 6·Dh. An interval between the receive antenna RX5 and the receive antenna RX6 is Dh. An interval between the receive antenna RX6 and the receive antenna RX7 is 2·Dh. An interval between the receive antenna RX7 and the receive antenna RX8 is 2·Dh.

A transmit antenna TX1 to a transmit antenna TX8 are arrayed in the Y-axis direction. The transmit antenna TX1 to the transmit antenna TX8 are arrayed so as to satisfy Formula 12. For example, an interval between the transmit antenna TX1 and the transmit antenna TX2 is a predetermined interval Dv. An interval between the transmit antenna TX2 and the transmit antenna TX3 is 2·Dv. An interval between the transmit antenna TX3 and the transmit antenna TX4 is 2·Dv. An interval between the transmit antenna TX4 and the transmit antenna TX5 is 6·Dv. An interval between the transmit antenna TX5 and the transmit antenna TX6 is Dv. An interval between the transmit antenna TX6 and the transmit antenna TX7 is 2·Dv. An interval between the transmit antenna TX7 and the transmit antenna TX8 is 2·Dv.

The array of the receive antennas RX crosses the array of the transmit antennas TX. If the receive antennas RX are arrayed in the X-axis direction, the coordinates of the receive antennas RX in the Y-axis direction are located between the transmit antenna TX1 and the transmit antenna TX8. In addition, if the transmit antennas TX are arrayed in the Y-axis direction, the coordinates of the transmit antennas TX in the X-axis direction are located between the receive antenna RX1 and the receive antenna RX8.

The sensor device 1100 of the present example has an array of transmit antennas TX and an array of receive antennas RX that cross each other at a position where intervals between antennas 1016 are large. That is, the array of receive antennas RX crosses the array of a plurality of transmit antennas TX between an n-th transmit antenna TX (n satisfies n mod 4=0), and an (n+1)-th transmit antenna TX. In addition, the array of transmit antennas TX crosses the array of a plurality of receive antennas RX between an n-th receive antenna RX (n satisfies n mod 4=0), and an (n+1)-th receive antenna RX.

The sensor device 1100 of the present example allows reduction of the installation area of antennas 1016 by making the array of the transmit antennas TX and the array of the receive antennas RX cross each other. In addition, the position at which the array of the transmit antennas TX and the array of the receive antennas RX cross each other may be at a position where an interval between transmit antennas TX is large, or at a position where an interval between receive antennas RX is large. Thereby, isolation between the transmit antennas TX and the receive antennas RX improves. By making the array of the transmit antennas TX and the array of the receive antennas RX cross each other at positions where both an interval between transmit antennas TX and an interval between receive antennas RX are large in the sensor device 1100, it becomes easier to improve isolation between the transmit antennas TX and the receive antennas RX.

Figure 24B:
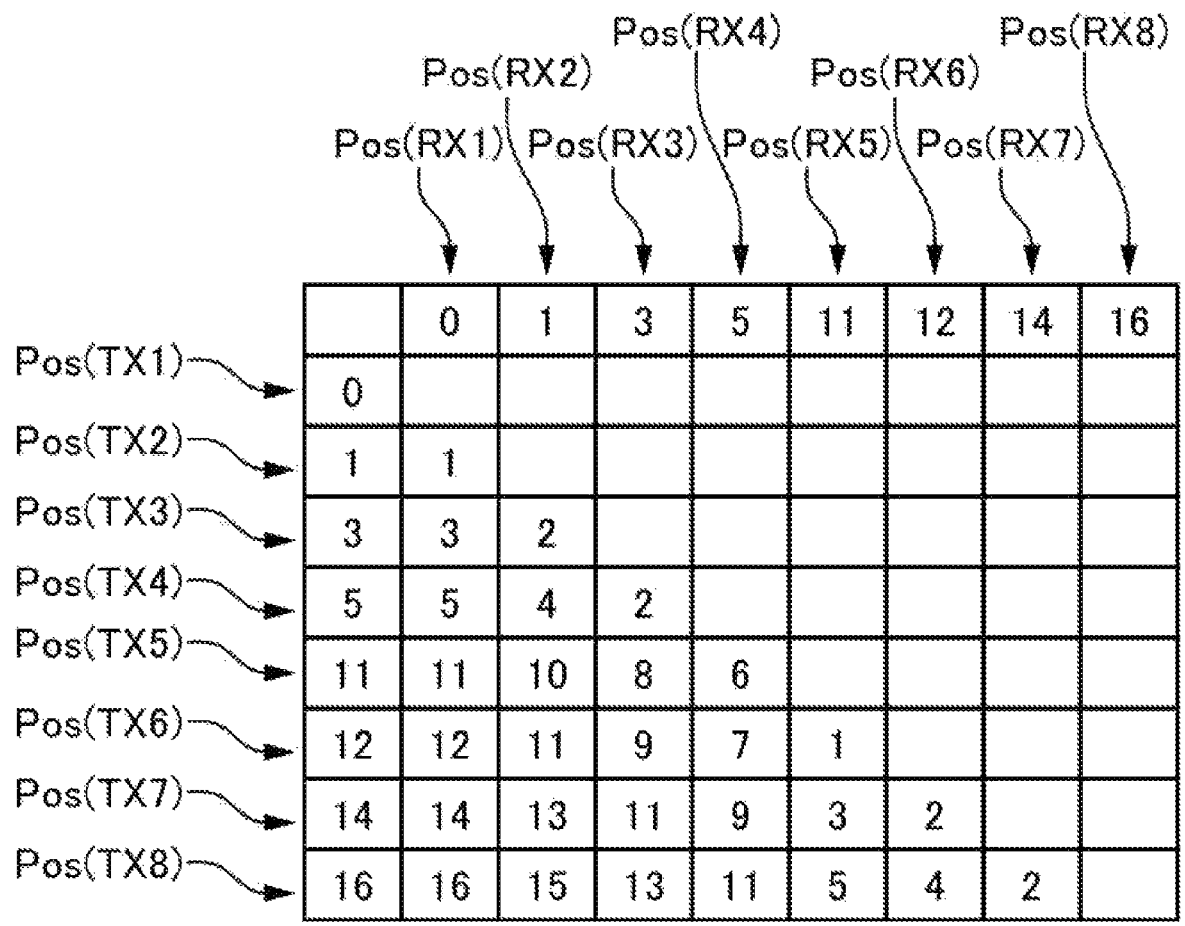
FIG. 24B is a figure for explaining antenna intervals obtained by the antenna arrangement illustrated in FIG. 24A.

FIG. 24B is a figure for explaining, in an easy-to-understand manner, what type of aperture length and space coverage can be realized if, for example, eight antennas are arranged according to the present invention. Using an antenna positioned at the position 0 as a reference antenna, relative positions of individual antenna positions from the reference antenna are indicated, and a result of calculation of the relative positions between all the antennas is illustrated in FIG. 24B.

In FIG. 24B, the maximum value of the relative positions is 16, and this value indicates the aperture length of this antenna arrangement. In addition, all the integers from 1 to 16 are included, and this indicates that this antenna arrangement can cover the entire space of the aperture length. On the other hand, the presence of the same integers at multiple positions (e.g., 2's appear four times) indicates that this antenna arrangement includes redundancy.

Figure 24C:
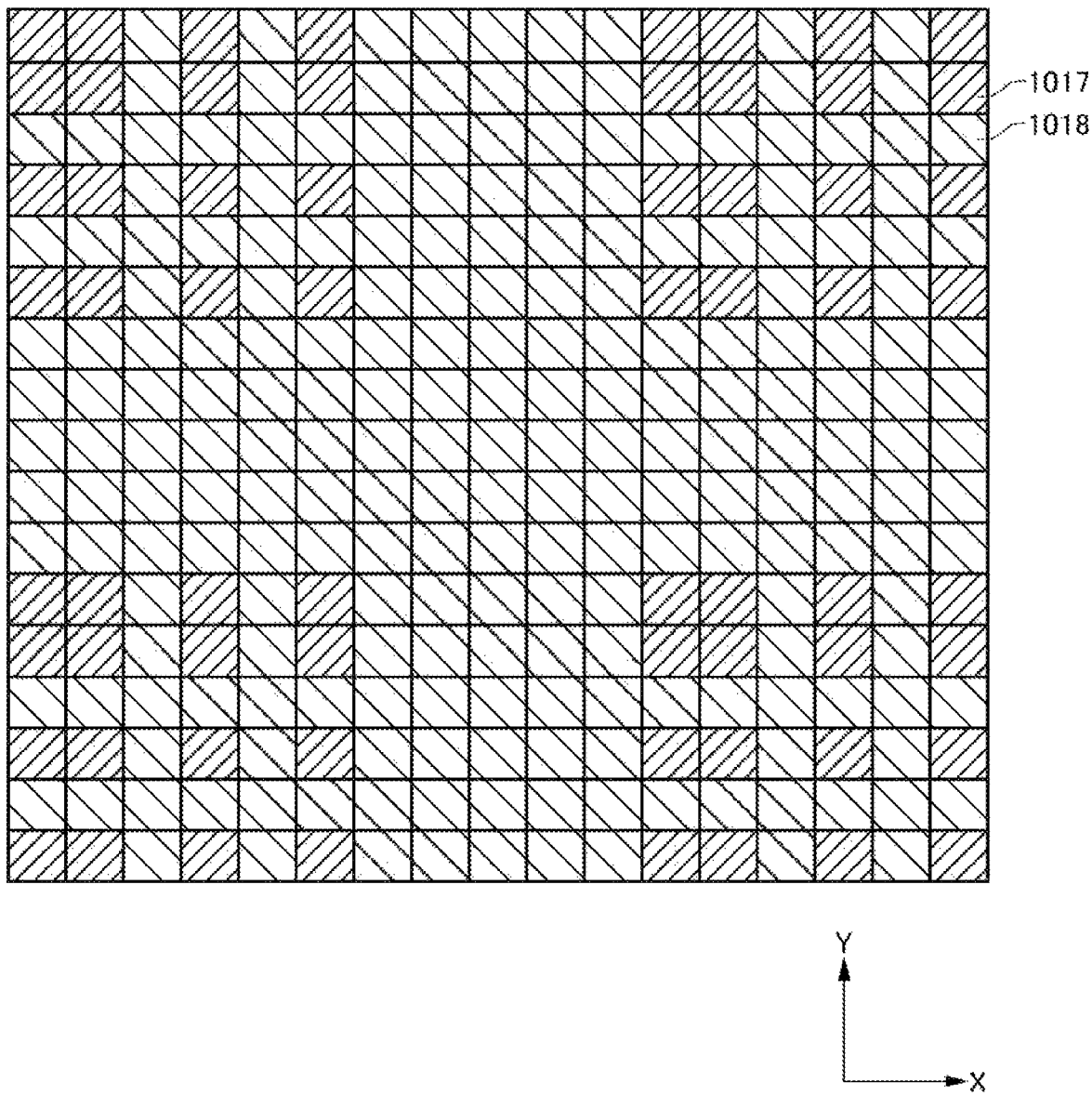
FIG. 24C is a figure for explaining the coverage rate of the aperture length of the sensor device 1100.

FIG. 24C is a figure for explaining the coverage rate of the aperture length of the sensor device 1100. The sensor device 1100 of the present example realizes the numerical aperture of 17×17 by using a 16×16 antenna area. The sensor device 1100 covers the entire space of the aperture length by using MIMO antennas 1017 and correlation antennas 1018. For example, in the numerical aperture of 17×17, 64 MIMO antennas 1017, and 225 correlation antennas 1018 are obtained.

In this manner, the sensor device 1100 can cover the entire space of the aperture length through relatively simple signal processing (i.e., correlation processing). The sensor device 1100 of the present example can cover the entire 17×17 area by using the 16×16 antenna area.

Figure 25A:
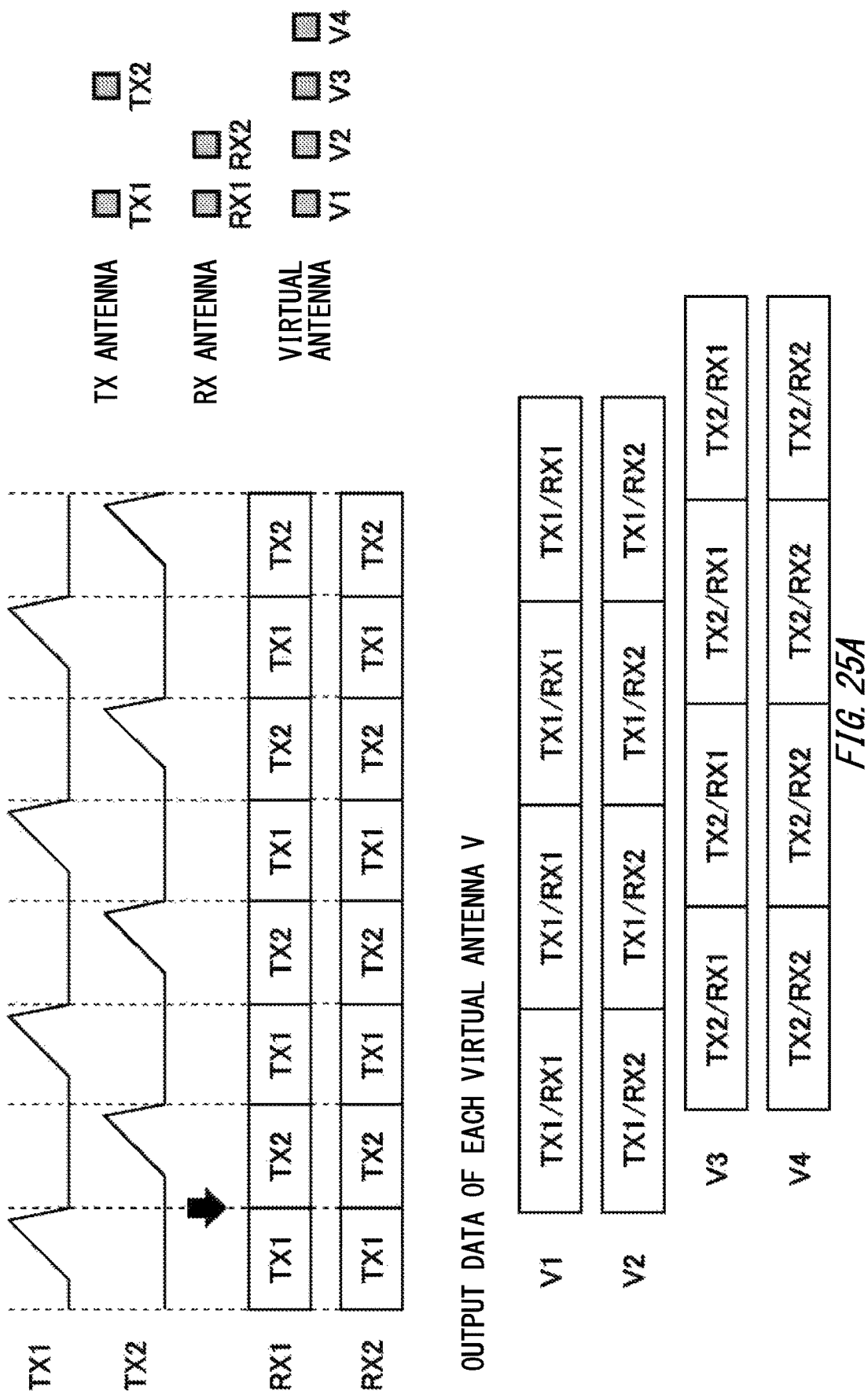
FIG. 25A illustrates an exemplary operation method of the sensor device 1100.

FIG. 25A illustrates an exemplary operation method of the sensor device 1100. The sensor device 1100 of the present example uses TDM MIMO (Time Division Multiple MIMO) to transmit a transmission wave to a target 1300. In TDM MIMO, individual transmit antennas output at different times. Thereby, it becomes possible to distinguish, on the receiving end, signals from a plurality of transmit antennas TX. In the present example explained, two transmit antennas TX and two receive antennas RX are used. It should be noted however that the numbers of antennas 1016 are not limited to those numbers of antennas 1016 illustrated in the present example.

A transmit antenna TX1 and a transmit antenna TX2 transmit transmission waves at different times. A receive antenna RX1 and a receive antenna RX2 receive transmission waves from the transmit antenna TX1 and the transmit antenna TX2, respectively. Thereby, four different virtual antennas, a virtual antenna V1 to a virtual antenna V4, are obtained.

The virtual antenna V1 obtains output data TX1/RX1. The output data TX1/RX1 means a signal from the transmit antenna TX1 received at the receive antenna RX1. The virtual antenna V2 obtains output data TX1/RX2. The output data TX1/RX2 means a signal from the transmit antenna TX1 received at the receive antenna RX2.

Similarly, the virtual antenna V3 obtains output data TX2/RX1. The output data TX2/RX1 means a signal from the transmit antenna TX2 received at the receive antenna RX1. The virtual antenna V4 obtains output data TX2/RX2. The output data TX2/RX2 means a signal from the transmit antenna TX2 received at the receive antenna RX2.

In this manner, the sensor device 1100 can distinguish, on the receiving end, signals from the plurality of transmit antennas TX, and configure a plurality of virtual antennas V by using TDM MIMO. TDM MIMO can be applied to any embodiment.

Figure 25B:
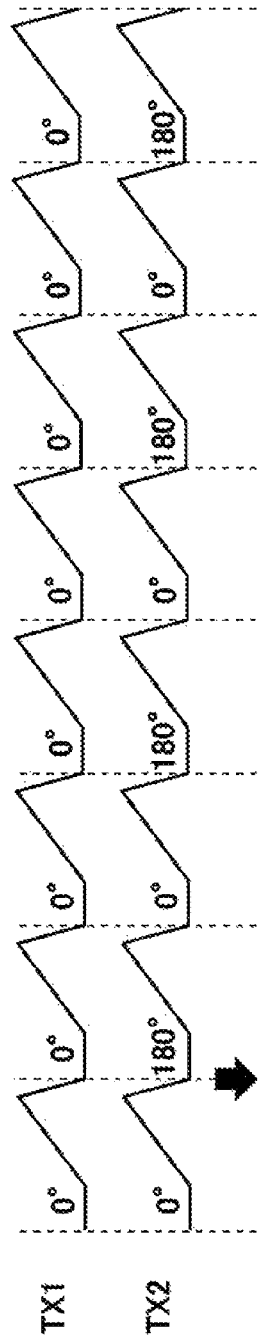
FIG. 25B illustrates an exemplary operation method of the sensor device 1100.

FIG. 25B illustrates an exemplary operation method of the sensor device 1100. The sensor device 1100 of the present example uses BPM MIMO (Binary Phase Modulate MIMO) to transmit a transmission wave to a target 1300. In BPM code information (a phase difference of 0° or 180°) is additionally transmitted from each transmit antenna. In the present example explained, two transmit antennas TX and two receive antennas RX are used. It should be noted however that the numbers of antennas 1016 are not limited to those numbers of antennas 1016 illustrated in the present example.

During a first period and a second period, a transmit antenna TX1 transmits transmission waves with their phases not being changed. A transmit antenna TX2 transmits a transmission wave with a phase difference of 0° during the first period, and transmits a transmission wave with a phase difference of 180° during the second period.

During the first period, the receive antenna RX1 and the receive antenna RX2 receive a transmission wave of TX1+TX2. In addition, during second period, the receive antenna RX1 and the receive antenna RX2 receive a transmission wave of TX1-TX2.

Here, during the first period and the second period, four different virtual antennas, a virtual antenna V1 to a virtual antenna V4, are obtained corresponding to combinations of signals obtained at each of the receive antenna RX1 and the receive antenna RX2. A signal obtained during the first period is defined as S1, and a signal obtained during the second period is defined as S2.

The virtual antenna V1 obtains output data 2·TX1/RX1 by using the sum S1+S2 of the signals obtained during the first period and the second period. The output data 2·TX1/RX1 means a signal of 2·TX1 received at the receive antenna RX1.

The virtual antenna V2 obtains output data 2·TX1/RX2 by using the sum S1+S2 of the signals obtained during the first period and the second period. The output data 2·TX1/RX2 means a signal of 2·TX1 received at the receive antenna RX2.

The virtual antenna V3 obtains output data 2·TX2/RX1 by using the difference S1-S2 of the signals obtained during the first period and the second period. The output data 2·TX2/RX1 means a signal of 2·TX1 received at the receive antenna RX1.

The virtual antenna V4 obtains output data 2·TX2/RX2 by using the difference S1-S2 of the signals obtained during the first period and the second period. The output data 2·TX2/RX2 means a signal of 2·TX2 received at the receive antenna RX2.

In this manner, the sensor device 1100 can distinguish, on the receiving end, signals from the plurality of transmit antennas TX, and configure a plurality of virtual antennas V by using BPM MIMO. BPM MIMO can be applied to any embodiment.

Figure 26:
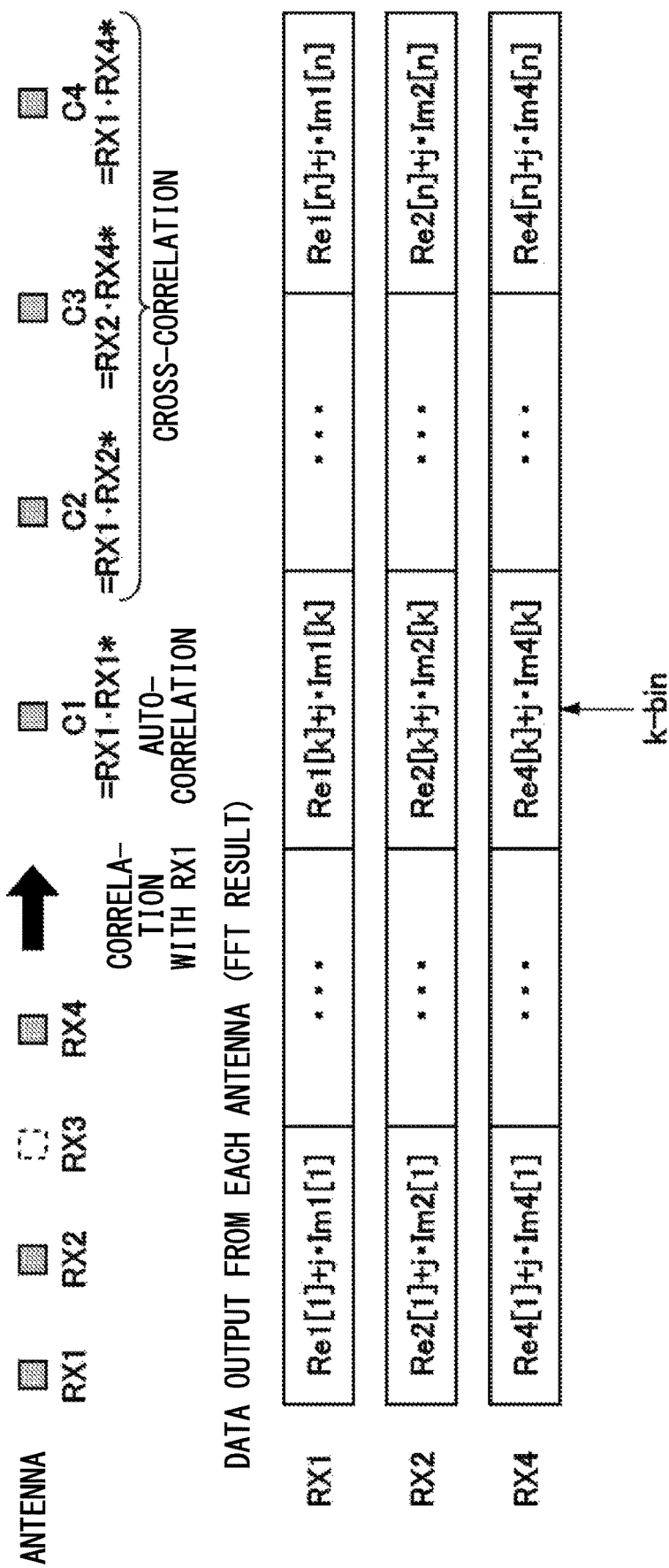
FIG. 26 is a figure for explaining correlation processing.

FIG. 26 is a figure for explaining correlation processing. Through correlation processing, the sensor device 1100 generates data about a portion where antennas are not present from data output from MIMO antennas 1017. The sensor device 1100 may generate data about a portion where MIMO antennas 1017 are not present by using data output from virtual antennas V.

The sensor device 1100 acquires data about real parts and imaginary parts through an FFT process on input data sequences. The data is expressed by a function of time, frequency, and the like. Since correlation processing is performed on data obtained after performing the FFT process, signals of complex numbers are obtained as a function of frequency.

In the present example considered, antennas are present at antenna positions A1, A2 and A4, and an antenna is not present at an antenna position A3. The sensor device 1100 acquires a signal at the antenna position A3 through correlation processing. Thereby, the sensor device 1100 can acquire data C1 to C4 at the antenna positions A1 to A4, respectively. The data C1 to C4 is data obtained after performing an FFT process.

The data C1 is data acquired through auto-correlation. Auto-correlation means obtaining correlation by using identical data. The data C1 of the present example is obtained based on auto-correlation of data acquired at the receive antenna RX1.

The data C2 to C4 is data acquired through cross-correlation. Cross-correlation means obtaining correlation by using different data. The data C2 of the present example is obtained based on cross-correlation between data acquired at the receive antenna RX1, and data acquired at the receive antenna RX2. The data C3 is obtained based on cross-correlation between the data acquired at the receive antenna RX2, and data acquired at the receive antenna RX4. The data C4 is obtained based on cross-correlation between the data acquired at the receive antenna RX1, and the data acquired at the receive antenna RX4.

Note that correlation processing of an FMCW radar may be performed on a BIN where a target is present. Because of this, correlation processing on data about k-bin, which is a k-th BIN, is considered.

The data C1 is calculated in the following manner.

$$C1 = A1^* conj(A1)$$
$$= (Re1[k] + j \cdot Im1[k]) \cdot (Re1[k] - j \cdot Im1[k])$$
$$= (Re1[k]^2 + Im1[k]^2)$$

$conj(A1)$ indicates a complex conjugate of $A1$.

The data C2 is calculated in the following manner.

$$C2 = A1^* conj(A2)$$
$$= (Re1[k] + j \cdot Im1[k]) \cdot (Re2[k] - j \cdot Im2[k])$$
$$= (Re1[k] \cdot Re2[k] + Im1[k] \cdot Im2[k]) +$$
$$j \cdot (Re2[k] \cdot Im1[k] - Re1[k] \cdot Im2[k])$$

$conj(A2)$ indicates a complex conjugate of $A2$.

The data C3 is calculated in the following manner.

$$C3 = A2^* conj(A4)$$
$$= (Re2[k] + j \cdot Im2[k]) \cdot (Re4[k] - j \cdot Im4[k])$$
$$= (Re2[k] \cdot Re4[k] + Im2[k] \cdot Im4[k]) +$$
$$j \cdot (Re4[k] \cdot Im2[k] - Re2[k] \cdot Im4[k])$$

$conj(A4)$ indicates a complex conjugate of $A4$.

The data C4 is calculated in the following manner.

$$C4 = A1^* conj(A4)$$
$$= (Re1[k] + j \cdot Im1[k]) \cdot (Re4[k] - j \cdot Im4[k])$$
$$= (Re1[k] \cdot Re4[k] + Im1[k] \cdot Im4[k]) +$$
$$j \cdot (Re4[k] \cdot Im1[k] + Re1[k] \cdot Im4[k])$$

$conj(A4)$ indicates a complex conjugate of $A4$.

As explained above, through correlation processing, the sensor device 1100 can calculate the data C3 after an FFT even for the antenna position A3 where an antenna is not present. Thereby, the sensor device 1100 can cover the entire space of the aperture length through simple correlation processing.

Third Embodiment

Figure 27:
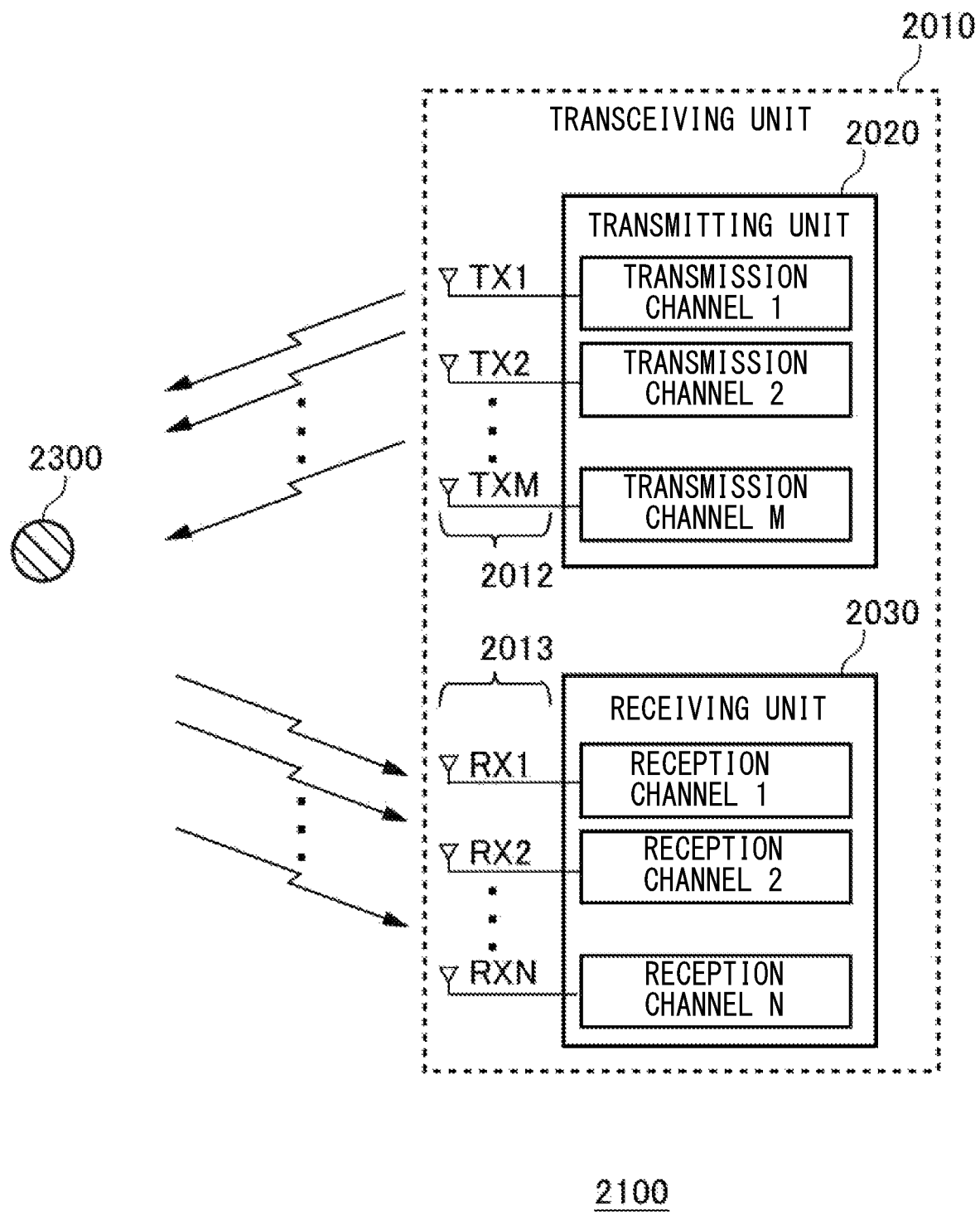
FIG. 27 illustrates an exemplary configuration of a radar device 2100 according to an embodiment.

FIG. 27 illustrates an exemplary configuration of a radar device 2100 according to an embodiment. The radar device 2100 of the present example includes a transceiving unit 2010 that transmits and receives radar signals, and detects the position or velocity of a measurement target 2300. The measurement target 2300 may be a living body such as a human, but is not limited to it.

The transceiving unit 2010 includes a transmitting unit 2020, and a receiving unit 2030. The transceiving unit 2010 has a plurality of channels. In the present example, each of the transmitting unit 2020 and the receiving unit 2030 has a plurality of channels. Based on a reflected wave from the measurement target 2300, the transceiving unit 2010 adjusts relative phases between a plurality of channels provided in the transceiving unit 2010.

The transmitting unit 2020 transmits transmission waves to the measurement target 2300. The transmitting unit 2020 has M channels, a channel 1 to a channel M. M is an integer not smaller than two. The transmitting unit 2020 is connected to a plurality of transmit antennas 2012 corresponding to the plurality of channels, the channel 1 to the channel M.

The transmit antennas 2012 include M transmit antennas, a transmit antenna TX1 to a transmit antenna TXM. The M transmit antennas, the transmit antenna TX1 to the transmit antenna TXM, each transmit a transmission wave to the measurement target 2300.

The receiving unit 2030 receive reflected waves reflected off the measurement target 2300. The receiving unit 2030 has N channels, a channel 1 to a channel N. N is an integer not smaller than two. The number N of channels of the receiving unit 2030 may be the same as or different from the number M of channels of the transmitting unit 2020. The receiving unit 2030 is connected to a plurality of receive antennas 2013 corresponding to the plurality of channels, the channel 1 to the channel N. By having the plurality of receive antennas 2013, the receiving unit 2030 can acquire angle information about reflected waves received from the measurement target 2300.

The receive antennas 2013 have N receive antennas, a receive antenna RX1 to a receive antenna RXN. The N receive antennas, the receive antenna RX1 to the receive antenna RXN each receive a reflected wave.

Based on information about transmission waves and reflected waves, the transceiving unit 2010 can calculate the range, velocity, and angle of the measurement target 2300 or the like. For example, the transceiving unit 2010 calculates the range of the measurement target 2300 based on the TOF (Time of Flight) of a reflected wave.

The TOF is a length of time that elapses from transmission of a transmitted wave to reception of the transmission wave as a reflected wave. The TOF increases as the range R between the radar device 2100 and the measurement target 2300 increases. For example, the radar device 2100 calculates an IF signal down-converted to an IF (Intermediate Frequency) proportional to the TOF of a reflected wave. The radar device 2100 performs AD conversion and signal processing on the IF signal, and thereby can calculate the range and velocity of the measurement target 2300.

Here, the transmit antennas 2012 transmit a transmission wave with a different phase from each of the plurality of transmit antennas TX. A plurality of transmission waves transmitted from the plurality of transmit antennas TX are strengthened due to matching phases in particular directions, and are weakened and cancelled out due to opposite phases in other directions. Then, the transmitting unit 2020 needs to appropriately control relative phases between a plurality of channels so as to produce directionality on the transmitting end. Similarly, the receiving unit 2030 also needs to appropriately control relative phases between a plurality of channels so as to produce directionality on the receiving end. Therefore, the radar device 2100 adjusts relative phases between a plurality of channels in order to highly accurately detect the measurement target 2300. The radar device 2100 of the present example can adjust relative phases between channels highly accurately through external calibration.

External calibration means adjustment of relative phases between channels taking the entire module into consideration. In external calibration, not only the influence of the transmitting unit 2020 and receiving unit 2030, but also the influence of antennas, the influence of internal waveguides of the transceiving unit 2010, and the like are taken into consideration comprehensively. External calibration includes external calibration for the transmitting unit 2020, and external calibration for the receiving unit 2030.

In addition, the radar device 2100 can also adjust relative phases between channels by additionally using internal calibration in addition to external calibration. The radar device 2100 may use a different one of external calibration and internal calibration depending on situations.

Internal calibration means calibration for each configuration provided in the radar device 2100. Internal calibration includes internal calibration for the transmitting unit 2020, and internal calibration for the receiving unit 2030. Since, in internal calibration of the transmitting unit 2020, the calibration is completed within the transmitting unit 2020, the influence of the receiving unit 2030 or antennas is not taken into consideration. Since, in internal calibration of the receiving unit 2030, the calibration is completed within the receiving unit 2030, the influence of the transmitting unit 2020 or antennas is not taken into consideration.

Figure 28:
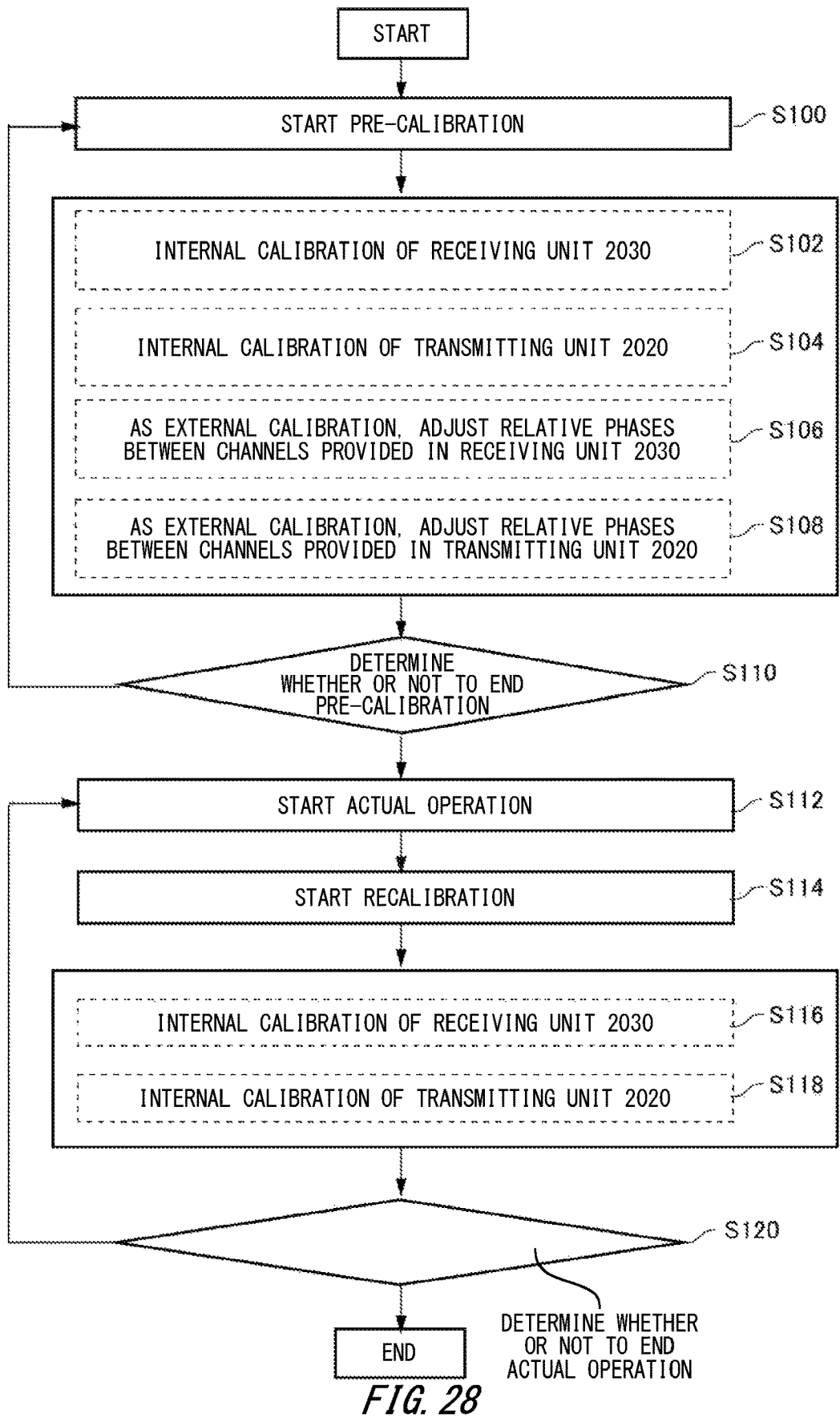
FIG. 28 is an exemplary flowchart illustrating operations of the radar device 2100.

FIG. 28 is an exemplary flowchart illustrating operations of the radar device 2100. Although the radar device 2100 of the present example performs operations at Step S100 to Step S120, the order of execution of the steps is not limited to the order illustrated in the present example.

At Step S100, the radar device 2100 starts pre-calibration before an actual operation. The actual operation of the radar device 2100 means, for example, detection of the measurement target 2300 by the radar device 2100. Next, the radar device 2100 executes at least one step of Step S102 to Step S108.

At Step S102, the radar device 2100 performs internal calibration of the receiving unit 2030. Thereby, the radar device 2100 adjusts relative phases between channels provided in the receiving unit 2030. In the internal calibration of the receiving unit 2030, calibration signals are generated in the receiving unit 2030, and the calibration signals are used to adjust the relative phases between channels of the receiving unit 2030.

At Step S104, the radar device 2100 performs internal calibration of the transmitting unit 2020. Thereby, the radar device 2100 adjusts relative phases between channels provided in the transmitting unit 2020. In the internal calibration of the transmitting unit 2020, calibration signals are generated in the transmitting unit 2020, and the calibration signals are used to adjust the relative phases between channels of the transmitting unit 2020.

At Step S106, as external calibration, the radar device 2100 adjusts relative phases between channels provided in the receiving unit 2030. In the external calibration of the receiving unit 2030, a calibration target 2310 mentioned below is provided, and a transmission wave is transmitted to the calibration target 2310.

At Step S108, as external calibration, the radar device 2100 adjusts relative phases between channels provided in the transmitting unit 2020. In the external calibration of the transmitting unit 2020, a calibration target 2310 mentioned below is provided, and a transmission wave is transmitted to the calibration target 2310.

Here, the order of execution of Step S102 to Step S108 is not limited to the order illustrated in the present example. In the present example, the external calibration is executed after the internal calibration is executed. In addition, the transmitting unit 2020 is calibrated after the calibration of the receiving unit 2030. It should be noted however that the receiving unit 2030 may be calibrated after the calibration of the transmitting unit 2020. In addition, any step of Step S102 to Step S108 may be executed multiple times.

At Step S110, it is determined whether or not to end the pre-calibration. If the pre-calibration is to be ended, the actual operation of the radar device 2100 is started at Step S112. If the pre-calibration is not to be ended, the process returns to Step S100, and at least one step of Step S102 to Step S108 may be executed again.

At Step S114, recalibration is started at a time of the actual operation of the radar device 2100. The radar device 2100 of the present example executes pre-calibration before the actual operation, and performs recalibration after the actual operation is started. For example, the recalibration at a time of the actual operation is executed at a time of an intermittent operation of the radar device 2100.

At Step S116, the radar device 2100 performs internal calibration of the receiving unit 2030. Thereby, the radar device 2100 adjusts relative phases between channels provided in the receiving unit 2030. At Step S116, the internal calibration of the receiving unit 2030 may be performed by a method identical to the method at Step S102.

At Step S118, the radar device 2100 performs internal calibration of the transmitting unit 2020. Thereby, the radar device 2100 adjusts relative phases between channels provided in the transmitting unit 2020. At Step S118, the internal calibration of the transmitting unit 2020 may be performed by a method identical to the method at Step S104.

At Step S120, it is determined whether or not to end the actual operation. If the actual operation is not to be ended, the process may return to Step S112, and the actual operation may be continued. In addition, the radar device 2100 may further execute recalibration.

As explained above, the radar device 2100 can realize more accurate phase adjustment by executing external calibration. In addition, as in the present example, the radar device 2100 may use both the external calibration and the internal calibration in combination.

Figure 29:
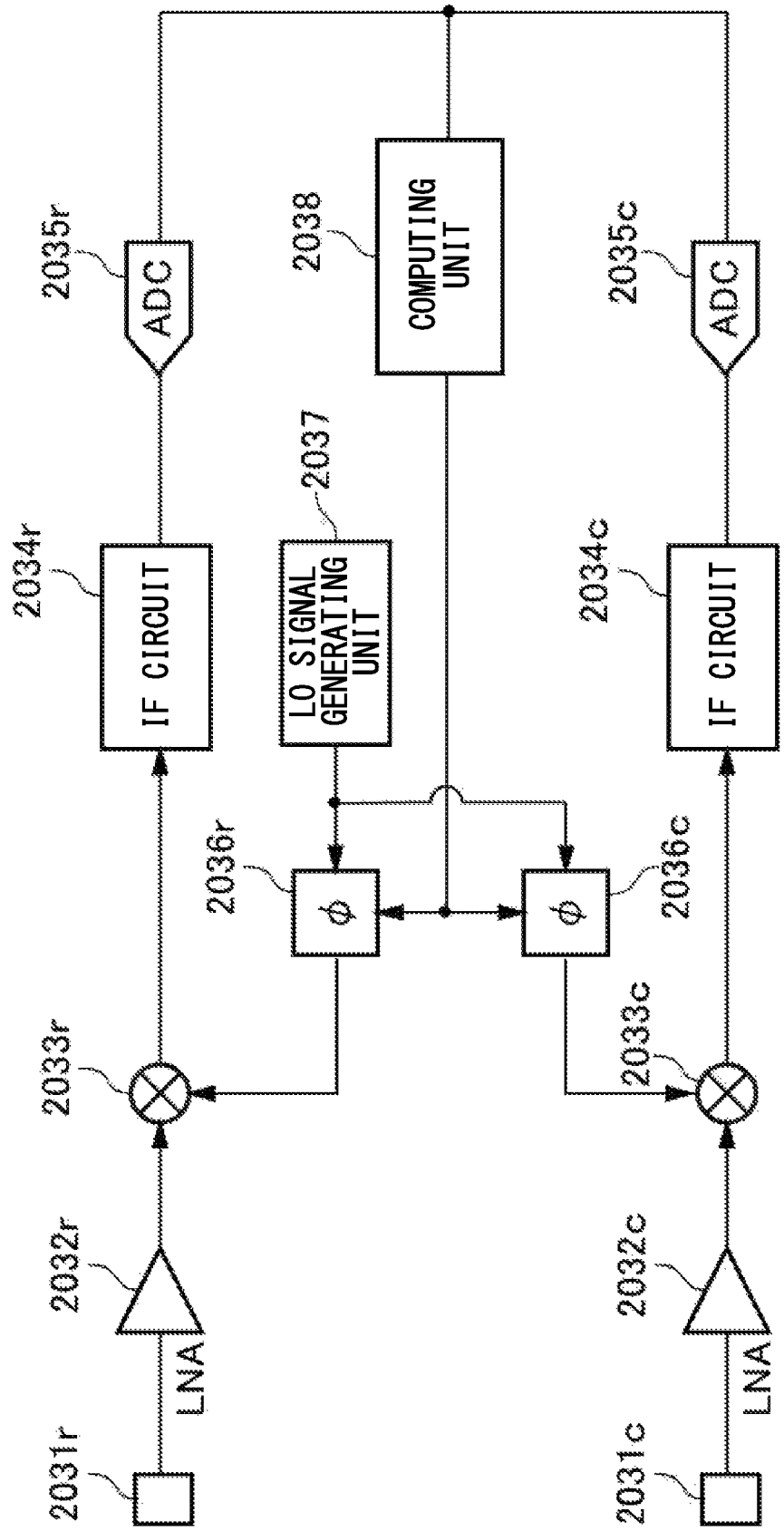
FIG. 29 is a figure for explaining exemplary internal calibration of a receiving unit 2030.

FIG. 29 is a figure for explaining exemplary internal calibration of the receiving unit 2030. The receiving unit 2030 includes receiving terminals 2031, amplifying units 2032, mixers 2033, IF circuits 2034, AD converting units 2035, phase shifters 2036, an LO signal generating unit 2037, and a computing unit 2038.

The receiving unit 2030 includes N channels. N is an integer greater than one. Although N=2 in the present example explained, this is not the sole example. The plurality of channels include a reference channel (CH_r) and a calibration channel (CH_c). The reference channel (CH_r) is a channel to serve as a reference channel for phase adjustment among the plurality of channels of the receiving unit 2030. The calibration channel (CH_c) is a channel whose relative phases between channels are to be adjusted relative to the reference channel. "r" given to signs indicates that corresponding components belong to the reference channel. "c" given to signs indicates that corresponding components belong to the calibration channel.

A receiving terminal 2031 is connected to a receive antenna 2013. The receiving terminal 2031 receives, as a reception wave, a reflected wave of a transmission wave reflected off the measurement target 2300. The receiving terminal 2031 outputs the reception wave to an amplifying unit 2032. The number of receiving terminals 2031 provided may be N, corresponding to the number of receive antennas 2013.

An amplifying unit 2032 amplifies an input reception wave. For example, the amplifying unit 2032 is a low noise amplifier (LNA). The amplifying unit 2032 outputs the amplified reception wave to a mixer 2033. Note that the receiving unit 2030 may not have the amplifying units 2032, but may directly input reception waves to the downstream mixers 2033. The number of amplifying units 2032 provided may be N, corresponding to the number of channels of receiving units 2030.

A mixer 2033 mixes a reception wave with output from a phase shifter 2036. The number of mixers 2033 provided may be N, corresponding to N amplifying units 2032. The mixer 2033 mixes the reception wave with the output from the phase shifter 2036 to thereby adjust the phase of the reception wave. The mixer 2033 outputs the phase-adjusted reception wave to an IF circuit 2034.

An IF circuit 2034 down-converts a reception wave to an IF signal. The number of IF circuits 2034 provided may be N, corresponding to N mixers 2033. The IF circuit 2034 outputs the IF signal to an AD converting unit 2035.

An AD converting unit 2035 converts an IF signal output by an IF circuit 2034 into a digital signal. In the present example, the number of AD converting units 2035 provided may be N, corresponding to the number of channels of the receiving unit 2030. The AD converting unit 2035 outputs the converted digital reception signal to the computing unit 2038.

The computing unit 2038 receives digital signals from an AD converting unit 2035*r* and an AD converting unit 2035*c*. Based on the input digital signals, the computing unit 2038 adjusts the phase shifters 2036 such that a phase difference between the reference channel and the calibration channel becomes a predetermined value. For example, the computing unit 2038 adjusts the phase shifters 2036 such that the phase difference between the reference channel and the calibration channel becomes zero in the receiving unit 2030. The computing unit 2038 may adjust both the phase shifter 2036*r* and the phase shifter 2036*c*, or may adjust either of them.

The LO signal generating unit 2037 outputs LO signals to the phase shifters 2036. In the present example, one LO signal generating unit 2037 is provided for a plurality of channels. That is, the LO signal generating unit 2037 inputs identical LO signals to both the phase shifter 2036*r* and the phase shifter 2036*c*.

A phase shifter 2036 adjusts the phase of an input reflected wave. The number of phase shifters 2036 provided may be N, corresponding to the number of channels of the receiving unit 2030. The phase shifter 2036 adjusts the phase of an LO signal from the LO signal generating unit 2037 based on control by the computing unit 2038.

The receiving unit 2030 can control the directionality of reception waves by appropriately adjusting phase differences between channels. In this manner, control on the directionality of reception waves at the receiving unit 2030 is called reception beamforming. The receiving unit 2030 of the present example has a calibration circuit incorporated therein to maintain the accuracy of relative phases between channels in an IC.

Here, the receiving unit 2030 can adjust relative phases between a plurality of channels by using calibration signals. In this case, the receiving unit 2030 can complete phase adjustment inside the receiving unit 2030 without receiving a reception wave from the receive antennas 2013.

The receiving unit 2030 of the present example adjusts phase shifter correction amounts in the millimeter wave band. That is, relative phases between a plurality of channels are adjusted by phase shifter correction amounts in the millimeter wave band of signals corresponding to reflected waves.

In addition, the radar device 2100 may adjust phases after digital conversion. In this case, relative phases between a plurality of channels are adjusted based on phase differences between signals corresponding to reflected waves after digital conversion. That is, the computing unit 2038 does not adjust the phase shifter correction amount of the phase shifter 2036, but digitally adjusts signals converted into digital signals by an AD converting unit 2035.

It should be noted however that by adjusting phase shifter correction amounts in the millimeter wave band, the radar device 2100 can improve accuracy more as compared to a case where phases are adjusted after digital conversion. In addition, it becomes easier to achieve correspondence between phases and frequencies if phase shifter correction amounts are adjusted in the millimeter wave band.

Figure 30:
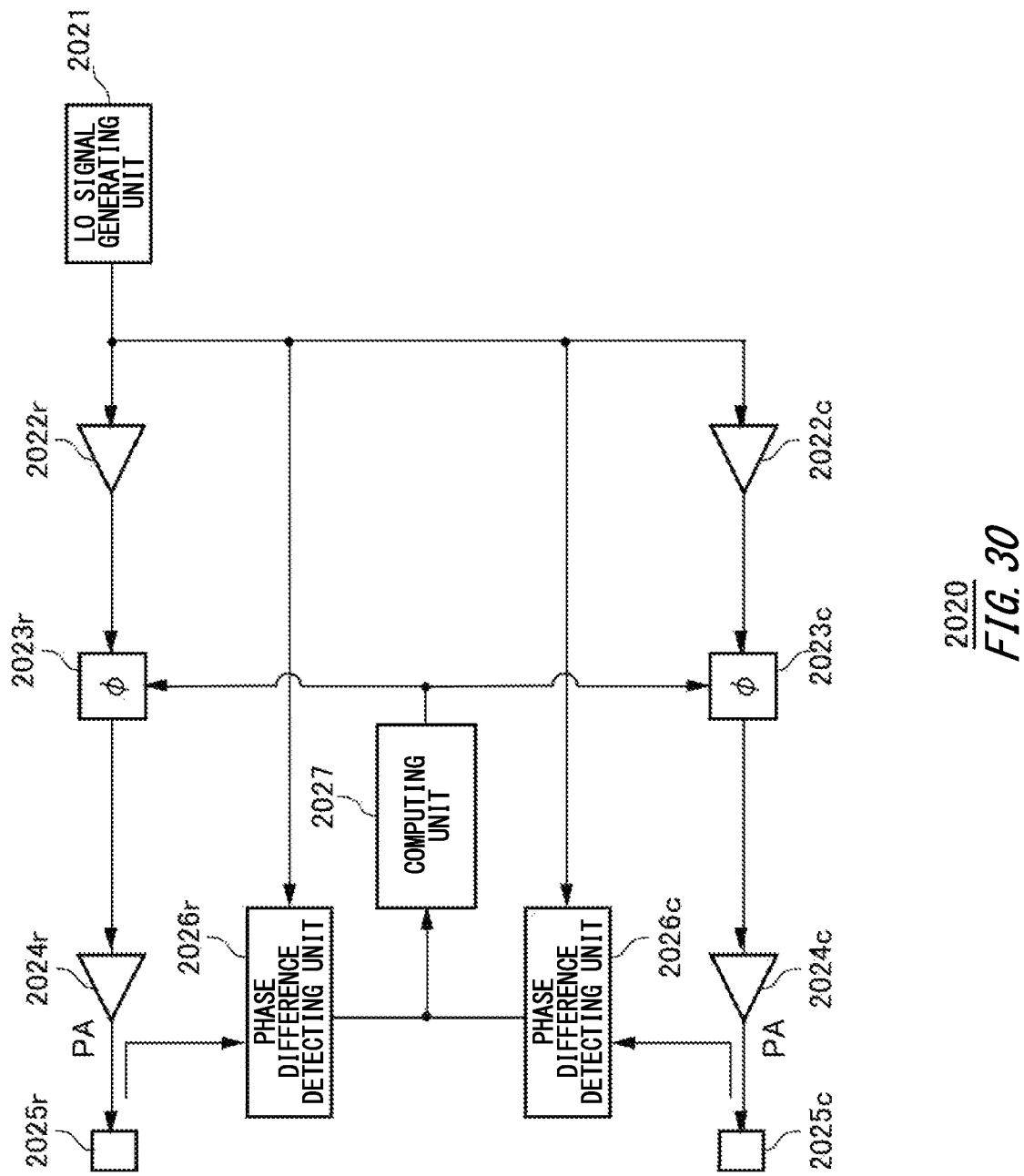
FIG. 30 is a figure for explaining exemplary internal calibration of a transmitting unit 2020.

FIG. 30 is a figure for explaining exemplary internal calibration of a transmitting unit 2020. The transmitting unit 2020 includes an LO signal generating unit 2021, amplifying units 2022, phase shifters 2023, amplifying units 2024, transmission terminals 2025, phase difference identifying units 2026, and a computing unit 2027.

The transmitting unit 2020 includes M channels. M is an integer greater than one. Although M=2 in the present example explained, this is not the sole example. The plurality of channels include a reference channel (CH_r) and a calibration channel (CH_c). The reference channel (CH_r) is a channel to serve as a reference channel for phase adjustment among the plurality of channels of the transmitting unit 2020. The calibration channel (CH_c) is a channel whose relative phases between channels are to be adjusted relative to the reference channel. "r" given to signs indicates that corresponding components belong to the reference channel. "c" given to signs indicates that corresponding components belong to the calibration channel.

The LO signal generating unit 2021 outputs LO signals to the amplifying units 2022 and the phase difference identifying units 2026. In the present example, one LO signal generating unit 2021 is provided for a plurality of channels. That is, the LO signal generating unit 2021 inputs identical LO signals to an amplifying unit 2022r, an amplifying unit 2022c, a phase difference identifying unit 2026r, and a phase difference identifying unit 2026c.

An amplifying unit 2022 amplifies an input LO signal. The amplifying unit 2022 outputs the amplified LO signal to a phase shifter 2023. In the present example, the number of amplifying units 2022 provided may be M, corresponding to the number of channels of the transmitting unit 2020.

A phase shifter 2023 adjusts the phase of a signal input from an amplifying unit 2022. The number of phase shifters 2023 provided may be M, corresponding to the number of channels of the transmitting unit 2020. Based on a phase shifter correction amount from the computing unit 2027, the phase shifter 2023 adjusts the phase of an LO signal input from an amplifying unit 2022.

An amplifying unit 2024 receives a signal having a phase adjusted at a phase shifter 2023. The number of amplifying units 2024 provided may be M, corresponding to the number of channels of the transmitting unit 2020. The amplifying unit 2024 amplifies an input signal, and outputs the amplified signal to a transmission terminal 2025. For example, the amplifying unit 2024 is a power amplifier (PA).

A transmission terminal 2025 is connected to an amplifying unit 2024. The number of transmission terminals 2025 provided may be M, corresponding to the number of channels of the transmitting unit 2020. The transmission terminal 2025 is connected with a transmit antenna 2012. It should be noted however that at a time of execution of internal calibration of the transmitting unit 2020, the transmission terminal 2025 may not transmit an input signal to the transmit antenna 2012.

A phase difference identifying unit 2026 receives a signal input to a transmission terminal 2025, and a signal generated at the LO signal generating unit 2021. The phase difference identifying unit 2026 identifies the phase difference between the input signals. The phase difference identifying unit 2026 outputs the identified signal to the computing unit 2027.

Based on a phase difference of the reference channel and a phase difference of the calibration channel, the computing unit 2027 adjusts the phase difference between the reference channel and the calibration channel such that it becomes a predetermined value. For example, the computing unit 2027 adjusts the phase shifters 2023 such that the phase difference between the reference channel and the calibration channel becomes zero in the transmitting unit 2020. The computing unit 2027 may adjust both the phase shifter 2023r and the phase shifter 2023c, or may adjust either of them. For example, the computing unit 2027 adjusts the phase difference by changing the phase shifter correction amount of a phase shifter 2023.

Figure 31:
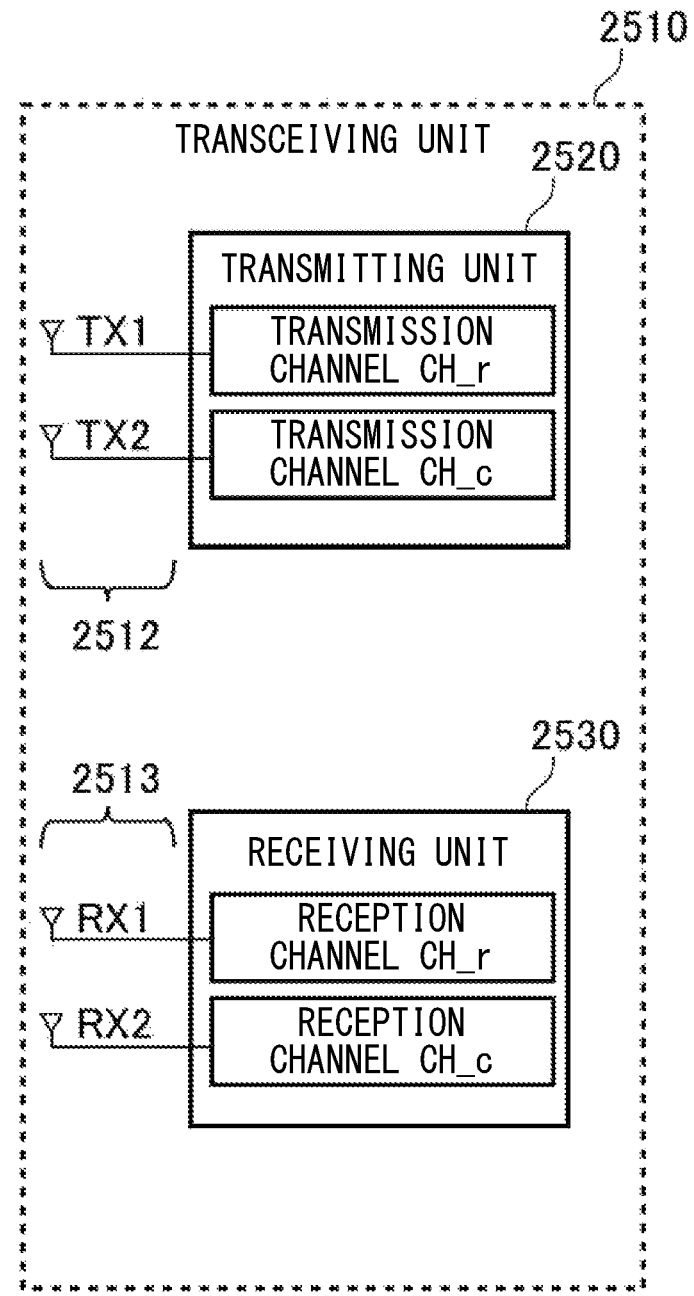
FIG. 31 is a figure for explaining a phase adjustment method for a radar device 2500 according to a comparative example.

FIG. 31 is a figure for explaining a phase adjustment method for a radar device 2500 according to a comparative example. The radar device 2500 adjusts relative phases of a plurality of channels provided in a transceiving unit 2510. The radar device 2500 of the present example executes internal calibration of a transmitting unit 2520 and a receiving unit 2530. That is, the radar device 2500 performs phase adjustment of each of the transmitting unit 2520 and the receiving unit 2530 singly, but does not adjust phase difference of the entire module including antennas or the like.

That is, in the phase adjustment method for the radar device 2500, the influence of transmit antennas 2512 and receive antennas 2513 is not taken into consideration. For example, a phase shift may occur due to the length of an antenna in some cases. In addition, the phase adjustment method for the radar device 2500 does not take into consideration the influence of a waveguide on an RF substrate on which the radar device 2500 is provided, if such is the case. Because of this, although internal calibration of each of the transmitting unit 2520 and the receiving unit 2530 is executed in the radar device 2500, relative phases are not adjusted for the entire module. Accordingly, the radar device 2500 cannot realize highly accurate calibration.

Figure 32A:
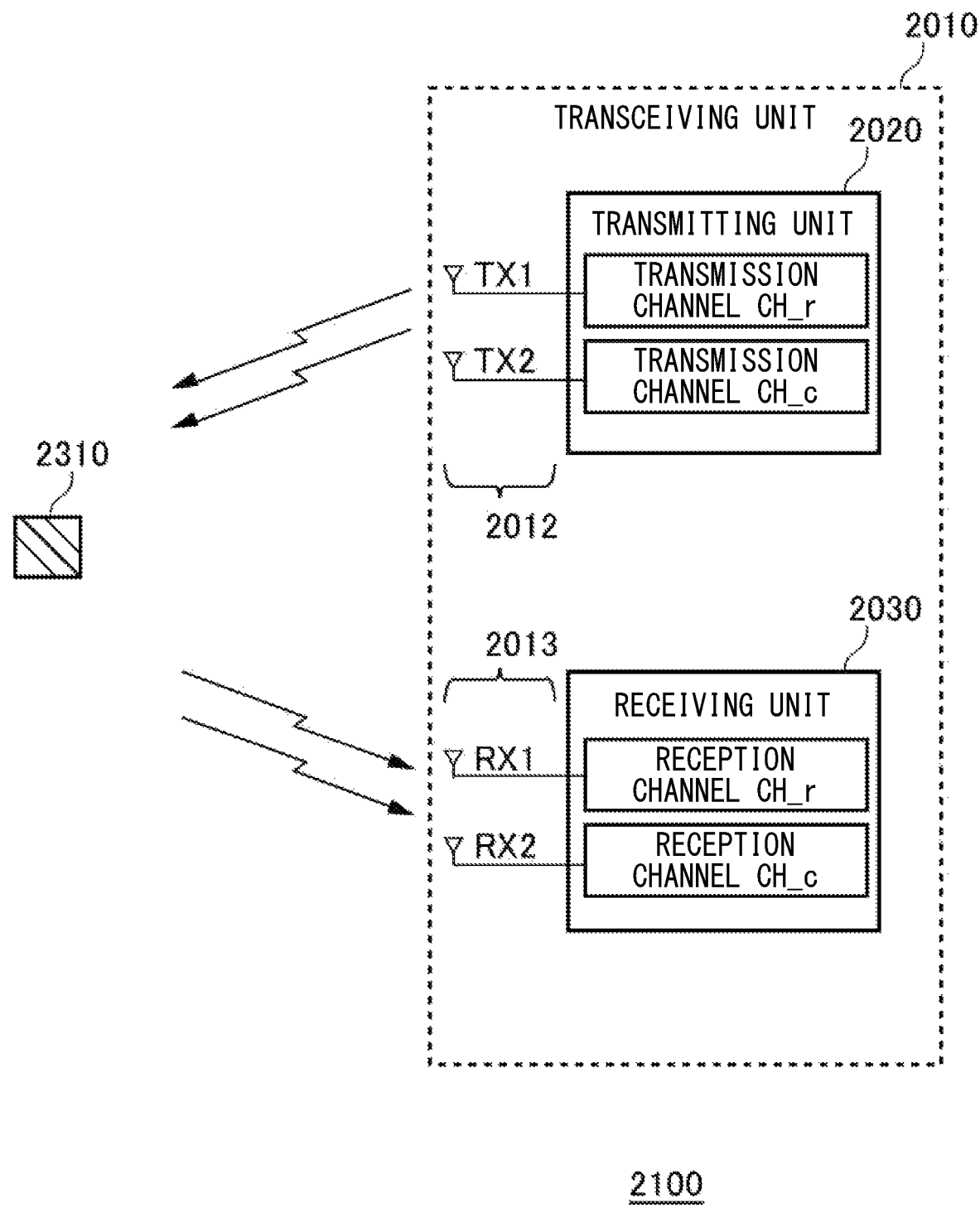
FIG. 32A is a figure for explaining exemplary external calibration of the receiving unit 2030.

FIG. 32A is a figure for explaining exemplary external calibration of the receiving unit 2030. In the present example explained, the transceiving unit 2010 has a transmitting unit 2020 and receiving unit 2030 with two channels. It should be noted however that the number of channels is not limited to the number illustrated in the present example.

The calibration target 2310 is a reference target for performing external calibration of the receiving unit 2030. For example, the calibration target 2310 is provided at a predetermined position relative to the radar device 2100 in a stationary state. The calibration target 2310 may be provided on the front face of the radar device 2100. The position at which the calibration target 2310 is provided is used as a reference position for calibration. That is, through external calibration of the receiving unit 2030 by using the calibration target 2310, the radar device 2100 has its "front face" for the reception channels in the direction in which the calibration target 2310 is located.

The transmitting unit 2020 uses a plurality of transmit antennas TX to transmit transmission waves. The transmitting unit 2020 transmits transmission waves to the calibration target 2310. The number of transmission channels for transmission waves is not particularly limited. In addition, it does not matter whether or not calibration of the transmitting unit 2020 is executed.

The receiving unit 2030 uses a plurality of receive antennas RX to receive reflected waves. The receiving unit 2030 of the present example receives reflected waves from the calibration target 2310 by using all the receive antennas 2013.

As external calibration, the radar device 2100 of the present example can cancel out errors in relative phases between channels of the receiving unit 2030. The radar device 2100 adjusts the phase shifter correction amount of a phase shifter 2036 such that relative phase differences between channels of the receiving unit 2030 becomes zero. The phase shifter correction amount of the phase shifter 2036 may be used in recalibration at a time of an actual operation. Note that the radar device 2100 may perform not only relative correction between reception channels, but also 0° correction (i.e., absolute value correction) for the receiving end.

Figure 32B:
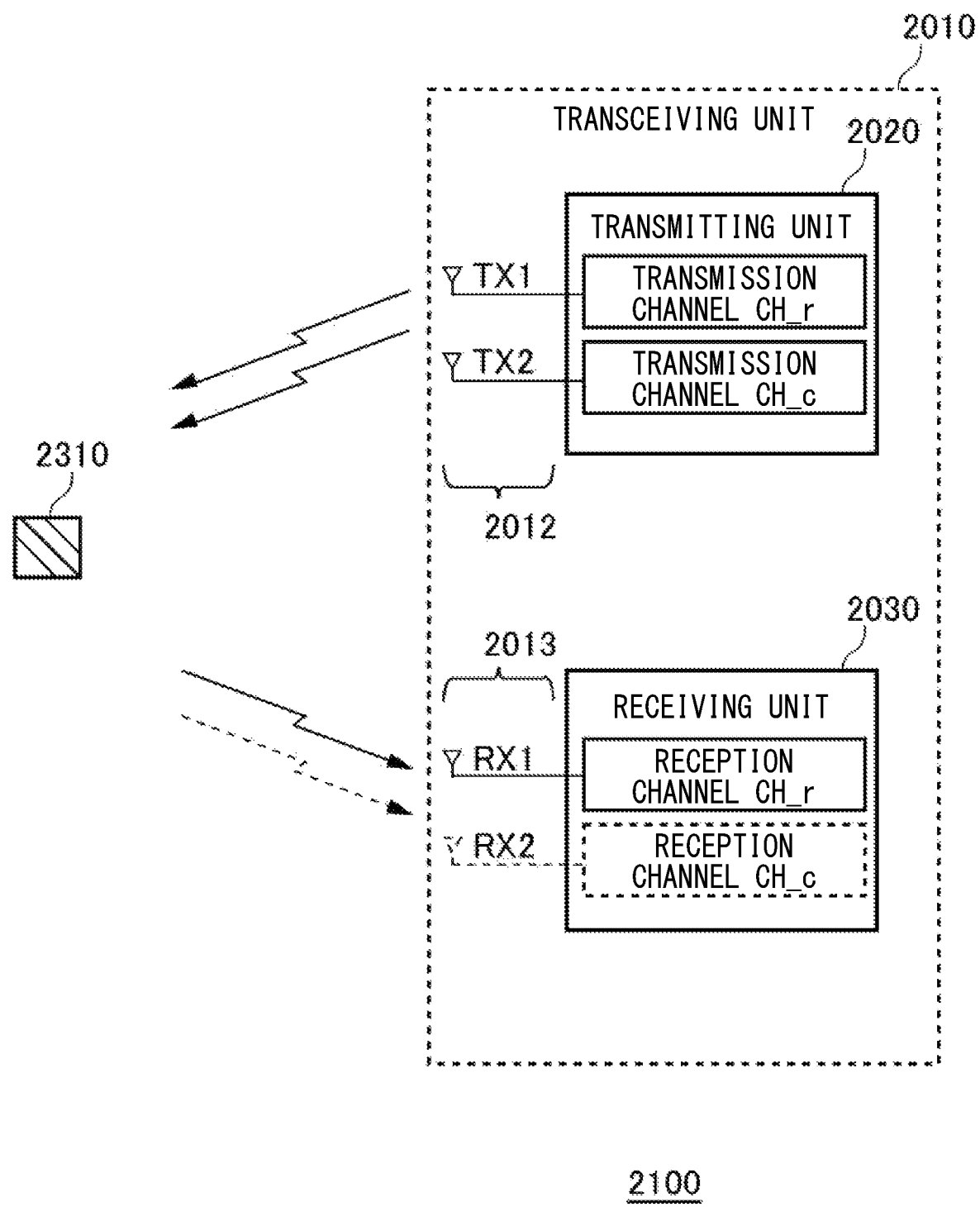
FIG. 32B is a figure for explaining exemplary external calibration of the transmitting unit 2020.

FIG. 32B is a figure for explaining exemplary external calibration of the transmitting unit 2020. In the present example explained, the transceiving unit 2010 has a transmitting unit 2020 and receiving unit 2030 with two channels. It should be noted however that the number of channels is not limited to the number illustrated in the present example.

Figure 32C:
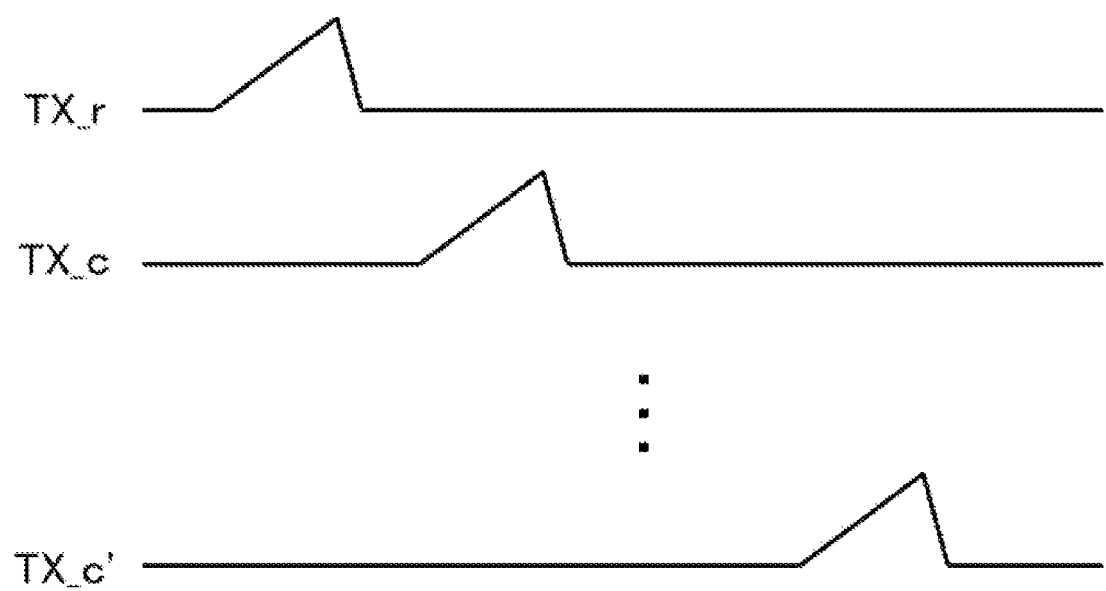
FIG. 32C illustrates an exemplary timing chart of transmission waves transmitted sequentially.

FIG. 32C illustrates an exemplary timing chart of transmission waves transmitted sequentially. For example, as a transmission wave, the radar device 2100 transmits a frequency-modulated FMCW radar signal. A transmission wave TX_r is a transmission wave transmitted from a transmit antenna 2012 connected to the reference channel. A transmission wave TX_c to a transmission wave TX_c' are transmission waves transmitted from transmit antennas 2012 connected to the calibration channel.

The transmitting unit 2020 uses a plurality of transmit antennas TX to transmit transmission waves. The transmitting unit 2020 sequentially transmits transmission waves toward the calibration target 2310. The number of transmission channels for transmission waves is not particularly limited.

At a reception channel of any one of the channels, the receiving unit 2030 receives a reflected wave from the calibration target 2310. It should be noted however that the receiving unit 2030 may receive reflected waves by using a plurality of channels. The receiving unit 2030 detects phase differences between reflected waves received at each instance of sequential transmission through an FFT after down-conversion to an IF or the like.

The transmitting unit 2020 adjusts a phase shifter 2023 such that a phase difference at each instance of sequential transmission becomes zero. Thereby, the radar device 2100 can adjust relative phases between channels. The transmitting unit 2020 of the present example adjusts phase shifter correction amounts in the millimeter wave band. That is, relative phases between a plurality of channels are adjusted by phase shifter correction amounts in the millimeter wave band of signals corresponding to reflected waves.

The calibration target 2310 is a reference target for performing external calibration of the transmitting unit 2020. The calibration target 2310 may be provided on the front face of the radar device 2100. The position at which the calibration target 2310 is provided is used as a reference position for calibration. That is, through external calibration of the transmitting unit 2020 by using the calibration target 2310, the radar device 2100 has its "front face" for the transmission channels in the direction in which the calibration target 2310 is located.

Note that the radar device 2100 can perform not only relative correction between transmission channels, but also 0° correction (i.e., absolute value correction) for the transmitting end.

Figure 32D:
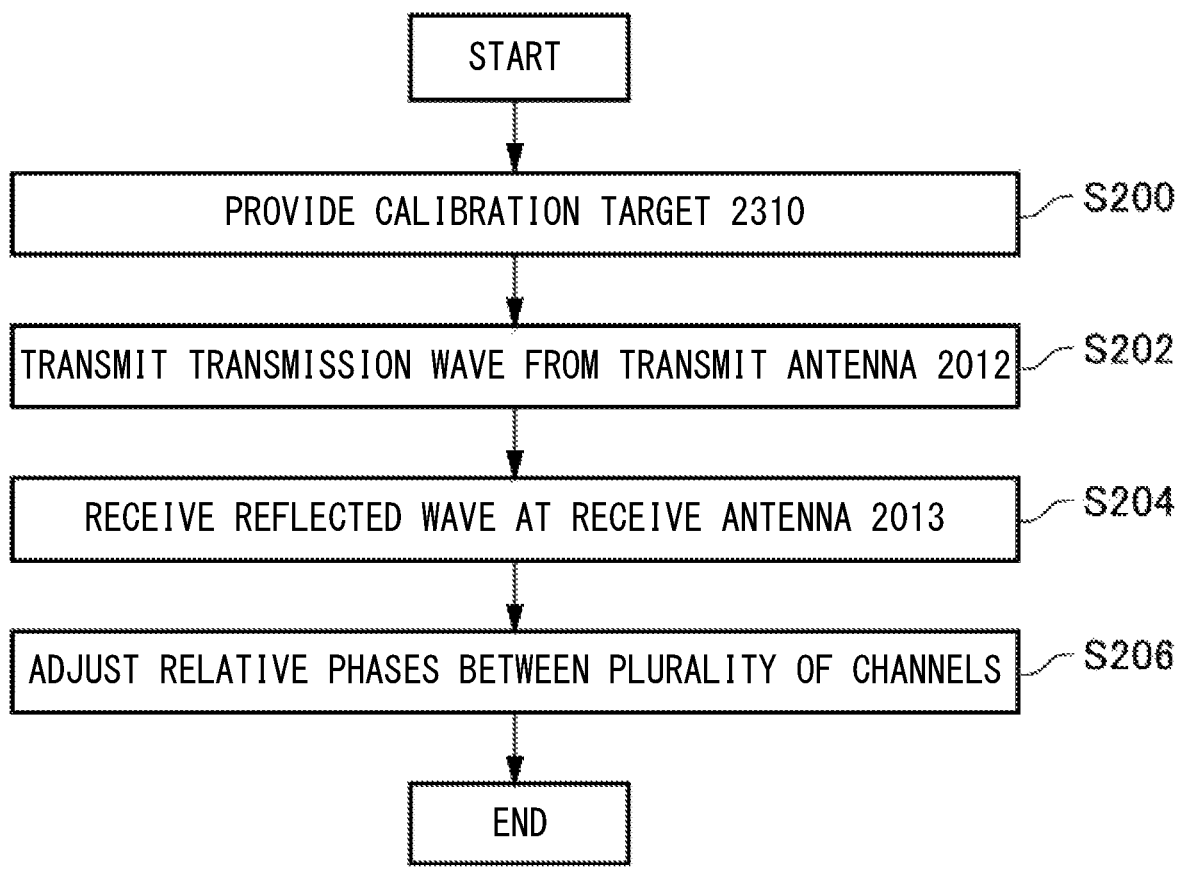
FIG. 32D illustrates an exemplary flowchart for performing external calibration.

FIG. 32D illustrates an exemplary flowchart for performing external calibration. In the external calibration, at Step S200, the calibration target 2310 is provided. At Step S202, a transmission wave is transmitted from a transmit antenna connected to the transceiving unit 2010. At Step S204, a reflected wave of the transmission wave is received by the receiving unit 2030 by using a receive antenna 2013. At Step S206, relative phases between a plurality of channels are adjusted based on the reflected wave received by the receiving unit 2030.

Figure 33:
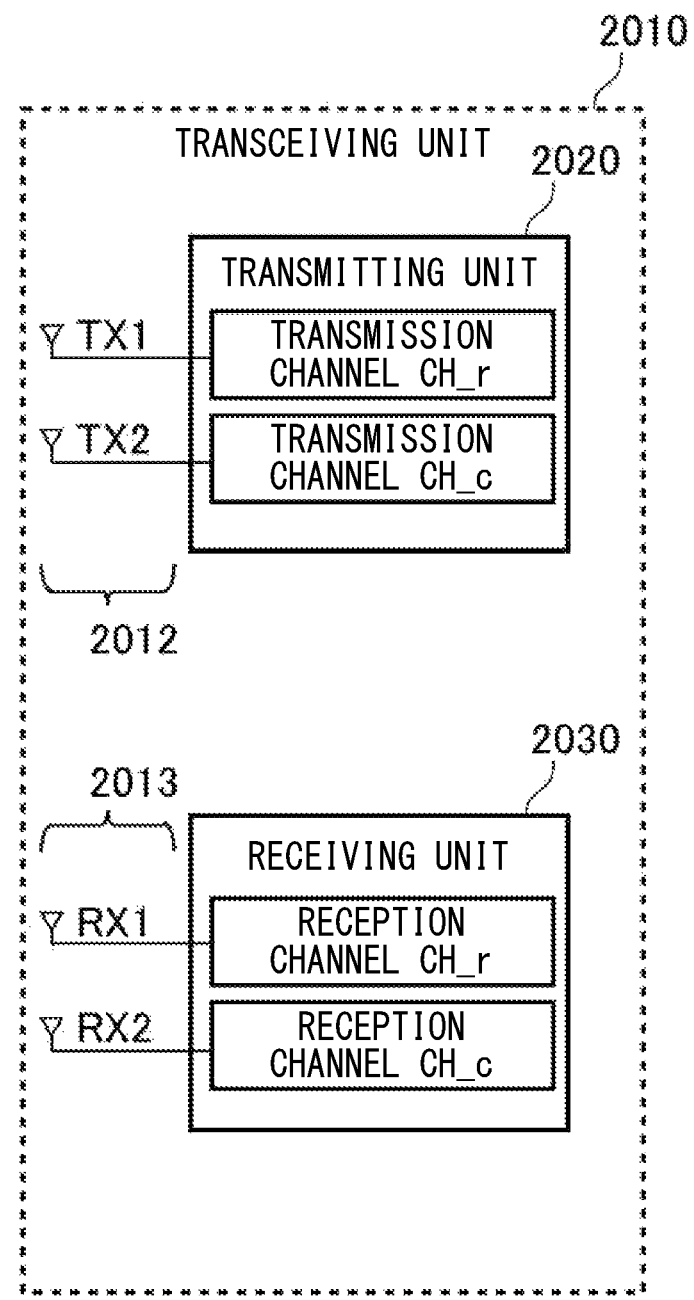
FIG. 33 is a figure for explaining the radar device 2100 that executes recalibration.

FIG. 33 is a figure for explaining the radar device 2100 that executes recalibration. In the present example explained, the transceiving unit 2010 has a transmitting unit 2020 and receiving unit 2030 with two channels. It should be noted however that the number of channels is not limited to the number illustrated in the present example.

In the recalibration, internal calibration is executed as illustrated in FIG. 29 and FIG. 30. In the internal calibration, it is not necessary to provide the calibration target 2310, and a transmission wave may not be transmitted from the transceiving unit 2010. That is, in the internal calibration, calibration of the transmitting unit 2020 and the receiving unit 2030 can be executed even in situations where it is difficult to arrange the calibration target 2310.

Here, also at a time of recalibration, the radar device 2100 can use a correction value acquired at a time of pre-calibration. For example, as a correction value for the receiving unit 2030, the radar device 2100 uses an acquired phase difference in the IF band or phase shifter correction amount in the millimeter wave band. In addition, as a correction value for the transmitting unit 2020, the radar device 2100 may use an acquired phase shifter correction amount in the millimeter wave band.

At a time of an actual operation, phase differences might change due to temperature, ageing or the like, and it becomes necessary to update the correction amount in some cases. However, at a time of an actual operation, it is difficult to arrange the calibration target 2310 used at a time of pre-calibration at the same position. Because of this, at a time of an actual operation, it is difficult to perform external calibration by using the calibration target 2310 in some cases.

For example, as recalibration, the radar device 2100 updates a correction value for a portion susceptible to environmental factors. Thereby, the calculation amount is reduced by an amount of calculation for calibration which becomes unnecessary in this case. For example, as recalibration, the radar device 2100 updates a correction value for a portion including active elements.

Active elements are more susceptible to environmental factors such as temperature and ageing than passive elements are. Active elements are present in an RFIC of the transceiving unit 2010 or the like. For example, active elements are amplifying units 2024 such as PAs or amplifying units 2032 such as LNAs.

On the other hand, passive elements are less susceptible to environmental factors such as temperature or ageing than active elements are. For example, for antennas or waveguides, which are passive elements, phase difference fluctuations due to environmental factors are negligible.

Because of this, inter-channel phase difference fluctuations caused by environmental factors due to temperature, ageing or the like are mainly generated by factors that are present inside the transceiving unit 2010.

Here, the radar device 2100 may execute not external calibration but internal calibration as a method of updating a correction value at a time of an actual operation. Through internal calibration, the radar device 2100 can adjust relative phases between channels of the transmitting unit 2020 and receiving unit 2030 including active elements.

For example, the radar device 2100 stores a correction amount for adjusting relative phases between channels provided in the transceiving unit 2010. For example, the radar device 2100 executes internal calibration, and stores, as $TX_{int}$ and $RX_{int}$, phase shifter correction amounts of the transmitting unit 2020 and the receiving unit 2030, respectively. In addition, the radar device 2100 executes external calibration, and stores, as $TX_{ext}$ and $RX_{ext}$, phase shifter correction amounts of the transmitting unit 2020 and the receiving unit 2030, respectively.

If phase differences due to passive elements are defines as $TX_{psv}$ and $RX_{psv}$, $TX_{ext}$ and $RX_{ext}$ are expressed by the following formulae.

$$TX_{ext}=TX_{int}+TX_{psv}$$

$$RX_{ext}=RX_{int}+RX_{psv}$$

The radar device 2100 requires only updating of terms ($TX_{int}$ and $RX_{int}$) that change depending on environmental factors at a time of an actual operation. In this case, a special configuration such as the calibration target 2310 is unnecessary. The radar device 2100 can neglect changes of phase differences $TX_{psv}$ and $RX_{psv}$ due to passive elements.

As explained above, the radar device 2100 can realize an optimum calibration method depending on situations by combining external calibration and internal calibration. Thereby, the radar device 2100 can execute more accurate phase adjustment by a realistic use method. In addition, if recalibration of phase errors becomes necessary due to environment or ageing, recalibration is possible even during an actual operation without requiring a special configuration.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Aspects of the present invention are explained below.

[Item 1] A sensor device that senses an object by using an FMCW radar, the sensor device comprising:

a signal processing unit that acquires a reception signal that is based on a reception wave of the FMCW radar, and senses the object; and a phase converting unit that acquires phase information from the reception signal, and tracks the living body by monitoring a peak BIN, and a phase offset between the peak BIN and another BIN based on the phase information.

[Item 2] The sensor device according to Item 1, wherein, as the reception signal, the signal processing unit uses micro-vibration data about the object to sense the object.

[Item 3] The sensor device according to Item 1 or 2, wherein the signal processing unit detects a plurality of objects by identifying a plurality of peaks of a power conversion spectrum of the reception signal.

[Item 4] The sensor device according to Item 3, wherein the phase converting unit monitors a phase offset between the peak BIN and an adjacent BIN.

[Item 5] The sensor device according to Item 3 or 4, wherein the phase converting unit calculates the phase information based on range-FFT data obtained by taking an average of a plurality of chirps.

[Item 6] The sensor device according to Item 3 or 4, wherein the phase converting unit calculates the phase information based on velocity-FFT or angle-FFT data.

[Item 7] The sensor device according to any one of Items 1 to 6, wherein the signal processing unit executes a velocity-FFT and an angle-FFT on the reception signal after a range-FFT on the reception signal.

[Item 8] The sensor device according to any one of Items 1 to 7, comprising:

an FFT unit that performs an FFT on the reception signal;

a power converting unit that calculates a power spectrum based on a signal obtained through the FFT by the FFT unit; and a determining unit that determines a peak position of the power spectrum.

[Item 9] The sensor device according to any one of Items 1 to 8, wherein the signal processing unit further has a storage unit that stores range data having n/2 BINs, velocity data having m BINs, and angle data having k BINs, and n is the number of ADC samples, m is the number of chirps per burst, and k is the number of channels.

[Item 10] The sensor device according to Item 9, wherein the signal processing unit further has a selecting unit that selects the reception signal at a time of a range-FFT, and selects data stored in the storage unit at times of a velocity-FFT and an angle-FFT.

[Item 11] The sensor device according to any one of Items 1 to 10, further comprising an input unit that receives the reception signal, wherein the input unit has:

a plurality of channels each of which receives the reception signal; and a plurality of AD converting units each of which is provided in one of the plurality of channels, and converts the reception signal into a digital signal.

[Item 12] The sensor device according to Item 11, wherein the phase converting unit tracks the object by monitoring the peak BIN, and a phase offset between the peak BIN and another BIN in a single channel.

[Item 13] The sensor device according to any one of Items 1 to 12, wherein the object is a living body.

[Item 14] A system comprising:

a transceiving unit that transmits and receives an FMCW radar signal; and the sensor device according to any one of Items 1 to 12.

[Item 15] A biometric sensing method performed by using an FMCW radar, the biometric sensing method comprising:
transmitting a transmission wave to a living body under a first FMCW radar condition for living body detection;
receiving a reception wave under the first FMCW radar condition;
performing signal processing under the first FMCW radar condition, and detecting presence of the living body;
transmitting a transmission wave to the living body under a second FMCW radar condition for biometric sensing;
receiving a reception wave under the second FMCW radar condition; and
performing signal processing under the second FMCW radar condition, and sensing a biometric signal of the living body.

[Item 16] The biometric sensing method according to Item 15, wherein the transmission wave transmitted under the first FMCW radar condition has a waveform different from the transmission wave transmitted under the second FMCW radar condition.

[Item 17] A system comprising:
a transceiving unit that transmits and receives an FMCW radar signal;
a signal processing unit that detects a living body, and senses a biometric signal of the living body based on a reception signal received by the transceiving unit; and
a signal processing control unit that controls an operating condition of the signal processing unit, wherein
the transceiving unit has:
  a transmitting unit that transmits a transmission wave to the living body under a first FMCW radar condition for living body detection or a second FMCW radar condition for biometric sensing;
  a receiving unit that receives a reception wave under the first FMCW radar condition or the second FMCW radar condition; and
  a radar control unit that controls an operating condition of the transmitting unit and the receiving unit such that the operating condition of the transmitting unit and the receiving unit matches the first FMCW radar condition or the second FMCW radar condition,
the signal processing unit performs signal processing under the first FMCW radar condition or the second FMCW radar condition, and
the signal processing control unit controls an operating condition of the signal processing unit such that the operating condition of the signal processing unit matches the first FMCW radar condition or the second FMCW radar condition.

EXPLANATION OF REFERENCE SYMBOLS

10: transceiving unit; 12: transmitting unit; 14: receiving unit; 16: radar control unit; 17: signal processing control unit; 20: input unit; 22: AD converting unit; 30: signal processing unit; 31: selecting unit; 32: FFT unit; 33: power converting unit; 34: determining unit; 35: storage unit; 36: output unit; 37: phase converting unit; 38: data cube; 40: FMCW generating unit; 41: phase shifter; 42: power amplifier; 43: transmit antenna; 50: receive antenna; 51: LNA; 52: mixer; 53: phase shifter; 54: LO signal generating unit; 60: FFT executing unit; 61: window unit; 62: phase adjusting unit; 63: averaging unit; 100: sensor device; 200: system; 300: living body; 1010: transceiving unit; 1012: transmitting unit; 1014: receiving unit; 1016: antenna; 1020: input unit; 1030: signal processing unit; 1017: MIMO antenna; 1018: correlation antenna; 1100: sensor device; 1300: target; 1500: sensor device; 1516: antenna; 1517: MIMO antenna; 1518: correlation antenna; 1519: non antenna region; 1520: region; 2010: transceiving unit; 2012: transmit antenna; 2013: receive antenna; 2020: transmitting unit; 2021: LO signal generating unit; 2022: amplifying unit; 2023: phase shifter; 2024: amplifying unit; 2025: transmission terminal; 2026: phase difference identifying unit; 2027: computing unit; 2030: receiving unit; 2031: receiving terminal; 2032: amplifying unit; 2033: mixer; 2034: IF circuit; 2035: AD converting unit; 2036: phase shifter; 2037: LO signal generating unit; 2038: computing unit; 2100: radar device; 2300: measurement target; 2310: calibration target; 2500: radar device; 2510: transceiving unit; 2512: transmit antenna; 2513: receive antenna; 2520: transmitting unit; 2530: receiving unit

What is claimed is:

1. A sensor device that senses an object by using an FMCW radar, the sensor device comprising:
    one or more processors;
    a signal processing unit that uses the one or more processors to acquire a reception signal that is based on a reception wave of the FMCW radar, and sense the object; and
    a phase converting unit that uses the one or more processors to acquire phase information from the reception signal, and track the object by monitoring a peak BIN, and a phase offset between the peak BIN and an adjacent BIN based on the phase information, wherein
    the phase converting unit further uses the one or more processors to maintain continuity of the phase information between the peak BIN and the adjacent BIN based on the monitored phase offset when a position of a peak in a distance power spectrum shifts from the peak BIN to the adjacent BIN.

2. The sensor device according to claim 1, wherein, as the reception signal, the signal processing unit further uses the one or more processors to use micro-vibration data about the object to sense the object.

3. The sensor device according to claim 1, wherein the signal processing unit further uses the one or more processors to detect a plurality of objects by identifying a plurality of peaks of a power conversion spectrum of the reception signal.

4. The sensor device according to claim 3, wherein the phase converting unit further uses the one or more processors to calculate the phase information based on range-FFT data obtained by taking an average of a plurality of chirps.

5. The sensor device according to claim 3, wherein the phase converting unit further uses the one or more processors to calculate the phase information based on velocity-FFT or angle-FFT data.

6. The sensor device according to claim 1, wherein the signal processing unit further uses the one or more processors to execute a velocity-FFT and an angle-FFT on the reception signal after a range-FFT on the reception signal.

7. The sensor device according to claim 1, further comprising:
    an FFT unit that uses the one or more processors to perform an FFT on the reception signal;
    a power converting unit that uses the one or more processors to calculate a power spectrum based on a signal obtained through the FFT by the FFT unit; and
    a determining unit that uses the one or more processors to determine a peak position of the power spectrum.

8. The sensor device according to claim 1, wherein
the signal processing unit has a storage unit that uses the one or more processors to store range data having n/2 BINs, velocity data having m BINs, and angle data having k BINs, and
n is the number of ADC samples, m is the number of chirps per burst, and k is the number of channels.

9. The sensor device according to claim 8, wherein the signal processing unit further has a selecting unit that uses the one or more processors to select the reception signal at a time of a range-FFT, and select data stored in the storage unit at times of a velocity-FFT and an angle-FFT.

10. The sensor device according to claim 1, further comprising an input unit that uses an integrated circuit to receive the reception signal, wherein
the input unit has:
a plurality of channels each of which receives the reception signal; and
a plurality of AD converting units each of which is provided in one of the plurality of channels, and uses the integrated circuit to convert the reception signal into a digital signal.

11. The sensor device according to claim 10, wherein the phase converting unit further uses the one or more processors to track the object by monitoring the peak BIN, and the phase offset between the peak BIN and the adjacent BIN in a single channel.

12. The sensor device according to claim 1, wherein the object is a living body.

13. A system comprising:
a transceiving unit that uses an integrated circuit to transmit and receive an FMCW radar signal; and
the sensor device according to claim 1.

* * * * *